(12) United States Patent
Yanagi et al.

(10) Patent No.: US 7,715,023 B2
(45) Date of Patent: May 11, 2010

(54) JIG MOUNTING APPARATUS

(75) Inventors: Eiichi Yanagi, Tokyo (JP); Takahiro Watanabe, Tokyo (JP); Yoshimasa Ogawa, Okayama (JP); Tsutomu Kikawa, Tokyo (JP); Kazuo Kitamura, Tokyo (JP); Yasuo Suzuki, Tokyo (JP); Kenichi Watanabe, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 424 days.

(21) Appl. No.: 11/547,418

(22) PCT Filed: Mar. 31, 2005

(86) PCT No.: PCT/JP2005/006394

§ 371 (c)(1),
(2), (4) Date: Dec. 10, 2007

(87) PCT Pub. No.: WO2005/096074

PCT Pub. Date: Oct. 13, 2005

(65) Prior Publication Data

US 2008/0231794 A1    Sep. 25, 2008

(30) Foreign Application Priority Data

| Mar. 31, 2004 | (JP) | ............................. 2004-107762 |
| Mar. 31, 2004 | (JP) | ............................. 2004-107764 |
| Mar. 31, 2004 | (JP) | ............................. 2004-107765 |
| Mar. 31, 2004 | (JP) | ............................. 2004-107766 |
| Mar. 31, 2004 | (JP) | ............................. 2004-107767 |
| Mar. 24, 2005 | (JP) | ............................. 2005-085122 |

(51) Int. Cl.
*G01B 11/14* (2006.01)

(52) U.S. Cl. ........................................................ 356/614

(58) Field of Classification Search .......... 356/614–624
See application file for complete search history.

(56) References Cited

U.S. PATENT DOCUMENTS

| 2001/0055111 A1 | 12/2001 | Yoda et al. |
| 2002/0052167 A1 | 5/2002 | Akiyama et al. |
| 2003/0015649 A1 | 1/2003 | Levecq et al. |

FOREIGN PATENT DOCUMENTS

DE             38 29 488         3/1990

(Continued)

*Primary Examiner*—Michael P Stafira
(74) *Attorney, Agent, or Firm*—Chapman and Cutler LLP

(57) ABSTRACT

A jig mounting apparatus has a detection optical system that detects reference marker of an eyeglass lens, is configured so as to determine an mounting point based on the reference marker detected by the detection optical system and position the mounting center of jig, which is used in processing the eyeglass lens, on the mounting point to mount the jig on the surface of the eyeglass lens, in which the detection optical system includes: a focusing optical system that focuses a light-emitting optical flux from a light source on the surface of the eyeglass lens, where hidden marks are formed, via an aperture stop; a reflection plate that reflects an optical flux focused by the focusing optical system and passed through the eyeglass lens; and an imaging device that is provided on a position optically approximately conjugate with the aperture stop and configured to focus on a space portion along an optical axis direction from the surface of the eyeglass lens.

13 Claims, 45 Drawing Sheets

FOREIGN PATENT DOCUMENTS

| | | |
|---|---|---|
| EP | 1 167 942 | 1/2002 |
| EP | 0 856 728 | 7/2002 |
| EP | 1 201 360 | 3/2003 |
| JP | 10-105033 | 4/1998 |
| JP | 2000-019058 | 1/2000 |
| JP | 3077054 | 5/2001 |
| JP | 2002-001638 | 1/2002 |
| JP | 2002-022599 | 1/2002 |
| JP | 2002-036083 | 2/2002 |
| JP | 2002-139713 | 5/2002 |
| JP | 2002-296144 | 10/2002 |
| JP | 2003-100613 | 4/2003 |

If lens is inserted
(All searches pause)

If lens is not inserted
(In this case, searches at three places arrive at edge of stage)

US 7,715,023 B2

JIG MOUNTING APPARATUS

TECHNICAL FIELD

The present invention relates to a modification of a jig mounting apparatus that reads out hidden marks drawn on an eyeglass lens as a reference marker and automatically mounts a jig which is used in processing eyeglass lenses, on the eyeglass lens.

BACKGROUND ART

Generally, an eyeglass lens such as a progressive multi-focal lens, for example, is provided with print marks or hidden marks as a reference marker that are used in mounting a jig, which is used in processing the eyeglass lens, on the eyeglass lens.

Conventionally, the following Patent documents 1 to 8, for example, disclose a jig mounting apparatus that detects an identification marker such as the hidden marks by a detection optical system, determines an mounting point based on the identification marker detected by the detection optical system to position the jig used in processing the eyeglass lens at the mounting point, and mounts the jig on the eyeglass lens.

Patent document 1: Japanese Utility Model Registration No. 3077054 gazette
Patent document 2: Germany Patent Publication No. 3829488 gazette A1
Patent document 3: The United States Patent Publication No. 2003-15649 gazette
Patent document 4: Japanese Patent Laid-Open No. 2002-296144 gazette
Patent document 5: Japanese Patent Laid-Open No. 2000-19058 gazette
Patent document 6: Japanese Patent Laid-Open No. 2002-139713 gazette
Patent document 7: Japanese Patent Laid-Open No. 2002-1638 gazette
Patent document 8: European Patent Registration No. 856728 gazette B1

The jig mounting apparatus disclosed in each of these documents binarizes an image which is obtained by imaging the identification markers formed by printing, engraving or the like on the eyeglass lens, to detect the identification markers.

However, there were cases where each jig mounting apparatus doubly images the identification markers such as the hidden marks and print marks or the like, and in such a case, there was a problem that it was difficult to discriminate which of the doubly imaged identification markers should be used as a reference to determine the mounting point.

The present invention has been created in view of the above-described problem of the prior art, and an object of the present invention is to provide a jig mounting apparatus that is capable of detecting hidden marks as identification markers more accurately and capable of surely determining an mounting point, and thus capable of surely attaching a jig on an eyeglass lens with good accuracy.

DISCLOSURE OF INVENTION

According to one embodiment of the present invention, a jig mounting apparatus has a detection optical system that detects identification markers of an eyeglass lens, and is structured to determine a mounting point according to the identification markers detected by the detection optical system, and to position a mounting center of a jig used in processing the eyeglass lens on the determined mounting point to automatically mount the jig on a surface of the eyeglass lens.

The detection optical system includes a focusing optical system that focuses a light-emitting optical flux from a light source on the surface of the eyeglass lens on which hidden marks are formed, via an aperture stop, a reflection plate that reflects an optical flux focused by the focusing optical system, and imaging device that is provided on a position that is optically approximately conjugate with the aperture stop, and is configured to focus on a space portion along an optical axis direction from the surface of the eyeglass lens.

According to the jig mounting apparatus of the present invention, the identification markers which are provided on the surface of the eyeglass lens are detected by focusing on the space portion along the optical axis direction from the surface of the eyeglass lens, so that the hidden marks as a identification marker can be prevented from being doubly imaged, an outline of the identification markers can be detected more clearly, and the mounting point can be easily determined. Further, since the mounting point SP can be determined by using hidden marks 21 having higher accuracy than print marks as identification markers and a position of the hidden marks 21 can be detected by enlarging a contour image by using a second imaging device 82, a determination accuracy of the mounting point SP can be further improved.

EXPLANATION OF REFERENCE NUMERALS

Figure 1:
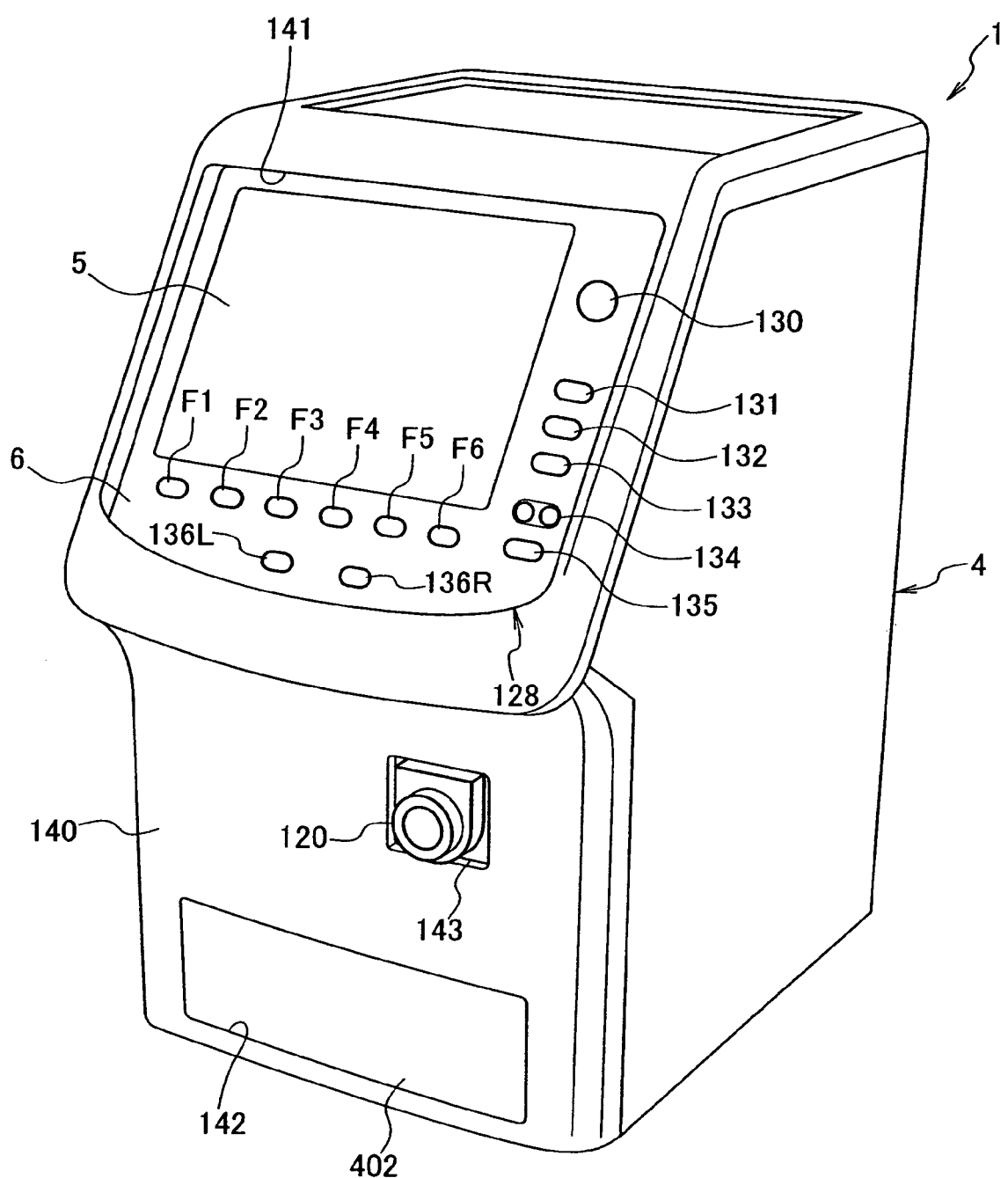
FIG. 1 is a perspective view showing an external view of a jig mounting apparatus according to the present invention.

2 an eyeglass lens
3 a jig
21 a hidden marks
30 a jig supporting mechanism
72 a first detection optical system
73 a second detection optical system
77 an focusing optical system
81 a first imaging device
82 a second imaging device

BEST MODE FOR CARRYING OUT THE INVENTION

Modes for carrying out a jig mounting apparatus according to the present invention will be explained regarding embodiments shown in the accompanying drawings below.

Embodiment 1

Figure 2:
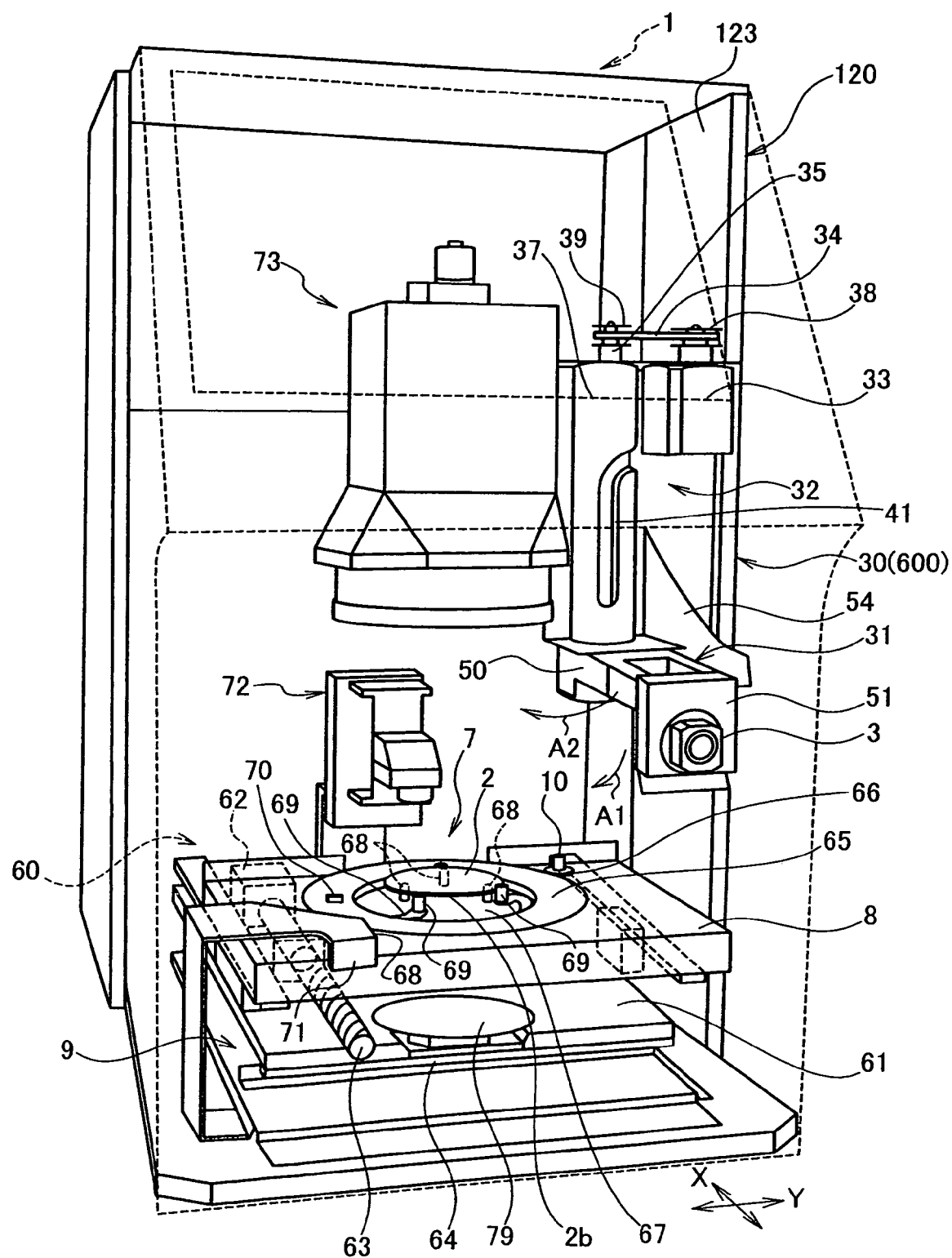
FIG. 2 is a perspective view showing the internal constitution of the jig mounting apparatus shown in FIG. 1.

FIGS. 1 and 2 show one embodiment of a jig mounting apparatus 1 according to the present invention. The jig mounting apparatus 1 of this embodiment accurately mounts a jig 3, which is used for processing a lens that is particularly an eyeglass lens 2, to the eyeglass lens 2 (see FIG. 2). The jig mounting apparatus 1 includes a case 4, a liquid crystal display portion 5 and an operation key portion 6, as shown in FIG. 1.

The jig mounting apparatus 1, as shown in FIG. 2, includes supporting device for the eyeglass lens 2 disposed inside the case 2. The supporting device has a setting plate 7 that sets a base eyeglass lens 2, a stage 8 that mounts the setting plate 7, a drive mechanism 9 that drives the stage 8 in X and Y directions, and a drive mechanism 10 that drives to rotate the setting plate 7 with respect to the stage 8, in the illustrated embodiment.

Figure 3A:
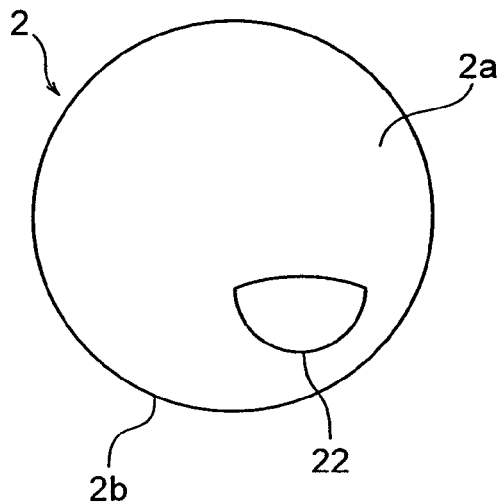
FIG. 3A shows an example of an eyeglass lens for which the jig mounting apparatus according to the present invention is used, and is a plan view of a progressive multi-focal lens.
Figure 3B:
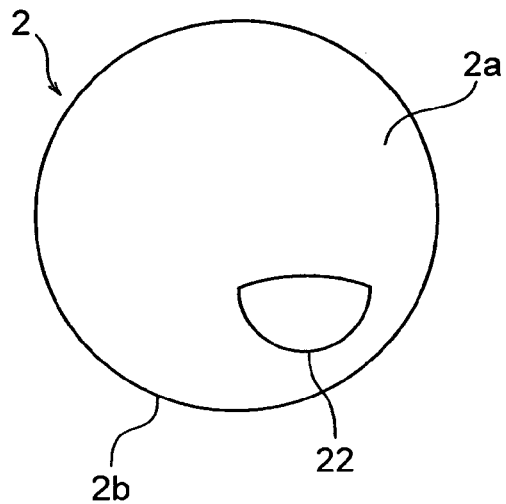
FIG. 3B shows an example of an eyeglass lens for which the jig mounting apparatus according to the present invention is used, and is a plan view of a bifocal lens.
Figure 3C:
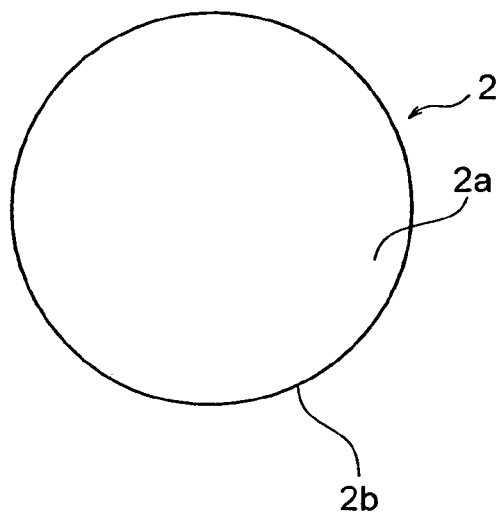
FIG. 3C shows an example of an eyeglass lens for which the jig mounting apparatus according to the present invention is used, and is a plan view of a single-focal lens.

The eyeglass lens 2 includes a progressive multifocal lens where print marks 20 are printed on a surface 2a thereof, identification markers such as hidden marks 21 are engraved on the surface 2a thereof, and optical characteristic information for a distance portion or the like is printed on the surface 2a thereof (see FIG. 3A), a bifocal lens where a segment 22 is provided on a part thereof (see FIG. 3B), a single-focal lens where the print marks 20, the hidden marks 21 and the segment 22 are not provided (see FIG. 3C), and the like.

The jig 3 is automatically mounted on the surface 2a of the eyeglass lens 2 by using an adhesive member (not shown) such as double-sided tape or the like.

The jig 3 is supported by a jig supporting mechanism 30 shown in FIGS. 2, 4, 22, 32, 33, 34 and 35. The jig supporting mechanism 30 includes an arm member 31 for attaching the jig and an arm-driving mechanism 32 that drives the arm portion 31. The arm member 31 has a cup portion 31A and a cylinder portion 31B (see FIG. 35A). The arm-driving mechanism 32 has a drive motor 33, a timing belt 34, a threaded drive rod 35, a reciprocal movement rod 36 and a guide cylinder 37 as shown in FIGS. 5 and 6 in an enlarged manner. The reciprocal movement rod 36 is inserted into the guide cylinder 37 to be reciprocally movable and rotatable.

The timing belt 34 is hooked between an output pulley 38 provided on a drive shaft of the drive motor 33 and a follower pulley 39 provided on a top portion of the threaded drive rod 35. Screw grooves screwed on the threaded drive rod 35 are formed on a central portion of the reciprocal movement rod 36 so as to extend in vertical directions. An engaging pin 40 is provided to be projected on an outer circumference portion of the reciprocal movement rod 36. A cam groove 41 is formed on the guide cylinder 37. The engaging pin 40 is inserted to be movable into the cam groove 41.

Figure 4:
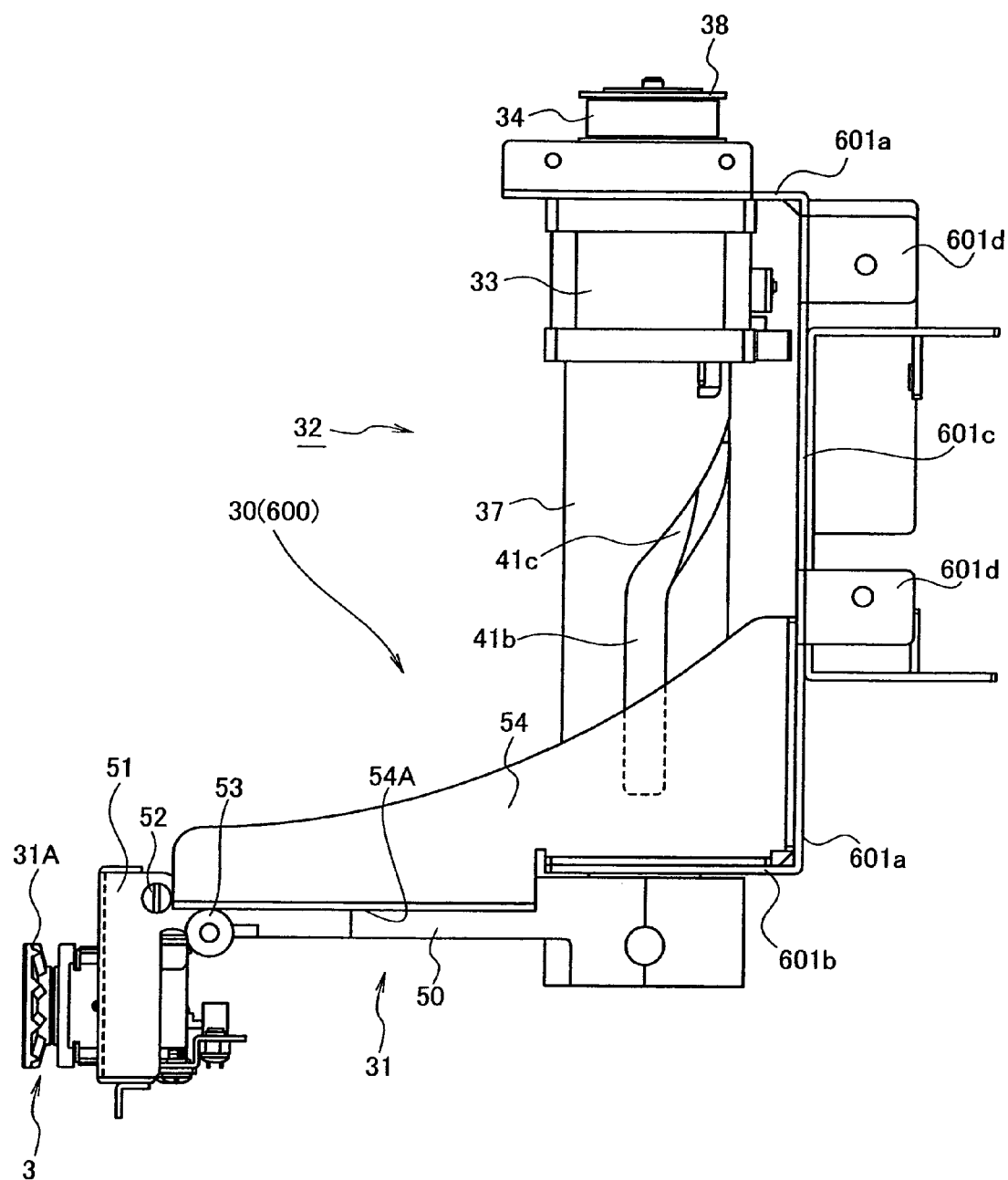
FIG. 4 is a side view showing an assembly of an arm member supporting a jig and an arm-driving mechanism that drives the arm member.
Figure 5:
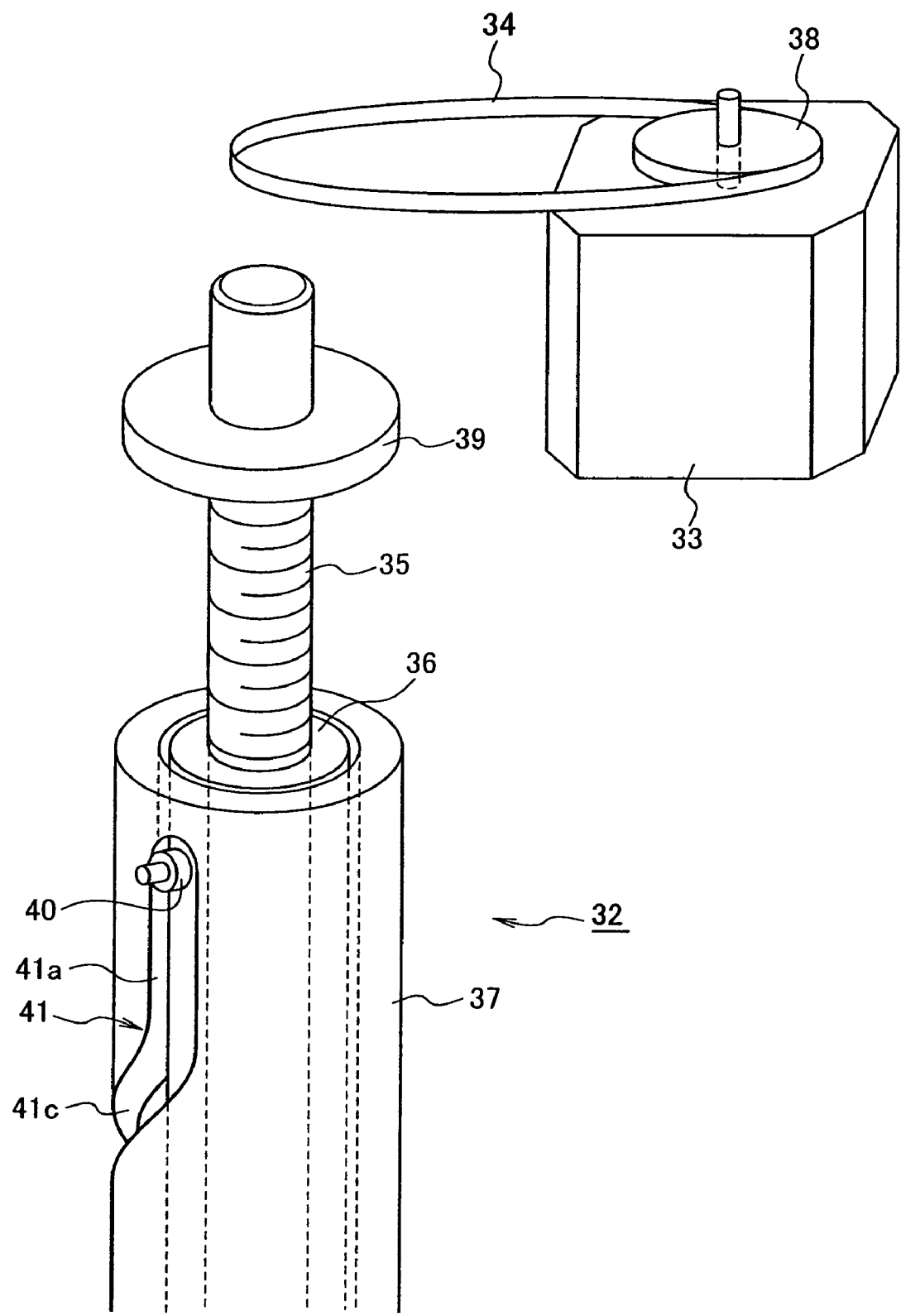
FIG. 5 is a partially exploded perspective view showing a relationship between a guide cylinder of the arm-driving mechanism shown in FIG. 4, a reciprocal movement rod, a threaded drive rod, a drive motor, and a timing belt.
Figure 6:
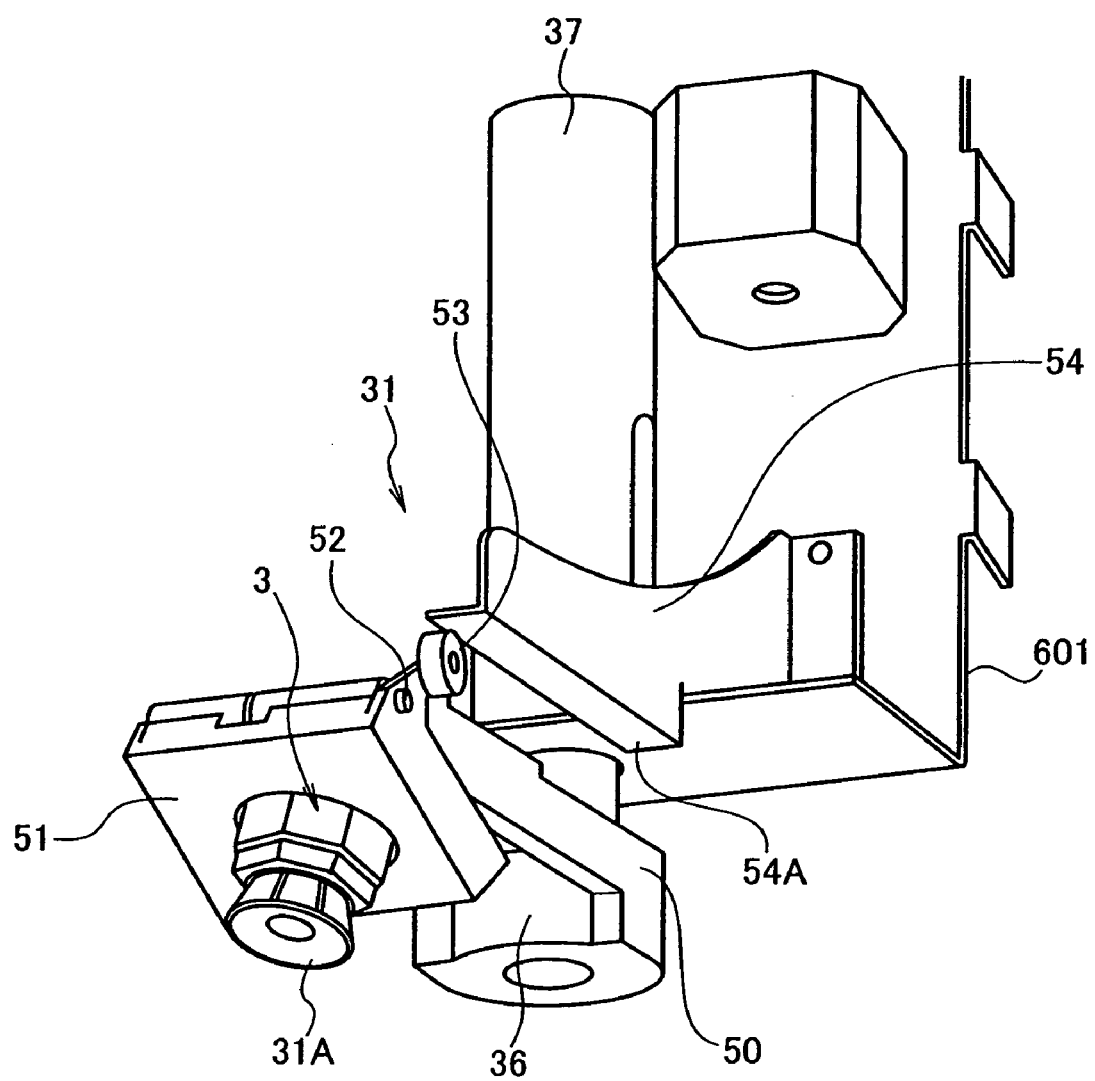
FIG. 6 is a partial perspective view showing a relationship between a pinching arm and a turning arm shown in FIG. 4.

The cam groove 41 is comprised of a straight guide groove 41a extending in vertical directions, a straight guide groove 41b extending in vertical directions in a direction rotated by 90 degrees with respect to the straight guide groove 41a, and a helical guide groove 41c located between the straight guide groove 41a and the straight guide groove 41b to smoothly connect the straight guide groove 41a and the straight guide groove 41b while inclining in a rotating direction (see FIGS. 4 and 5).

The arm member 31 is comprised of a turning arm 50 turned in horizontal directions and a pinching arm 51 turned in vertical directions as shown in FIGS. 4 and 6. The turning arm 50 is attached on a lower end portion of the reciprocal movement rod 36. The pinching arm 51 is attached to be capable of turning around a shaft portion 52 with respect to the turning arm 50. The jig 3 is fixed to be pinched by the pinching arm 51. The pinching arm 51 is energized by a spring against the turning arm 50 such that the cup portion 4A of the jig 3 faces downward. A roller 53 is formed on the pinching arm 51 as shown in FIGS. 5 and 6. The roller 53 is provided on an eccentric position from the shaft portion 52.

The jig supporting mechanism 30 has a cam member 54, and the cam member 54 has a cam surface 54A at a lower portion thereof, which turns the pinching arm 51 in horizontal directions as to resist an energizing force of the spring when the cam surface 54A is engaged with the roller 53 and the reciprocal movement rod 36 is at an elevated position.

Figure 35A:
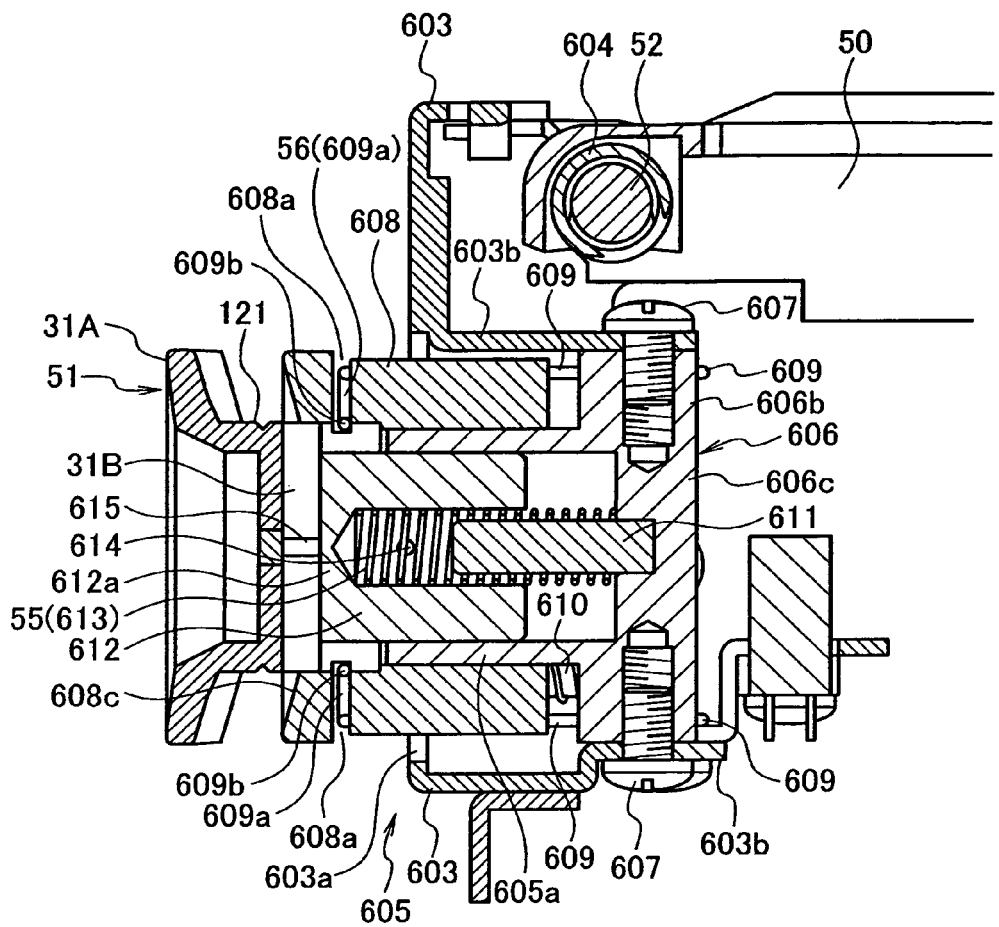
FIG. 35A is a sectional view of a portion of the arm member shown in FIG. 33.

The pinching arm 51 has a spring 55 therein for energizing the jig 3 outside, a pinching spring 56 that pinches the cylinder portion 31B, a drive mechanism (not shown) that drives the pinching spring 56 in a releasing direction, as shown in FIG. 35A. The pinching spring 56, when the jig 3 is pushed in the pinching arm 51, pinches the cylinder portion 31B of the jig 3 as to resist the energizing force of the spring 55, and the pinching spring 56 is released and returns to an original position when the drive mechanism is driven by moving down of the reciprocal movement rod 36.

The pinching arm 51 is turned in an arrow A1 direction with a falling of the reciprocal movement rod 36, and then, the turning arm 50 is turned in an arrow A2 direction and is allowed to go down toward a mounting point (described later) of the eyeglass lens 2 (see FIG. 2).

As shown in FIG. 2, the drive mechanism 9 is comprised of a drive mechanism 60, which is provided on a bottom portion of the jig mounting apparatus 1 and drives the stage 8 in an X-direction, and a drive mechanism (not shown) that drives a pedestal 61 (described later) in a Y-direction. Note that reference numeral 62 denotes a drive motor of the drive mechanism 60, and reference numeral 63 denotes a threaded drive rod directly connected to the drive motor 62. The drive motor 62 and the threaded drive rod 63 are rotatably supported by a pedestal 61, and the pedestal 61 is disposed freely slidably on a rail 64 extending in the Y-direction.

The setting plate 7 has a rotation plate 65, a gear (not shown) is formed on an outer circumference portion of the rotation plate 65, and the gear is engaged with a drive gear 66 that constitutes a part of the drive mechanism 10. The drive gear 66 is rotated by a drive motor (not shown) (see to FIG. 2).

Furthermore, a transparent plate 67 on which the eyeglass lens 2 is mounted is provided in the setting plate 7. A positioning protrusion 68 that decides a height of the eyeglass with respect to a detection optical system (described later) is formed on the transparent plate 67. Pinching arms 69 are provided in the setting plate 7, and the pinching arms 69 serve as a function to pinch an outer circumference portion 2b of the eyeglass lens 2 from three directions.

The pinching arms 69 are turned between a position where the outer circumference portion 2b of the eyeglass lens 2 is pinched and a position where the pinching of the outer circumference portion 2b of the eyeglass lens 2 is released. A turning mechanism (not shown) that turns the pinching arms 69 is provided in the setting plate 7, and the turning mechanism is driven with a rotation of the setting plate 7 (see FIG. 2).

An engaging nail 70 is formed on the rotation plate 65, and the engaging nail 70 is disposed at a position where it is engaged with a pressuring plate 71 with a rotation of the rotation plate 65. When the setting plate 7 advances outside to allow the engaging nail 70 to be engaged with the pressuring plate 71, the case 4 is pushed and opened toward the outside, and thus the transparent plate 67 is exposed to the outside. The pinching of the eyeglass lens 2 by the pinching arms 69 is released in the state where the transparent plate 67 is exposed to the outside (see FIG. 2).

In the case of removing the set eyeglass lens 2 and setting another eyeglass lens 2, when the eyeglass lens 2 is rotatably supported by the transparent plate 67 and a predetermined operation is performed by a key operation on the operation key portion 6, the setting plate 7 is withdrawn inside and the eyeglass lens 2 is pinched by the pinching arm 69.

The jig mounting apparatus has a first detection optical system 72 where an optical path is disposed in the X-direction moving area of the stage 8 and a second detection optical system 73 (see FIG. 2). The first detection optical system 72 is comprised of the same optical element as an optical element used in a lens meter and has a marking mechanism. The first detection optical system 72 serves as a function to measure spherical diopter power (S), cylindrical diopter power (C), axis angle (A) and the like, and to execute marking by detecting the mounting point of the jig 4.

The first detection optical system 72 is also used for determining the mounting point (optical center) of a single-focal lens and has a widely known configuration, and thereby its detailed description will be omitted.

Figure 7:
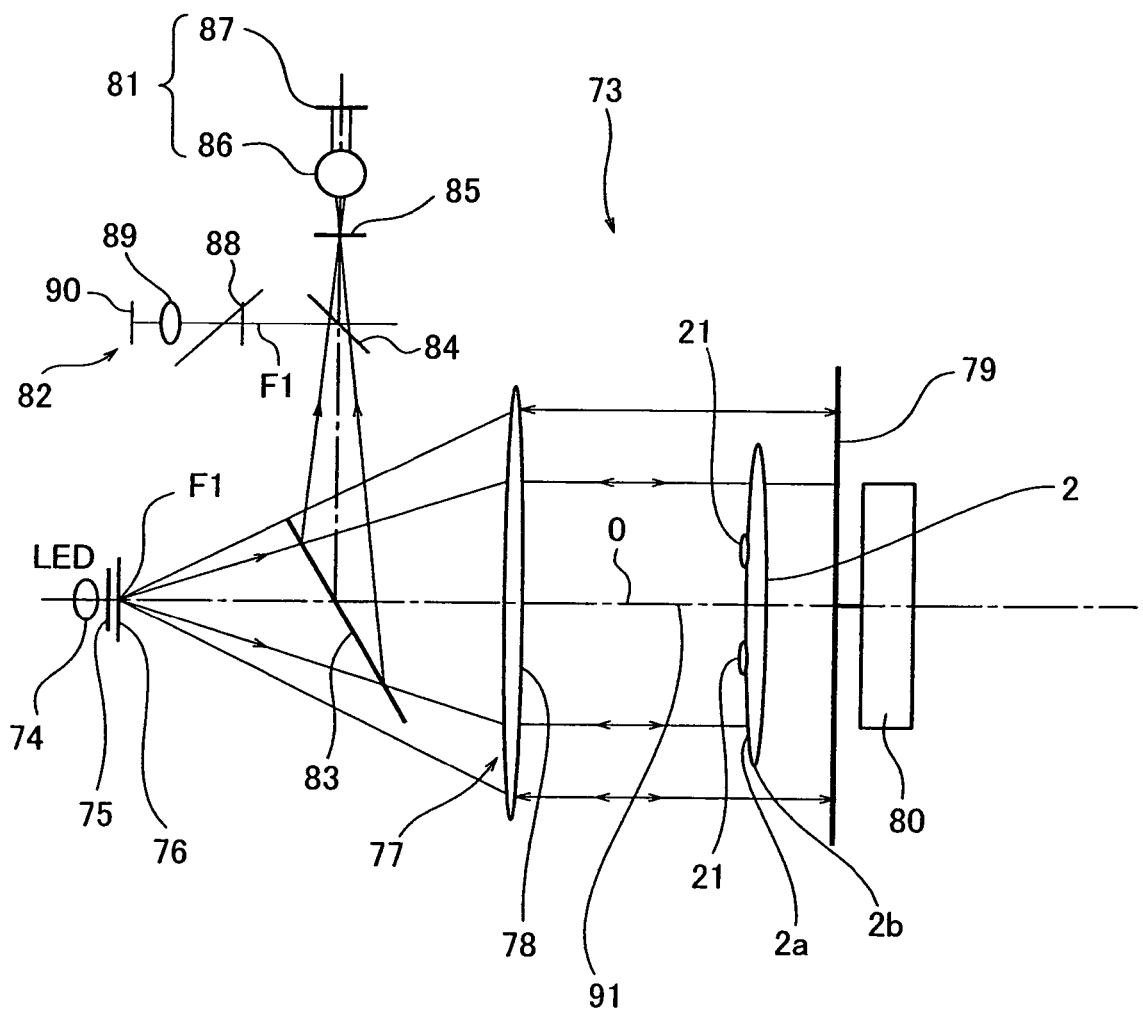
FIG. 7 is a schematic view of a second detection optical system according to the present invention.

The second detection optical system 73 is used for determining the mounting point of a bifocal lens, a progressive multifocal lens or the like, and has a light source 74, a diffusion plate 75 and an aperture stop 76 as shown in FIG. 7. The light source 74 includes an LED (a light-emitting diode) particularly a red light-emitting diode in the illustrated embodiment. The aperture stop 76 is comprised of a pinhole plate, for example. A focusing optical system 77 is disposed at a front area of the aperture stop 76. An infrared optical flux outputted from the red LED 74 reaches the focusing optical system 77 via the diffusion plate 75 and the aperture stop, and is focused on the eyeglass lens 2 by the focusing optical system. The focusing optical system 77 includes a collimator lens 78 in the illustrated embodiment. The collimator lens 78 serves as a function to focus the infrared optical flux outputted from the pinhole plate 76 as a secondary point light source, and transform the infrared optical flux into a parallel optical flux.

The pinhole plate 76 is disposed at a focal point f1 of the collimator lens 78.

Figure 8:
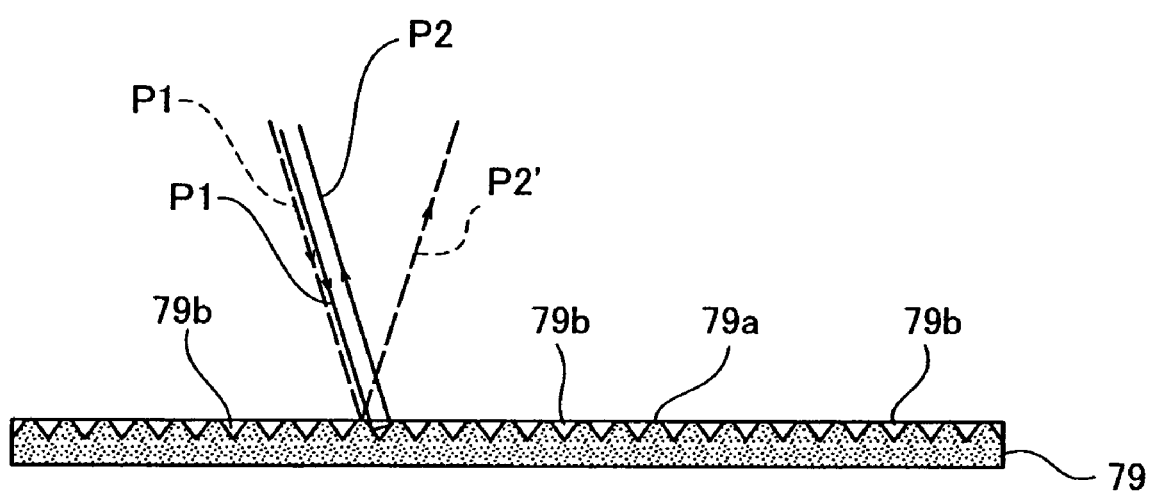
FIG. 8 is a side view schematically showing a reflection plate according to the present invention.

Disposed is a reflection plate 79, which reflects the optical flux focused by the focusing optical system 77. The eyeglass lens 2 is disposed between the focusing optical system 77 and reflection plate 79 such that the surface 2a on which the hidden marks 21 are formed, is facing toward the light source 74. A reflection plane 79a is provided on the reflection plate 79 as schematically shown in FIG. 8. Retroreflective members 79b such as micro corner cube arrays are provided on the reflection plane 79a. The reflection plate 79 has a function to reflect a reflected light P2 based on an incident light P1 that is made incident to the reflection plane 79a, toward a direction where the incident light passed, as shown in FIG. 8. The reflection plate 79 is driven rotatably and inclinably by an appropriate drive mechanism (not shown) including a drive motor 80.

The transparent plate 67, in inspecting the eyeglass lens 2, is disposed on the optical path between the collimator lens 78 and the reflection plate 79 of the second detection optical system 73 (see FIG. 2). The second detection optical system 73 has a first imaging device 81 and a second imaging device 82, as shown in FIG. 7. The first imaging device 81 has a main half mirror 83, which is commonly used with the second imaging device 82, a sub half mirror 84, a pinhole plate 85 disposed in a rear area of the sub half mirror 84, an imaging lens 86 arranged in a rear area of the pinhole 85 and a CCD 87, a two-dimensional light-receiving element or an area sensor, which is disposed in a rear area of the imaging lens. The pinhole plate 85 is provided on a position conjugate with the pinhole plate 76 via the main half mirror 83. The sub half mirror 84 is disposed between the half mirror 83 and the pinhole plate 85.

The second imaging device 82 includes a pinhole plate 88 disposed in a rear area of the half mirror 84, an imaging lens 89 disposed in a rear area of the pinhole plate 88, and a CCD 90, a two-dimensional light-receiving element or an area sensor disposed in a rear area of the imaging lens. The second imaging device 82 is configured to focus on a space portion 91 between the eyeglass lens 2 and the collimator lens 78 along a direction of an optical axis O of the collimator lens 78. Furthermore, the second imaging device 82 may be configured to focus on a space portion between the eyeglass lens 2 and the reflection plate 79.

The first imaging device 81 is used for detecting the print marks 20 as the reference markers, which are provided on the surface 2a of the progressive multi-focal lens as the eyeglass lens 2, and the second imaging device 82 is used for detecting an outline on the outer circumference portion 2b of the eyeglass lens 2, the hidden marks 21 engraved on the surface 2a of the eyeglass lens 2, and an outline of the segment 22 of the bifocal lens.

The imaging magnification of the second imaging device 82 is set about twice the imaging magnification of the first imaging device 81, and the second imaging device 82 has a function to photograph an area narrower than an area photographed by the first imaging device 81 in an enlarged state.

Figure 9:
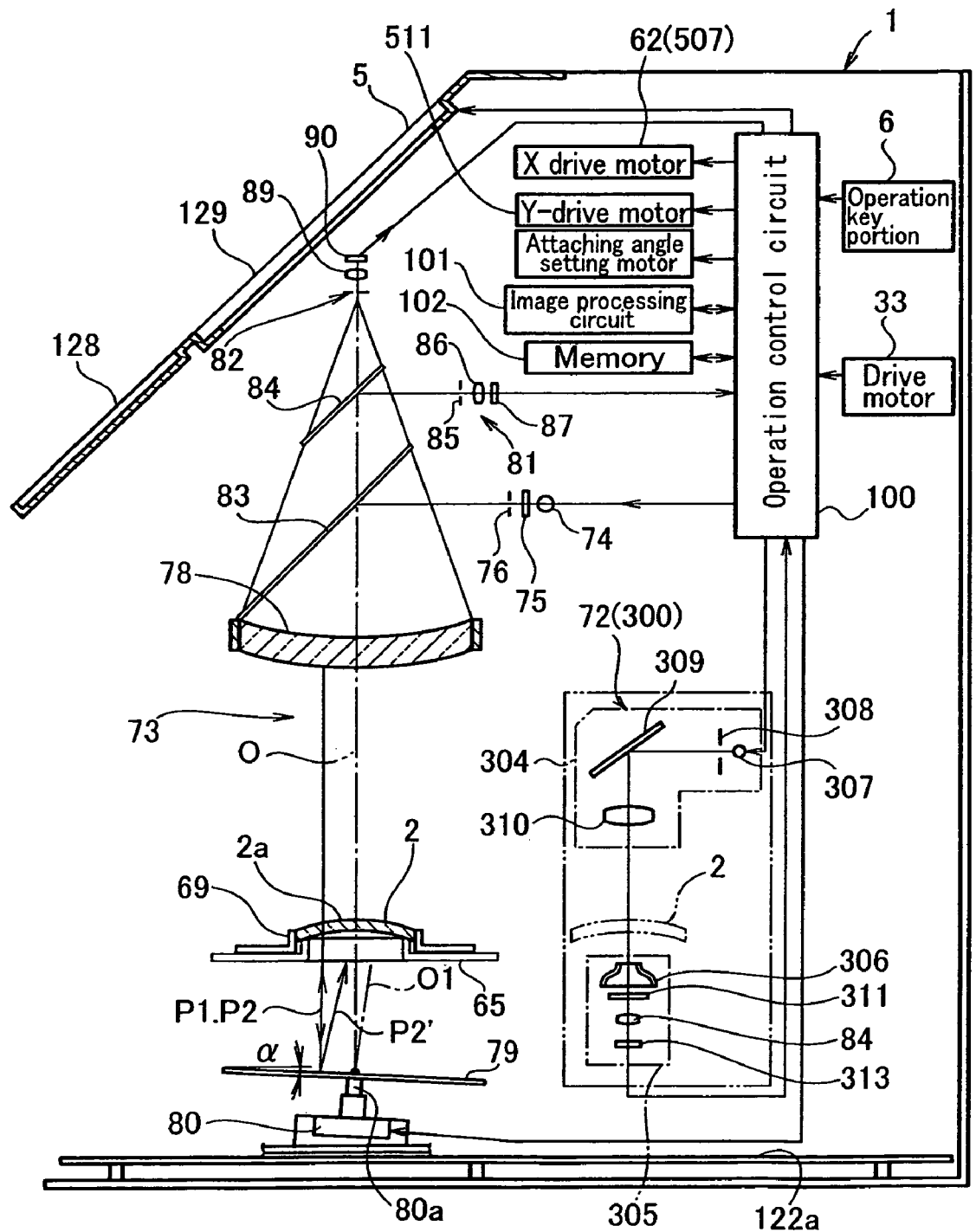
FIG. 9 is an explanatory view showing a relationship between a jig mounting apparatus and an operation control circuit according to the present invention.

The reflection plate 79 is disposed in an inclined state with respect to the optical axis O of the collimator lens 78 as shown in FIG. 9, and the reflected direction of a specular reflection optical flux P2', which is specularly reflected on the reflection plane 79a of the reflection plate 79, is different from that of a reflection optical flux P2, which is reflected on the retroreflective member 79b of the reflection plate 79, as shown in FIG. 9, so that occurrence of a ghost on an image, which is caused by allowing the specular reflection optical flux P2' reflected on the reflection plane 79a to be incident to the first and the second imaging device 81 and 82 is prevented.

Since the retroreflective member 79b is provided on the reflection plate 79, even if either a plus-power eyeglass lens 2 or a minus-power eyeglass lens 2 is disposed in the second detection optical system 73, the refract direction is directed to an incident direction of an inspection direction, so that it is possible to inspect the eyeglass lens 2 regardless of the power of the eyeglass lens 2 while fixing the first imaging device 81 and the second imaging device 82 on the same positions.

Figure 10A:
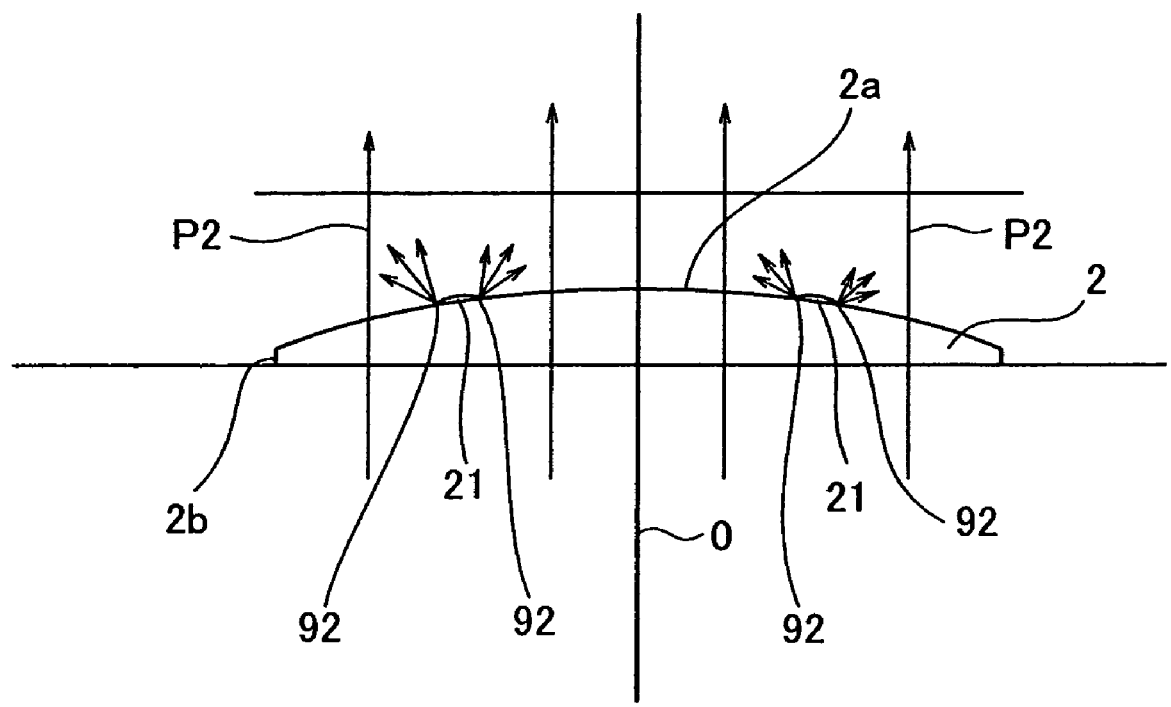
FIG. 10A is an explanatory view showing a state where a reflected light is scattered by an outline portion of an eyeglass lens.
Figure 10B:
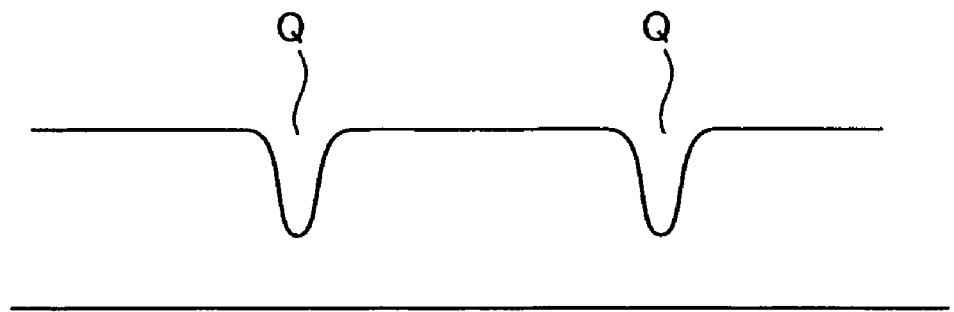
FIG. 10B is a view schematically showing a light quantity distribution of portions of a scattered light in air when the reflected light is scattered in FIG. 10A.

The second imaging device 82 is configured to focus on a position slightly off the surface 2a closer to the aperture stop 75 of the eyeglass lens 2, and as shown in FIG. 10A in an enlarged manner, the reflected light P2 from the reflection plate 79 is scattered by the hidden marks 21 engraved on the surface 2a and by an outline portions 92 of the segments 22 formed on the surface 2a, and a light quantity Q reaching the second imaging device 82 is reduced as shown in FIG. 10B.

Furthermore, a light quantity of the eyeglass lens 2 in the outer circumference portion 2b is reduced by suffering from scattering.

Output signals from the first imaging device 81 and the second imaging device 82 are inputted to an operation control circuit 100 that controls the above-mentioned detection optical system, the first and second imaging device and the like. (see FIG. 9). Thereby contour processing is performed to the images from the first imaging device 81 and the second imaging device 82 by an image processing circuit 101 using a binary method, and a contour image is formed on a screen of the liquid crystal display portion 5. At the same time, the contour image is stored in a memory 102.

Figure 11:
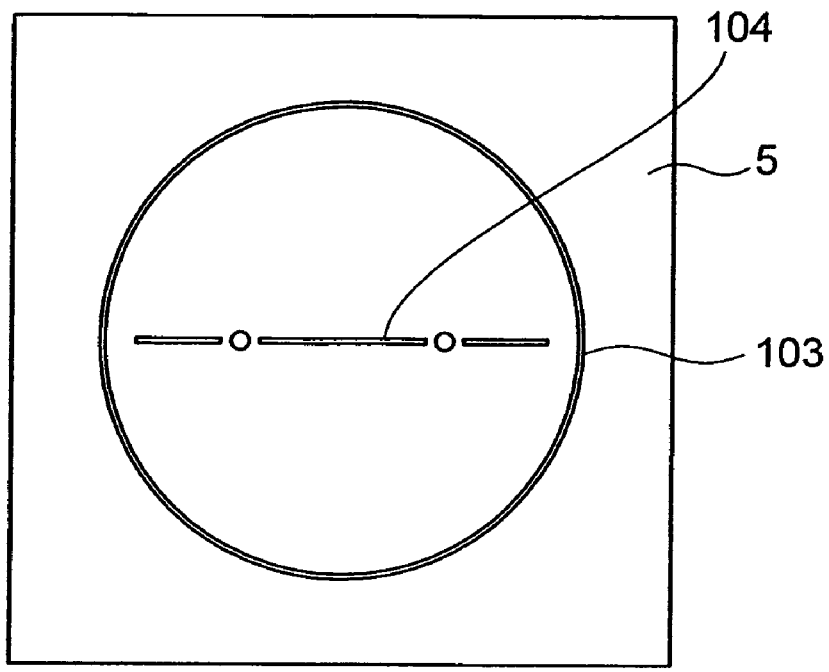
FIG. 11 is an explanatory view showing a contour image of a peripheral portion of an eyeglass lens and a contour image of a print marks, which is imaged by a first imaging device shown in FIG. 7.
Figure 12:
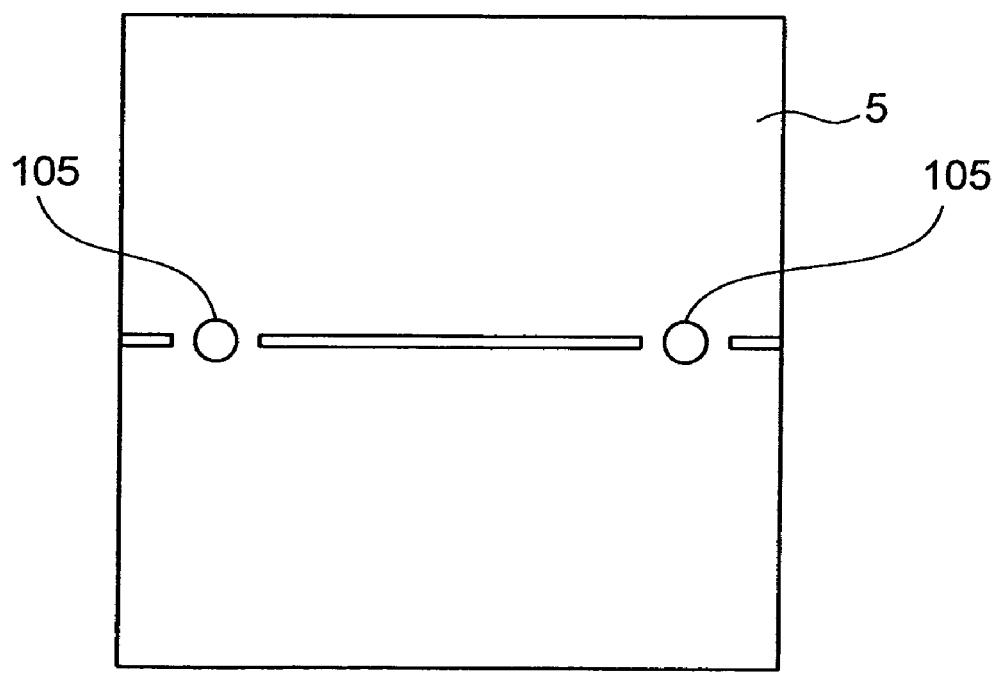
FIG. 12 is an explanatory view showing a contour image of a hidden marks imaged by a second imaging device shown in FIG. 8.

FIG. 11 shows a contour image 103 of the outer circumference portion 2a of the eyeglass lens 2 and a contour image 104 of the print marks 20, which is imaged by the first imaging device 81, and FIG. 12 shows a contour image 105 of the hidden marks 21 of the eyeglass lens 2, which is imaged by the second imaging device 82.

An image output from the image processing circuit 101 is inputted to the operation control circuit 100, the operation control circuit 100 discriminates whether it is the print marks 20, the hidden marks 21 or the segment 22 based on the image from the image processing circuit 101, and the operation control circuit 100 determines the mounting point SP based on the hidden marks 21.

Figure 13:
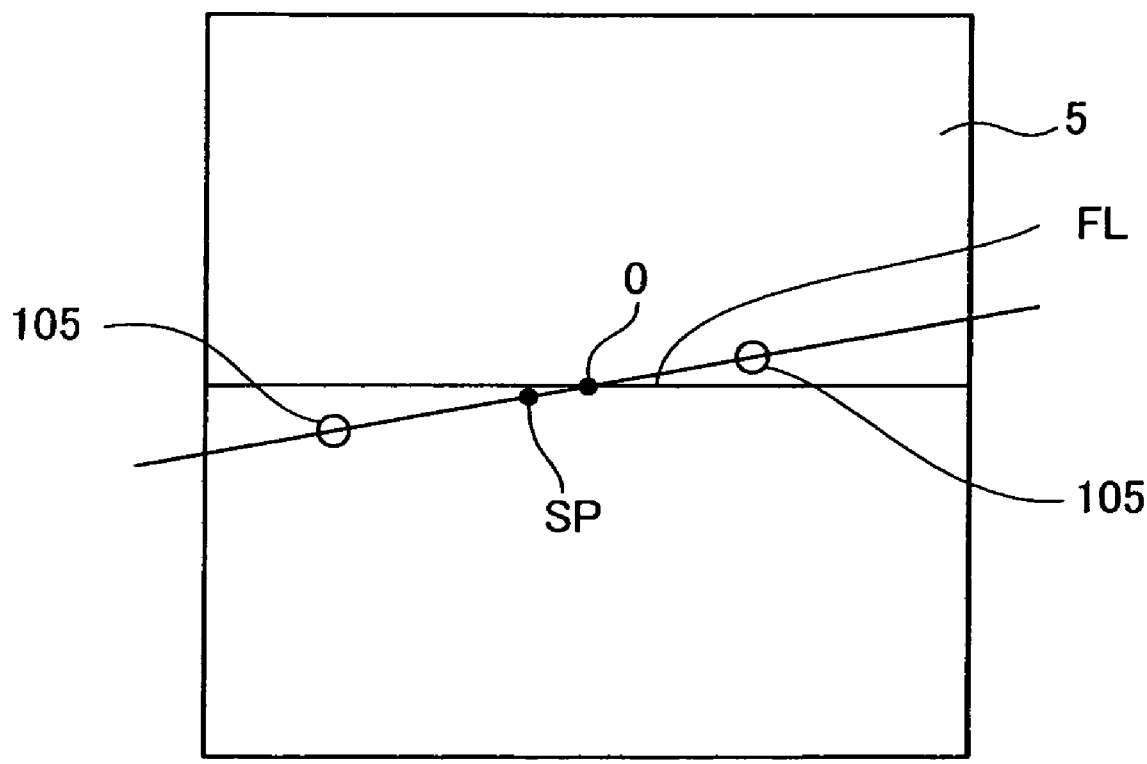
FIG. 13 is an explanatory view for matching a mounting point to an axis center of a jig.

When pinching arm 51 is disposed on the optical path of the second detection optical system 73, an axis center of the jig 3 is allowed to substantially to be matched with the optical axis O of the collimator lens 78. As shown in FIG. 13, when the hidden marks 10 are not matched with a fiducial line FL, the operation control circuit 100 rotates the rotation plate 65 such that the hidden marks 21 become in parallel to the fiducial line FL, and then, when the mounting point SP is not matched with the optical axis O of the collimator lens 78, the operation control circuit 100 drives the stage 8 in XY-directions to a direction where the mounting point SP is matched with the optical axis O.

The operation control circuit 100 drives the drive motor 33 to allow the reciprocal movement rod 36 to go down, and thereby, the cup portion 31A of the jig 3 is disposed to go down while turned so as to face downward and the jig 3 is disposed in an optical path area of the second detection optical system 73 to be mounted on the surface 2a of the eyeglass lens 2 via a double-sided adhesive tape, for example (not shown).

After the jig 3 is mounted on the eyeglass lens 2, the pinching of the jig by the cylinder portion 31B is released by the pinching spring 56, and the jig 3 is pushed out from the pinching arm 51. In such occasion, the pinching spring 56 is returned to the original position with the release of the pinching of the jig 3. The pinching arm 51 returns to the original position with the elevation of the reciprocal movement rod 36.

When the operation control circuit 100 rotates the stage 8 to position the engaging nail 70 on a position facing the pressuring plate 71 and moves the stage 8 in the X-direction, a lid plate 3 is pushed to be opened by the pressuring plate 71, and thereby the eyeglass lens 2 mounted to jig 3 is taken out from the jig mounting apparatus.

Other Embodiments

Next, another embodiment of a jig mounting apparatus for mounting the jig to the eyeglass lens will be explained.

The embodiment described below refers to a jig mounting apparatus which mounts accurately and surely a jig on a eyeglass lens similar to the above-described embodiment, and also refers to a method and an apparatus for judging existence of the eyeglass lens which detects whether or not the eyeglass lens is positioned at a predetermined position when the jig is mounted on the eyeglass lens.

Figure 20:
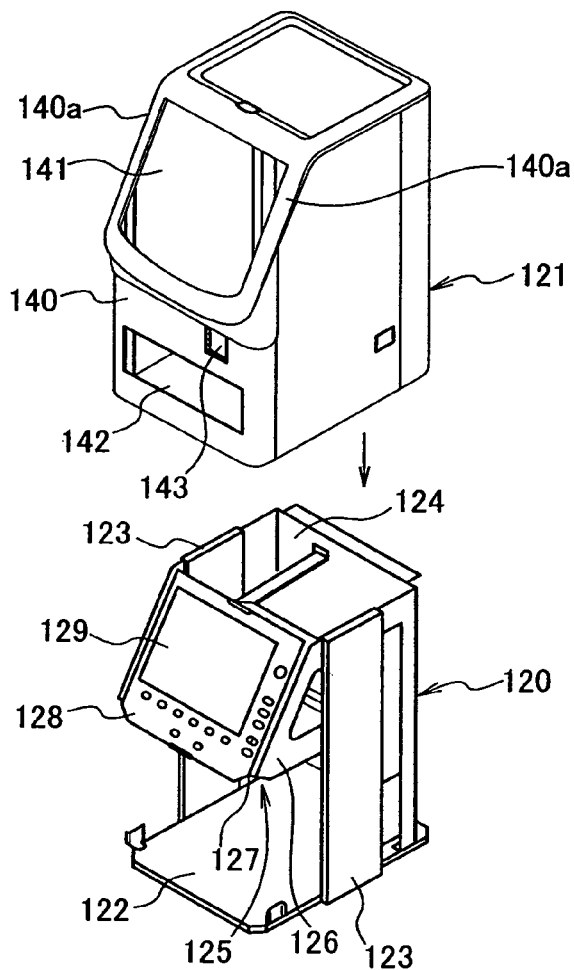
FIG. 20 is an exploded perspective view showing a relationship between an inner frame and an outer frame of the jig mounting apparatus shown in FIG. 1.
Figure 21:
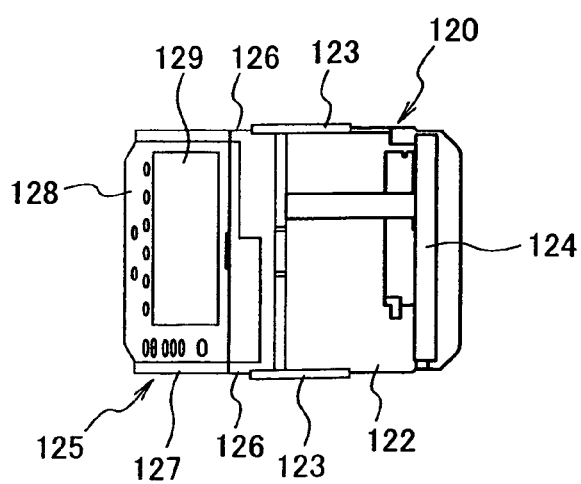
FIG. 21 is a plan view of the inner frame shown in FIG. 20.

Referring to FIGS. 20 and 21, a specific embodiment of the case 4 shown in FIG. 1 is illustrated. The case 4 has an inner frame 120 and an outer frame 121 covering the inner frame.

The inner frame 120 has a bottom plate 122, a side plates 123, 123 that are integrally provided on the central portions in front and rear directions of right/left side edges of the bottom plate 122, and a rear wall 124 integrally provided on the rear edge portion of the bottom plate 122, as shown in FIGS. 20 and 21.

Furthermore, a bracket 125 protruding to a front side is provided on an upper front side of the bottom plate 122. The bracket 125 has triangular side plate portions 126, 126 whose rear edge portions are mounted on the side plates 123, 123, and a connecting plate portion 127 that connects between front edge portions of these side plate portions 126, 126 as shown in FIG. 4. The connecting plate portion 127 is inclined so as to be directed to a rear side as it approaches an upper end. An operating panel 128 and a liquid crystal display device 129 are provided on the connecting plate portion 127. Note that the operating panel 128 and the liquid crystal display device 129 respectively correspond to the operation key portion 6 and the liquid crystal display portion 5 in the above-described embodiment.

Figure 14:
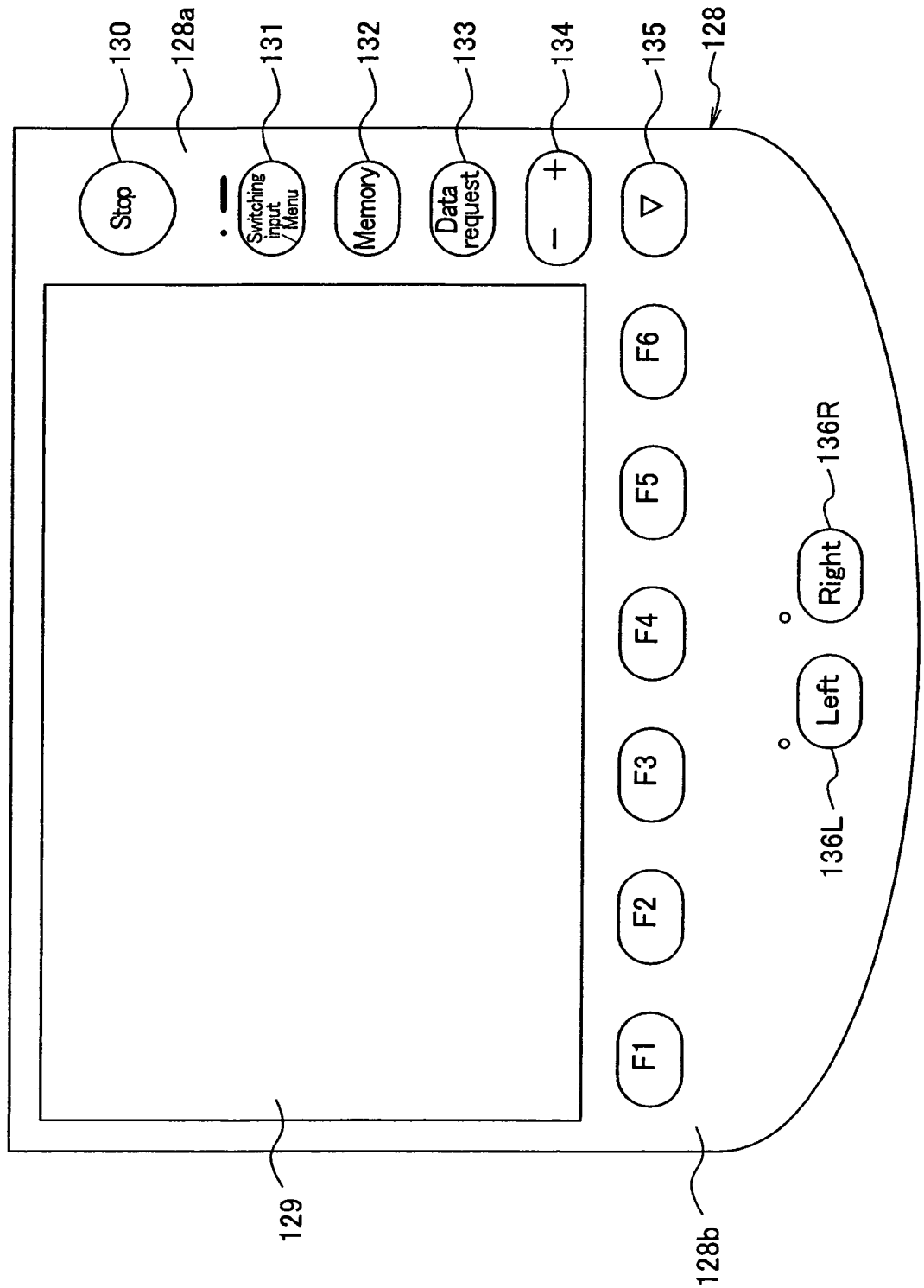
FIG. 14 is an explanatory view of the liquid crystal display device shown in FIG. 1.

The operating panel 128 is used for operating the jig mounting apparatus according to the present invention and for controlling the operation, and has an operating panel portion 128a disposed on a right side of the liquid crystal display device 129 and an operating panel portion 128b disposed on a lower side of the liquid crystal display device 129 as shown in FIG. 14.

The operating panel portion 128a has a "stop" switch 130 that stops measurement, a "switching input/menu" switch 131 that switches an input method of layout data, a "memory" switch 132 that invocates frame data stored in a memory, a "data request" switch 133 that request the frame data, and a "− +" switch 134 for input settings, and a "∇" switch 135 for moving a cursor.

A menu screen can be displayed by pressing the "switching input/menu" switch 131 for a predetermined time (a few seconds, that is, 2 seconds for example) or longer.

Furthermore, when the "switching input/menu" switch 131 is pushed in a stop state after a measurement while waiting for a block instruction (a suction instruction), the "switching input/menu" switch 131 is configured to be used for instructing "defined" after a manual alignment or a position setting of the jig.

When the "memory" switch 132 is pushed in an observation mode of the hidden marks 21, the screen of the liquid crystal display device 129 is configured to be switched to a storing screen of the hidden marks 21.

The "data request" switch 133 is used for requesting transfer of lens shape data (θi, ρi) from a frame shape measurement device (not shown) connected to the jig mounting apparatus 1.

The "− +" switch 134 is used for setting increase/decrease of numerical data of an area that is displayed on the liquid crystal display device 129 and a display color of that is reversely displayed by the "∇" switch 135. Furthermore, the "− +" switch 134 is also used for switching display magnification of the liquid crystal display device 129 in the manual alignment of the jig.

The "V" switch 135 is used for moving a cursor in a data input portion, which is displayed on the liquid crystal display device 129. The cursor mentioned here means the state where any one display color of areas of a plurality of data input frames (data input areas) displayed on the liquid crystal display device 129 is reversed or changed to another color to be capable of inputting data.

The operating panel portion 128b includes function keys F1 to F6 that are arrayed along a lower edge of the liquid crystal display device 129. Furthermore, provided on the operating panel portion 128b are a "left" switch 136L and a "right" switch 136R which specify processing of the eyeglass lens 2 for right eye use or left eye use, switch display, or the like The function keys F1 to F6 are used for settings the processing of the eyeglass lens 2, and also used for response/ selection to a message displayed on the liquid crystal display device 129 on this processing process.

In making settings for the processing of the eyeglass lens 2 (layout screen), the function key F1 is used for inputting a lens type (area for stores) and for specifying a manufacturer of progressive lens, the function key F2 is used for inputting a lens material, the function key F3 is used for inputting a frame type, the function key F4 is used for inputting a chamfer processing type, the function key F5 is used for inputting mirror surface processing, and the function key F6 is used for selecting a course (mode).

Figure 15:
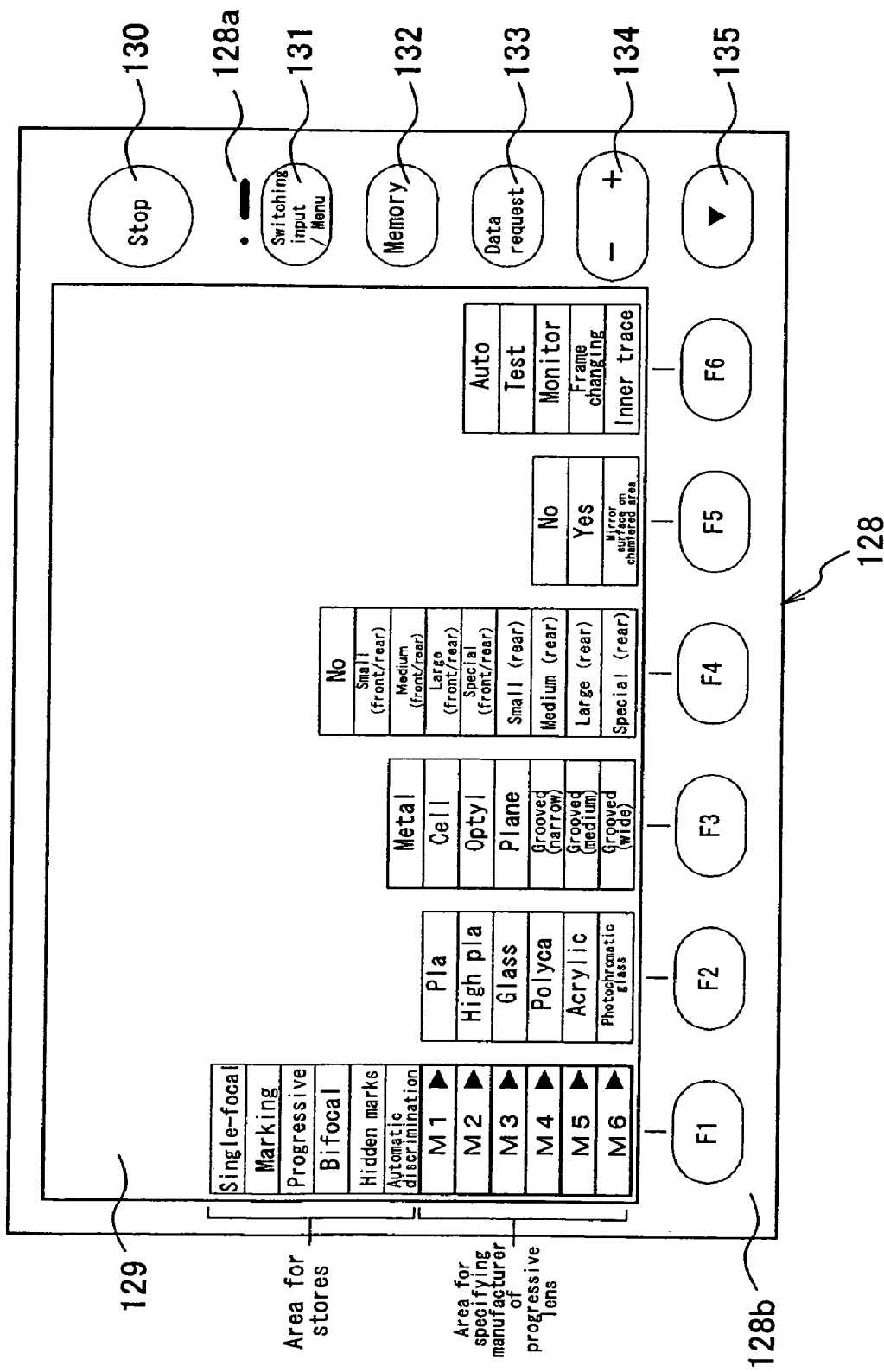
FIG. 15 is an explanatory view of a display content of the liquid crystal display device shown in FIG. 14.

As the type of the eyeglass lens 2, which is inputted by the function key F1, there exist "single-focal", "marking", "progressive", "bifocal", "hidden marks", "automatic discrimination" or the like as shown in FIG. 15. Furthermore, as the progressive lens manufacturer inputted by the function key F1, there exist manufacturers M1, M2, M3 or the like.

Figure 16:
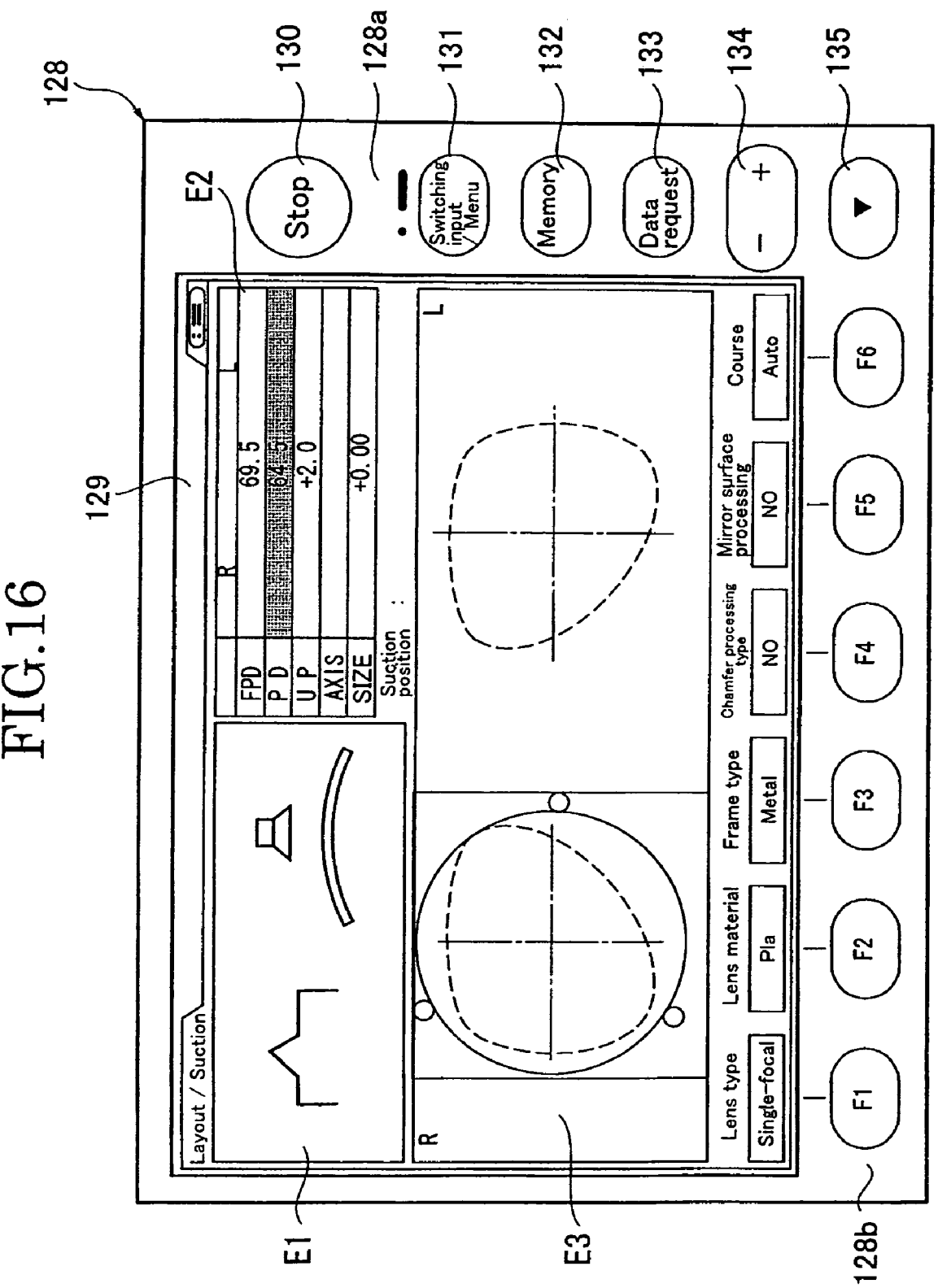
FIG. 16 is an explanatory view showing another example of the display content of liquid crystal display device shown in FIG. 14.

As the lens material inputted by the function key F2, there exist "pla", "high pla", "glass", "acrylic", "photochromatic glass" or the like as shown in FIG. 16. Herein, "pla" means plastic.

As the frame type for eyeglass lens 2 inputted by the function key F3, there exist "metal", "cell", "optyl", "plane", "grooved (narrow)", "grooved (medium)", "grooved (wide)" or the like as shown in FIG. 15.

Note that "point: front hardware", "point: rear hardware", "point: composite hardware" or the like may be included.

As the chamfer processing type of the eyeglass lens 2 inputted by the function key F4, there exist "no", "small (front/rear)", "medium (front/rear)", "large (front/rear)", "special (front/rear)", "small (rear)", "medium (rear)", "large (rear)", "special (rear)" or the like as shown in FIG. 15.

As the mirror surface processing inputted by function key F5, there exist "no", "yes", "mirror surface on chamfered area" or the like as shown in FIG. 15.

As the processing course inputted by the function key F6, there exist "auto", "test", "monitor", "frame changing", "inner trace" or the like as shown in FIG. 15.

Figure 17:
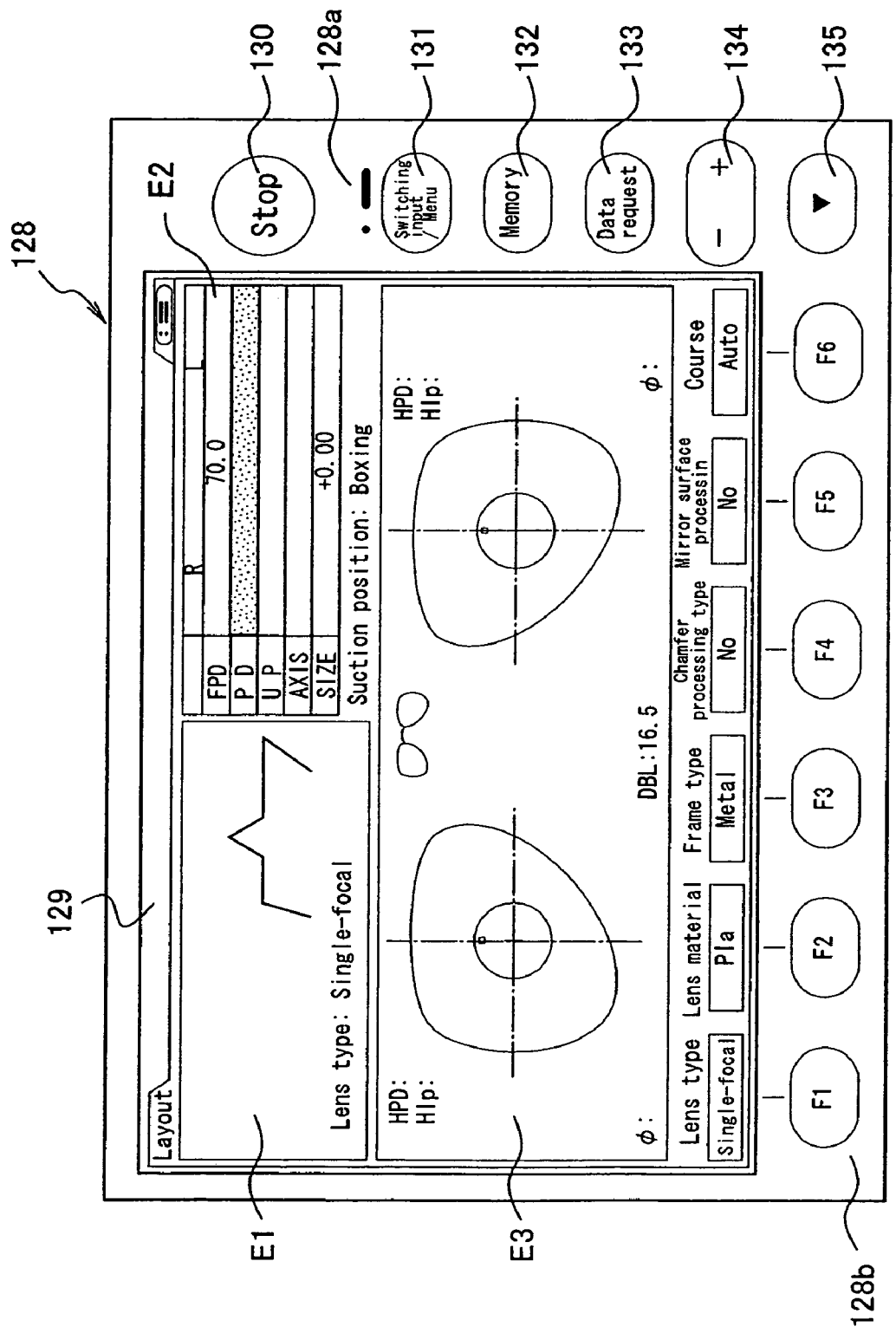
FIG. 17 is an explanatory view showing another example of display content of the liquid crystal display device shown in FIG. 14.

As the layout screen, for example, a "layout/suction" mode for displaying the layout screen to mount the jig 3 on the eyeglass lens 2 as shown in FIG. 16, and for example, a "layout" mode showing a state where the jig is mounted on the eyeglass lens, in which the lens shape information ($\theta i, \rho i$) is hidden as shown in FIG. 17.

In the state where the "layout" mode is selected, the display is made in a sectionalized state in a message display area E1, a numerical value display area E2 and a status display area E3.

On the other hand, the outer frame 121 has a front wall 140 as shown in FIG. 20. An inclined wall portion 140a that is inclined to the rear side is formed on an upper portion of the front wall 140, and an opening 141 for a liquid crystal plate is formed on the inclined wall portion 140a. The liquid crystal display device 129 and the operating panel 128 are disposed in the opening for liquid crystal plate 141 as shown in FIGS. 1 and 14.

Furthermore, a first opening 142 is formed on a lower portion of the front wall 140, and a second opening 143 is formed in a part closer to a right side of a middle portion in vertical directions of the front wall 140.

In the case 4 formed as described above, a detection optical system 300 similar to the detection optical system 73 in the above-described embodiment, the imaging device 82 for detecting the hidden marks 21, a CL measurement device 300 for measuring refraction characteristics or the like of the eyeglass lens 2 are disposed. The CL measurement device 300 has substantially the same structure as the detection optical system in the above-described embodiment, that is, the first detection optical system 72. Herein, the outline of the detection optical system 300, the additional configuration of the reflection plate 79, and the configuration of the CL measurement device 300 will be explained.

The reflection plate 79 is rotated by the drive motor 80 as mentioned in the above-described embodiment. Describing in more details, the reflection plate 79 is mounted on a rotating shaft 80a so as to be rotated by the drive motor 80 as shown in FIG. 9.

As shown in FIG. 9, the drive motor 80 is disposed such that the axis line O1 of the rotating shaft 80a is slightly inclined with respect to the optical axis O of the detection optical system 73 only by a predetermined angle $\alpha$. Thus, the reflection plate 79 is inclined with respect to the optical axis O1 which is directed in an orthogonal direction, only by the predetermined angle $\alpha$. The predetermined angle $\alpha$ is a few degrees (2° to 4°, for example).

Figure 18:
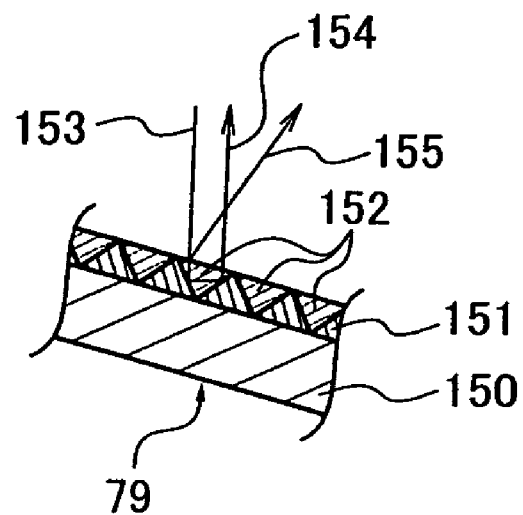
FIG. 18 is a partially sectional view of a reflection plate.

The rotatable reflection plate 79 has a rotation disk 150 made of a metal plate, a resin plate or the like, a reflection sheet 151 adhered on the upper surface of the rotation disk 150 as shown in FIG. 18. The reflection sheet 151 is comprised of a large number of very fine corner cubes 152 that are arrayed on the entire surface in every direction and formed into a unit by resin.

By having such a configuration, an incident optical flux 153 that is made incident to the corner cubes 152 goes out from the corner cubes 152 after reflected at an inside of the corner cubes 152, and becomes an output optical flux 154 that returns parallelly along the incident optical flux 153.

However, a reflected optical flux 155 reflected on a surface of the reflection sheet 151 reflects with a certain angle to the incident optical flux 153 because the reflection plate 79 is slightly inclined by the predetermined angle $\alpha$. Thus, the reflected optical flux 155 does not return parallelly along the incident optical flux 153 like the output optical flux 154, so that it does not cause adverse effects to an overall observation of the eyeglass lens 2 and detection of the hidden marks 21.

Figure 22:
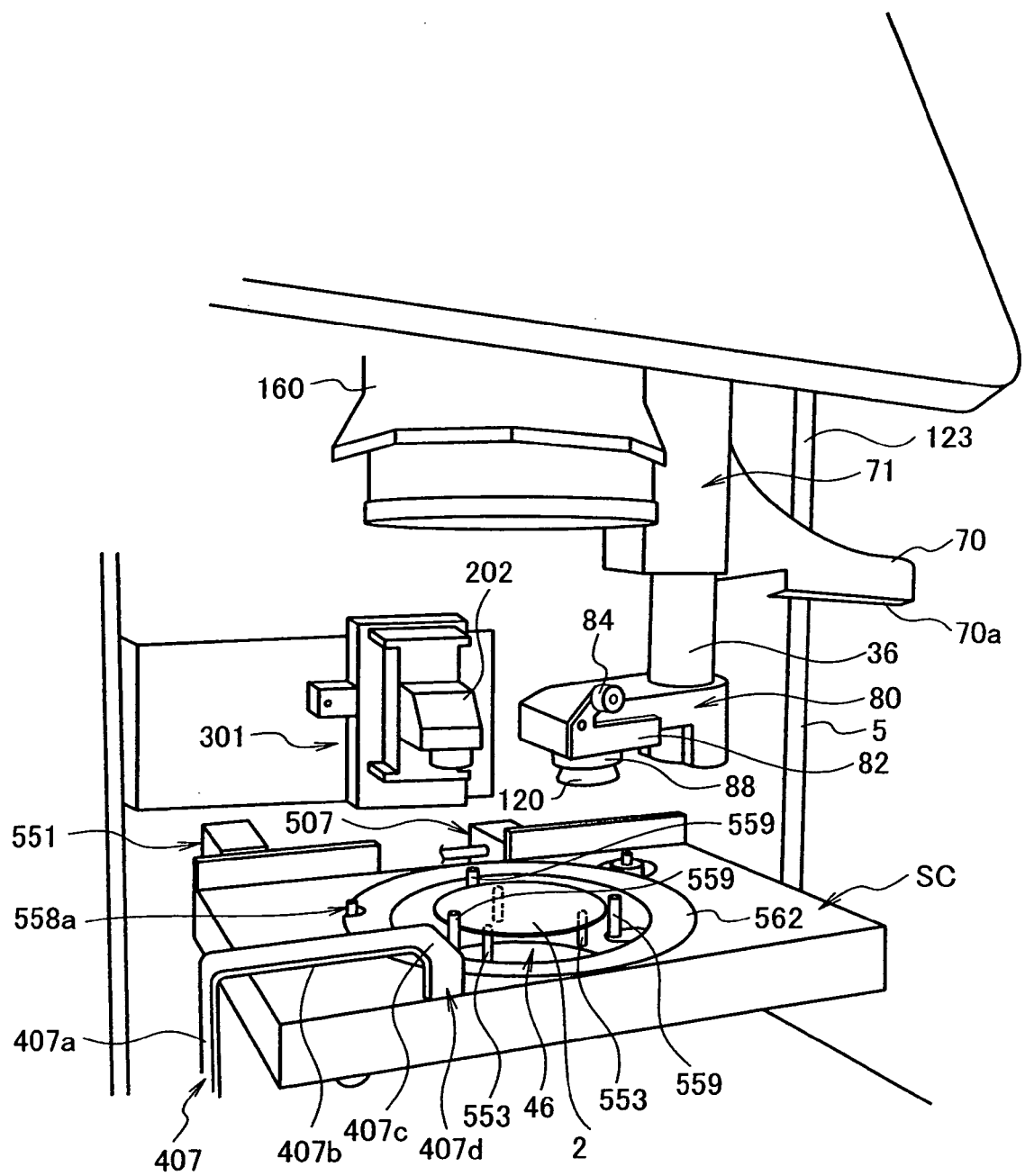
FIG. 22 is an explanatory view of an action of the jig mounting apparatus shown in FIG. 1.

Of such a detection optical system 73 and the imaging device 82 that is a detecting device of the hidden marks 21, optical members other than the reflection plate 79 are housed in an optical member storage case 160 shown in FIG. 22. The optical member storage case 160 is fixed to the inner frame 120 by a bracket (not shown).

Next, further embodiment of the detection optical system 73 will be explained.

Figure 19:
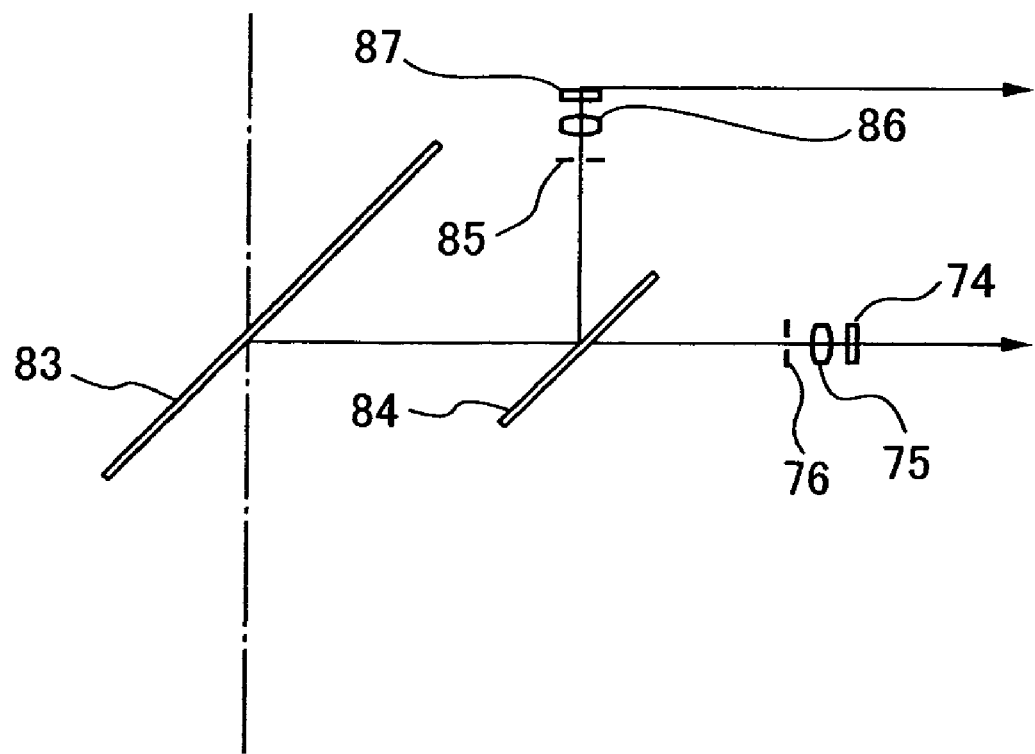
FIG. 19 is a partially explanatory view showing another example of a detection optical system.

The detection optical system 73 can be configured as shown in FIG. 19. Specifically, it may be configured such that the half mirror 84 shown in FIGS. 7 and 9 is disposed between the half mirror 83 and the aperture stop 76, a reflected optical flux reflected by the half mirror 83 is reflected by the half mirror 84 to guide the reflected optical flux to the CCD (a two-dimensional light-receiving element, an area sensor) 87 via the aperture stop 85 and the image-forming lens 86.

Figure 23:
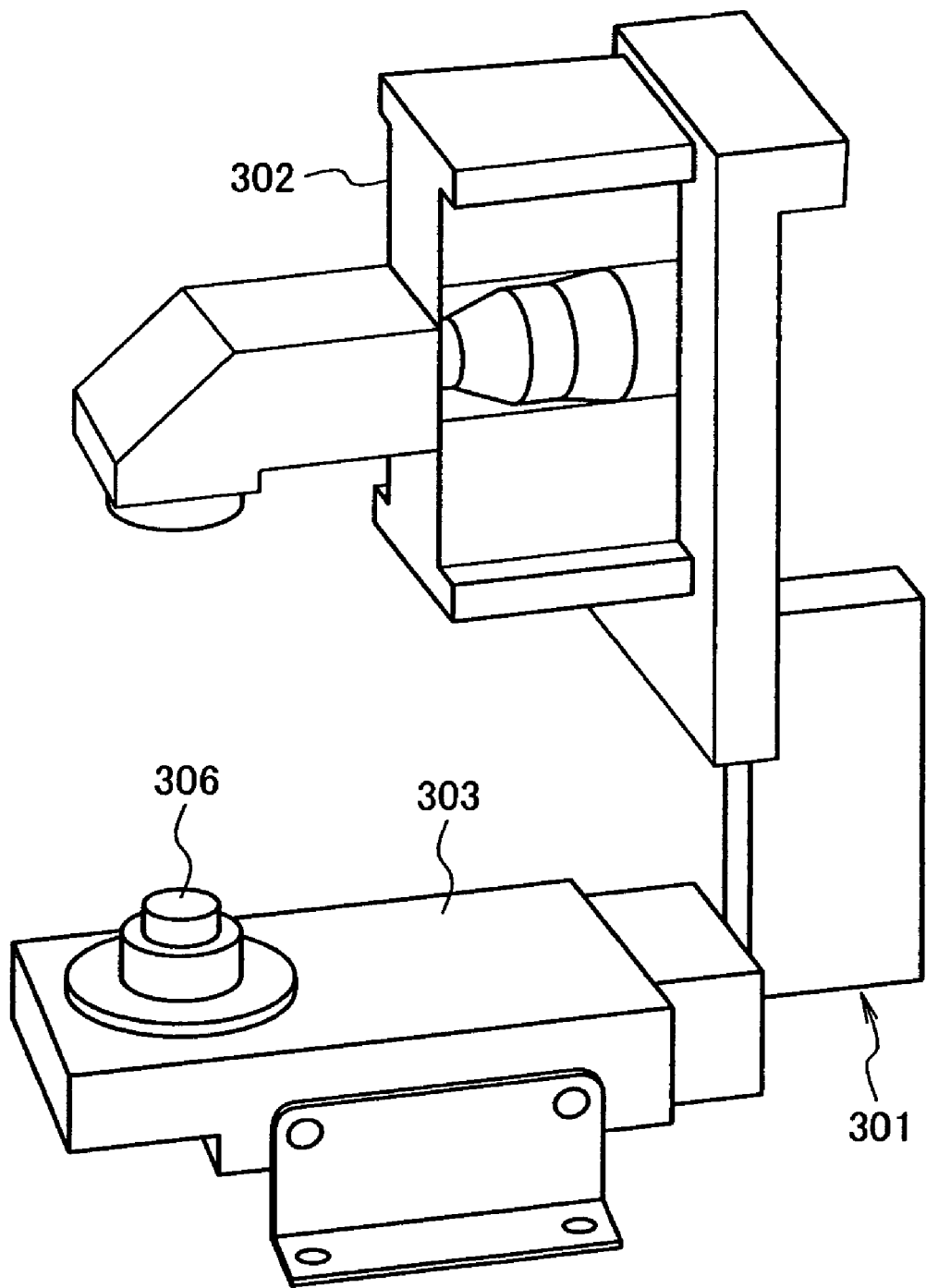
FIG. 23 is a perspective view of a CL measurement device.

The CL measurement device 300 is positioned at a back side (a side of rear wall 124) of the inner frame 120 and is fixed on the base plate 122a (see FIG. 9), and has a bracket 301 as shown in FIG. 23. The bracket 301 has an upper case. 302 and a lower case 303, and a measurement optical flux projection system 304 shown in FIG. 9 is disposed in the upper case 302 and a light-receiving optical system 305 shown in FIG. 9 is disposed in the lower case 303. Reference numeral 306 denotes an eyeglass lens receiver having a conical shape fixed on the lower case 303.

The measurement optical flux projection system 304 has optical members such as a light source 307, a pinhole plate 308, a reflection mirror 309 and a collimator lens 310, which are disposed in order. Furthermore, the light-receiving optical system 305 has optical members such as a pattern plate 311, an image-forming lens 312 and a CCD (two-dimensional light-receiving element, area sensor) 313, which are disposed in order.

Figure 24:
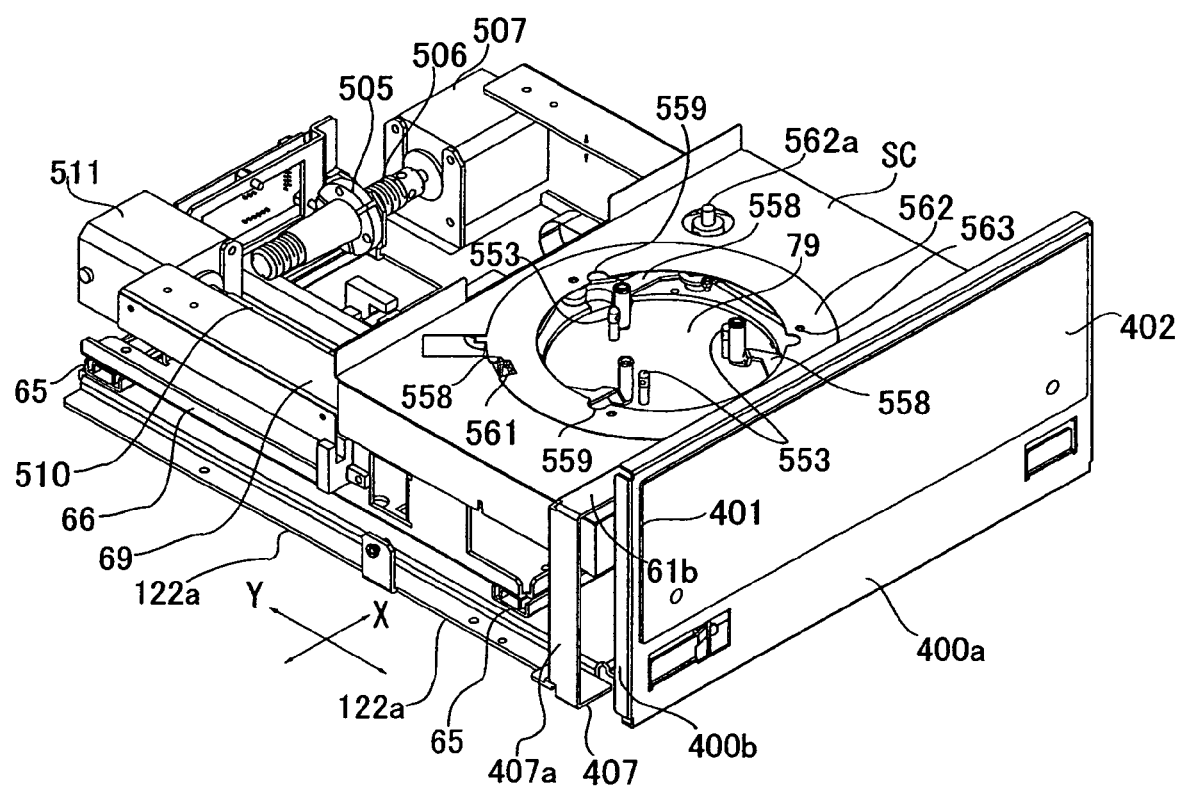
FIG. 24 is a perspective view of a lens holder.
Figure 25:
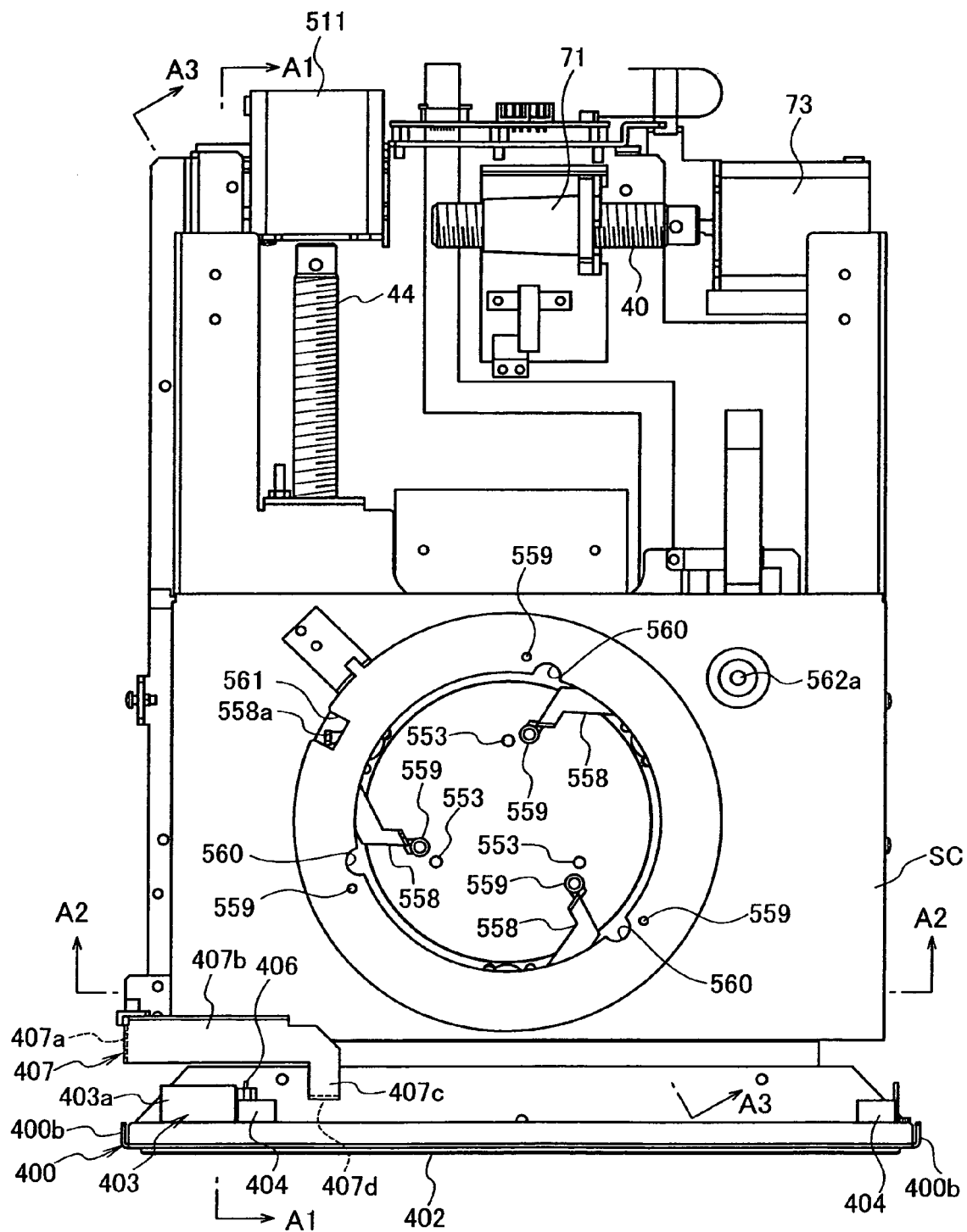
FIG. 25 is a plan view of the lens holder shown in FIG. 24.
Figure 26:
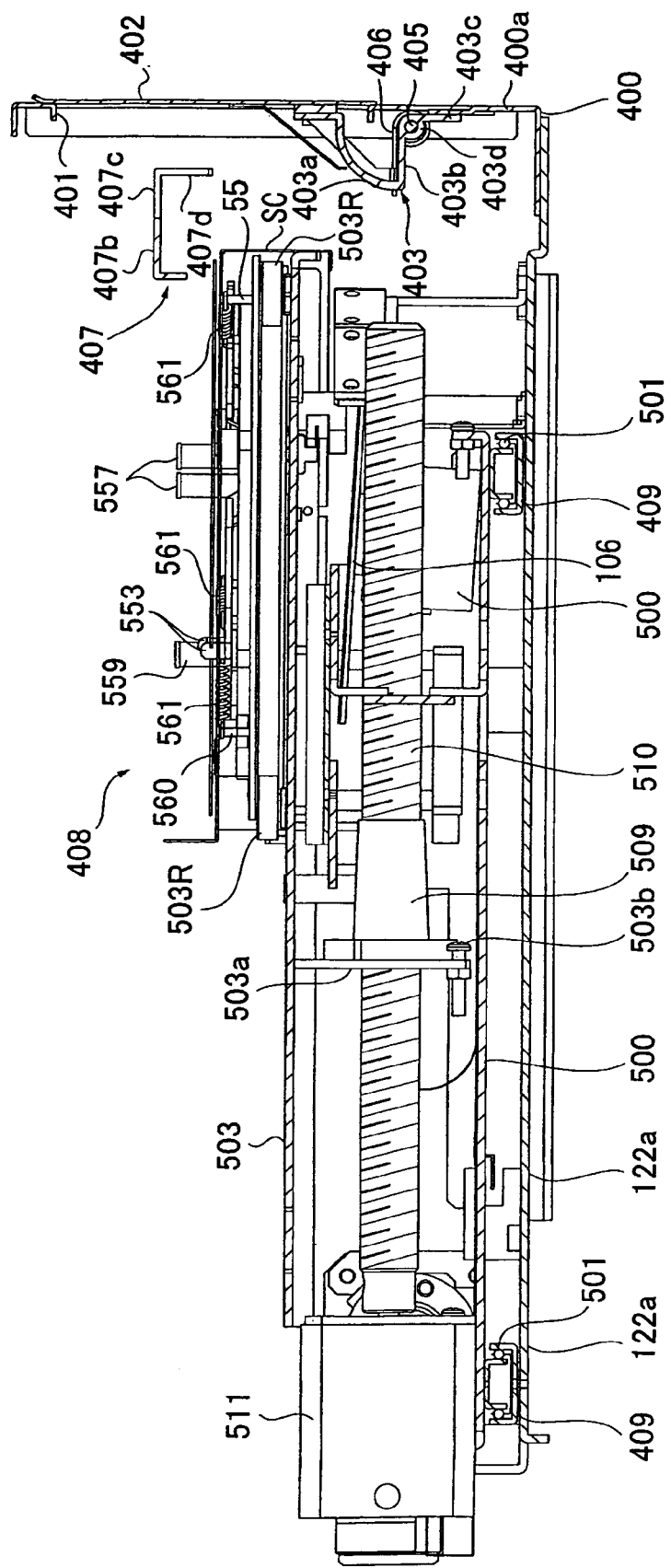
FIG. 26 is a sectional view taken along A1-A1 line of FIG. 24.
Figure 27:
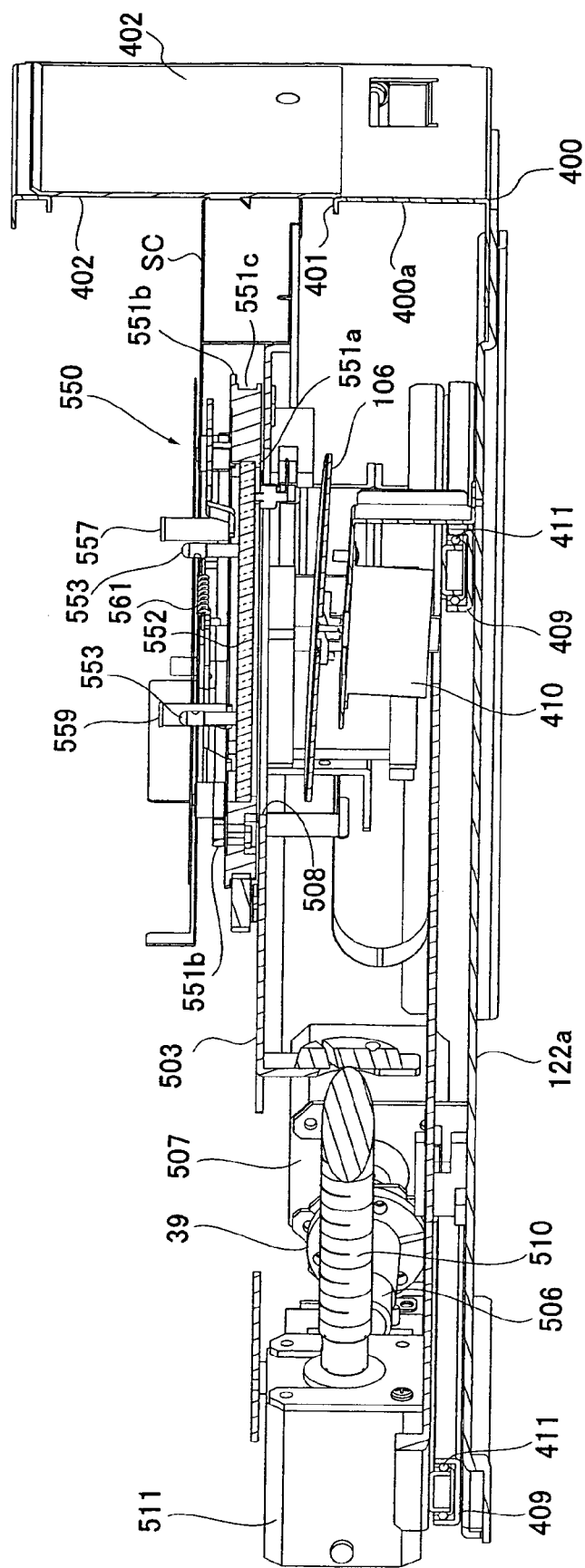
FIG. 27 is a sectional view taken along A3-A3 line of FIG. 24.

An L-shaped bracket 400 is fixed on a front end portion (a side end portion of front wall 140) of the base plate 122a as shown in FIGS. 26 and 27. An opening 401 is formed on a standing plate portion 400a of the bracket 400, and flanges 400b, 400b are integrally formed on side portions of the standing plate portion 400a as shown in FIGS. 24 and 25.

The opening 401 is closed by a lid 402. A block 403 for hinge use, which is shown in FIGS. 25 and 26, is fixed on a lower end portion on one side of an inner surface of the lid 402. The block 403 has a curved portion 403a that curves in a rear downward direction in an arc shape, a straight plate portion 403b that extends from a rear lower end of the curved portion 403a to a side of the lid 402 in a straight state, and a stopper plate portion 403c that is provided to be connected vertically downward with respect to the straight plate portion 403b, as shown in FIG. 26.

On the other hand, bearing members 404, 404 disposed below the opening 401 are integrally provided near the both side portions of the standing plate portion 400a, as shown in FIG. 25.

In the bracket 400, a corner portion 403d between the straight plate portion 403b and the stopper plate portion 403c is held by bearing members 404, 404 via a support shaft 405 to be capable of turning. Furthermore, the block 403 is energized in a counter-clockwise direction in FIG. 26 by a twisted coil spring 406 that is wound to the support shaft 405 and is mounted between the block 403 and the standing plate portion 400a, as shown in FIG. 26.

Thus, the lid 402 is connected to a front surface of the standing plate portion 400a to be capable of closing the opening 401.

In this state, the lid 402 closes the first opening 142 of the outer frame 121.

Next, a mechanism for releasing a lens pinching will be explained.

On a side portion of the base plate 122a, an arm 407 which is allowed to be closer to the lid 402 and used for releasing a lens pinching of the eyeglass lens 2 is fixed as shown in FIG. 24. The arm 407 has a standing portion 407a, a horizontal portion 407b extending along the lid 402 from an upper end of the standing portion 407a, a plate portion 407c extending from a top of the horizontal portion 407b to a side of the lid 402, and a stopper nail portion 407d extending downward from a top of the plate portion 407c, as shown in FIGS. 22 and 25.

A lens holding/moving mechanism of the eyeglass lens is described as follows.

A lens holding/moving mechanism 408 is also disposed on the base plate 122a. The lens holding/moving mechanism 408 has a lateral guide rail (an X-direction guide rail) 409 disposed on a rear end portion of the base plate 122a and near the arm 407, a laterally moving member (an X-direction moving member) 500 disposed on the lateral guide rail 409, and a bearing 501 that supports the laterally moving member 500 freely movably on the lateral guide rail 409 in a lateral direction (the X-direction) as shown in FIGS. 24, 26 and 27. Furthermore, the above-described drive motor 80 is mounted on the laterally moving member 500.

Figure 28:
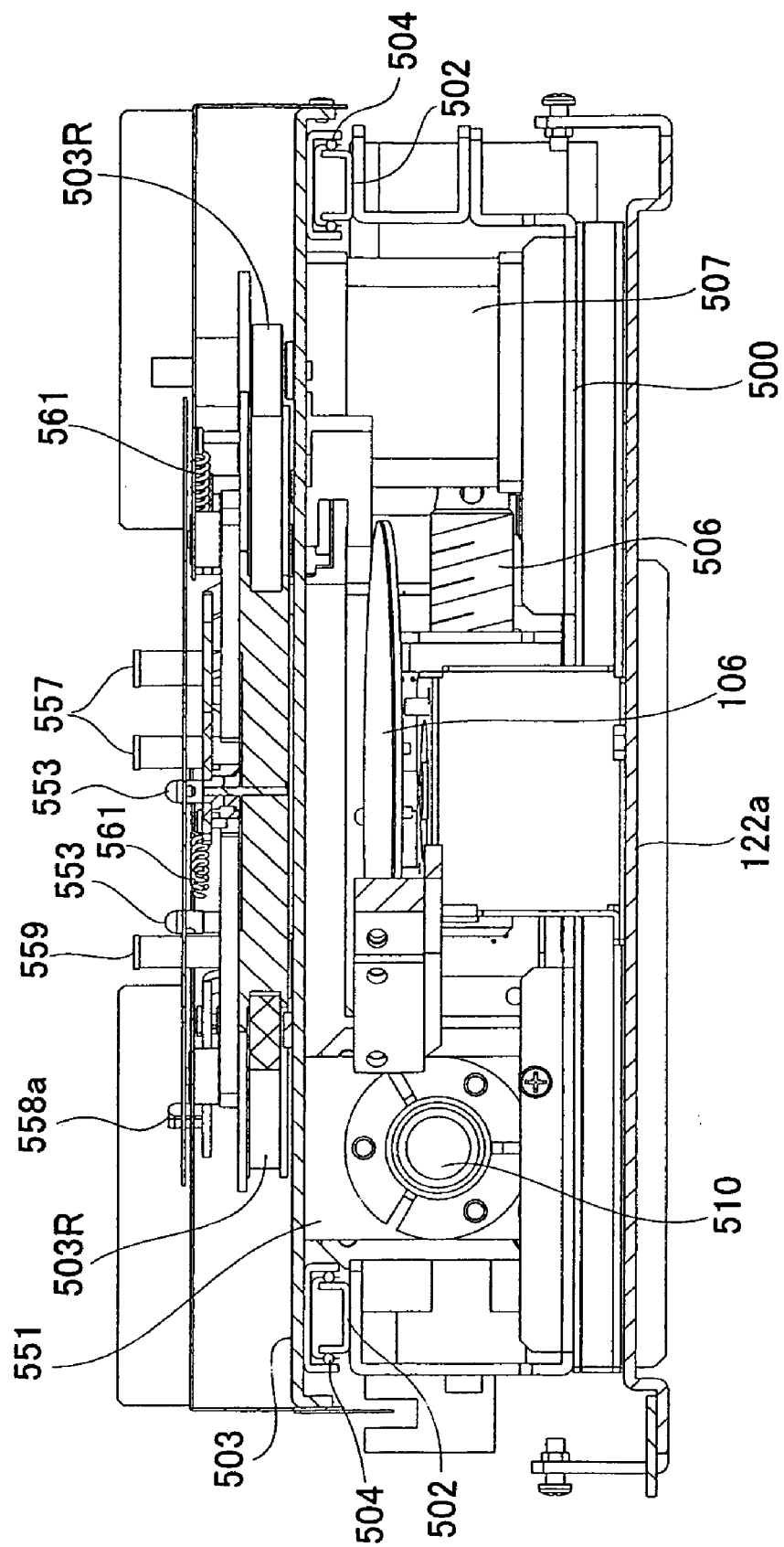
FIG. 28 is a sectional view taken along A2-A2 line of FIG. 24.

The lens holding/moving mechanism 408 has forward/backward guide rails 502 which are severally fixed on both side portions of the laterally moving member 500 in forward/backward directions (Y-directions that are vertical directions to the page surface of FIG. 28), a plate-shaped forward/backward moving member (a forward/backward moving stage, a Y-direction moving member) 503 disposed on the guide rail 502, and bearings 504 that support freely movably the forward/backward moving member 503 on the guide rails 502 in forward/backward directions as shown in FIG. 28. The above-described drive motor 80 is mounted on the laterally moving member 500.

A nut member 505 is fixed to the laterally moving member 500 as shown in FIG. 24, and a lateral feeding screw (an X-feeding screw) 506 which has an axis line directed in lateral directions is screwed into the nut member 505. The lateral feeding screw 40 is rotated by a pulse motor (an X drive motor) 507 fixed on the base plate 4a. A disk-shaped light transmission hole 508 (see FIG. 27) is formed on the forward/backward moving member 503 to be facing to the reflection plate 79 mounted on the drive motor 80.

A nut member 509 is fixed on the forward/backward moving member 503 via a plate 503a and a fixing screw 503b as shown in FIG. 26, and a forward/backward feeding screw (a Y-feeding screw) 510 which has an axis line directed to forward/backward directions is screwed into the nut member 509. The forward/backward feeding screw 510 is rotated by a pulse motor (a Y-drive motor) 511 fixed on the laterally moving member 500.

Next, a lens holder for holding the eyeglass lens 2 will be explained.

A lens holder 550 is disposed in the light transmission hole 508 of the forward/backward moving member 503 as shown in FIGS. 24 to 28.

The lens holder 550 has a ring-shaped gear 551 which has a lower portion of an inner circumference where a support flange 551a is provided as shown in FIG. 27. The ring-shaped gear 551 has a gear portion 551b that extends in a circumference direction on a circumference surface and a circular groove 551c. A plurality of rollers 503R which are mounted on the forward/backward moving member 503 freely rotatably, are engaged with the circular groove 551c as shown in FIG. 29B.

The plurality of rollers 503R are disposed along the light transmission hole 508 and holds the ring-shaped gear 551 freely rotatably on the forward/backward moving member 503.

The lens holder 550 has a transparent disk 552 for supporting lens which is fitted in the ring-shaped gear 551 and supported freely detachably on the support flange 47a, and a shaft-shaped lens receiver 553 provided on the transparent disk 552 to be protruded with an interval of 120°. Note that the transparent disk 552 may be made of glass, plastic or the like.

Figure 29A:
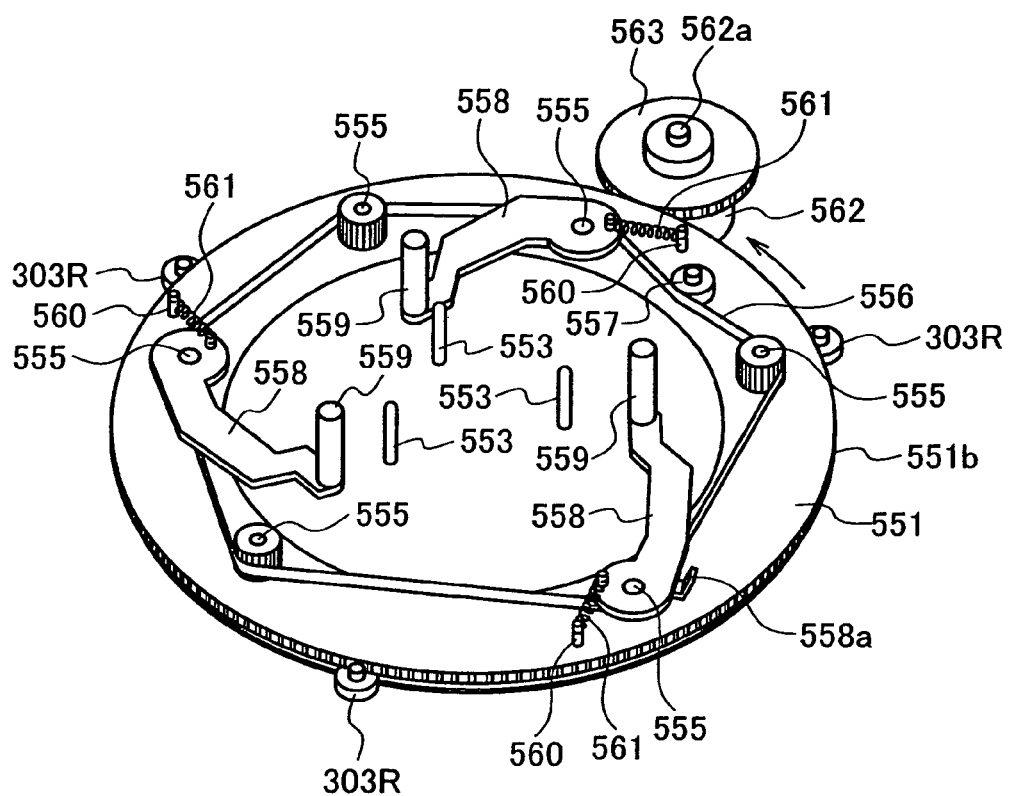
FIG. 29A is a schematic perspective view for explaining a principal portion of the lens holder.
Figure 29B:
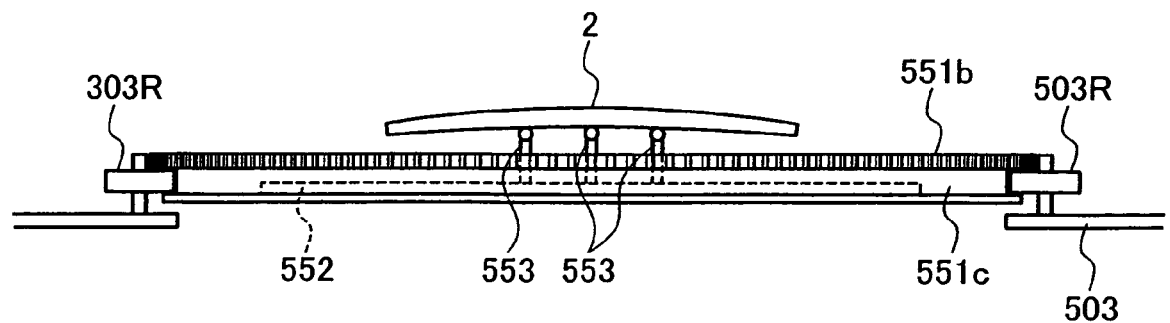
FIG. 29B is a lateral sectional view of the lens holder in FIG. 29A.

Six small gears 555 which are disposed with an equal pitch (an interval of 60°) in a circumference direction are mounted freely rotatably on the ring-shaped gear 551, and a timing belt 556 is hooked around the six small gears 555 as shown in FIG. 29A. Moreover, a tension roller 557, which is mounted freely rotatably on the ring-shaped gear 551, is disposed adjacently on an outer circumference surface of the timing belt 556.

An end portion (a base end portion) of each arm 558 is severally fixed on every other small gear 555, and a lens-holding shaft (a lens-holding member) 559 extending in vertical directions is mounted on another end portion (a top portion) of each arm 558.

A spring receiving pin 560 is mounted on the ring-shaped gear 551 to be adjacent to the end portion of the arm 558, and a coil spring 561 is provided between the spring receiving pin 560 and the end portion of the arm 558. The coil spring 561 energizes the arm 558 such that the top portion of the arm 558 turns toward a center of the ring-shaped gear 551.

The small gears 555 and the end portions of the arms 558 which have such a configuration are covered with a cover ring 562 as shown in FIGS. 24 and 25. The cover ring 562 is fixed on the ring-shaped gear 551 by screws 563. Furthermore, engaging cutouts 560 that engage the lens-holding shafts 559 are formed on an inner circumference surface of the cover ring 562 in the circumference direction with intervals of 120°. Furthermore, a cutout 561 is formed on an outer circumference surface of the cover ring 562.

Furthermore, an engaging protrusion 558a protruding upward from the cutout 561 is formed on the end portion of one of the three arms 558.

Furthermore, as shown in FIG. 29, an attaching angle setting motor 562 that is comprised of a pulse motor or the like is fixed on the forward/backward moving member 503, and a gear 563 is attached to the output shaft 562a of the attaching angle setting motor 562. The gear 563 is engaged with the gear portion 551b of the ring-shaped gear 551. Therefore, the ring-shaped gear 551 is rotated by rotating the gear 563 by the attaching angle setting motor 562.

The forward/backward moving member 503 is covered with a stage cover SC except for the area of the lens holder 550.

Figure 30:
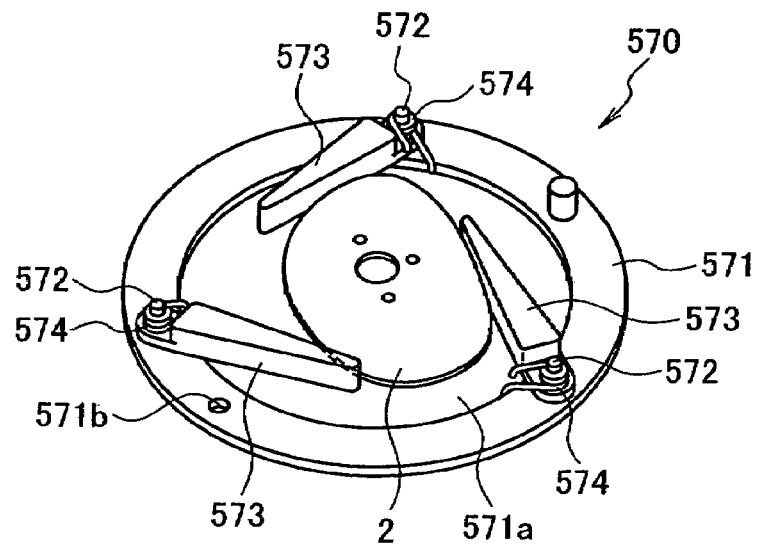
FIG. 30 is a perspective view of a frame-changing lens holder.
Figure 31:
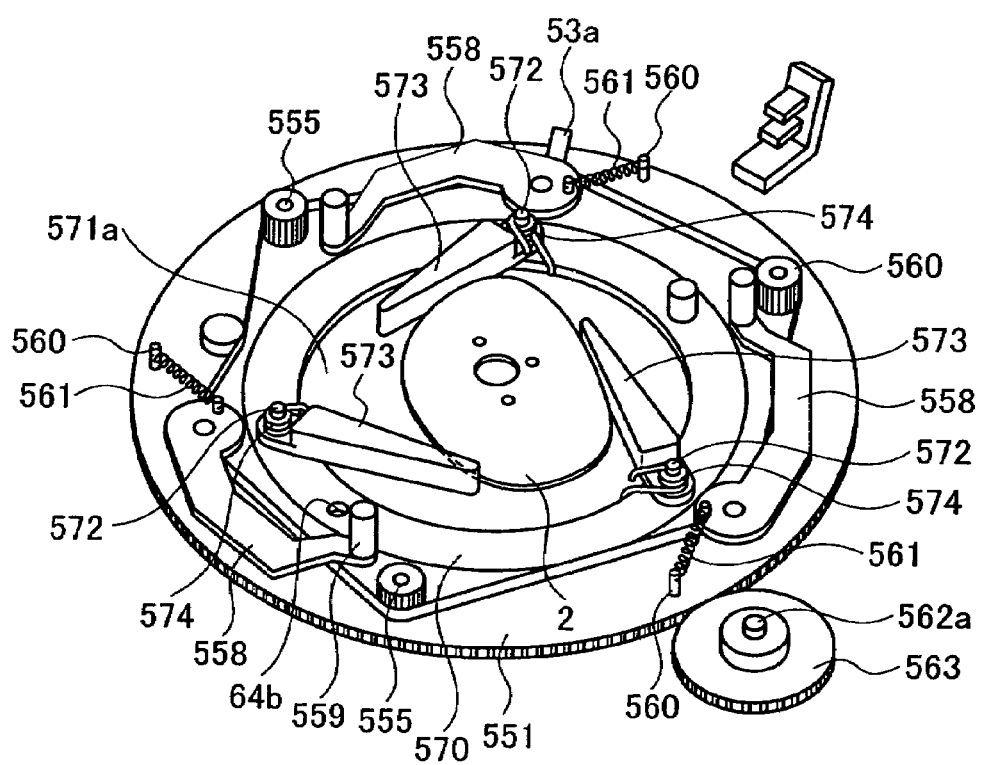
FIG. 31 is a schematic perspective view showing a state where the frame-changing lens holder shown in FIG. 30 is attached inside a ring-shaped gear of the lens holder shown in FIG. 29A.

Instead of the transparent disk 552 for supporting lens, which has the above-described lens receiver 553, a frame-changing lens holder 670 shown in FIG. 30 may be disposed detachably in the ring-shaped gear 551 as shown in FIG. 31.

The frame-changing lens holder 570 has a ring-shaped frame 571 having the same outer diameter as an outer diameter of the transparent disk 552, a transparent disk 571a fixed in the ring-shaped frame 571, three (plural) support shafts 572 provided on the ring-shaped frame 571 as to be protruded with an equal pitch (an interval of 120°), lens-holding arms (lens-holding members) 573 which have end portions (base end portions) mounted on the support shaft 572 freely turnably, and coil springs 574 that energize other end portions (top portions) of the lens-holding arms 573 toward a center of the ring-shaped frame 571. Note that the lens-holding arms 573 are formed in a shape tapered toward the tops.

Such a ring-shaped frame 571 is formed to be thicker than the above-described transparent disk 552, and is fitted detachably into the ring-shaped gear 551 in a state where the lens-holding shafts 559 of the above-described arms 558 are withdrawn on the ring-shaped gear 551 as shown in FIG. 31. Accordingly, the lens-holding shafts 559 do not move into the ring-shaped frame 571 by hitting an outer circumference surface of the ring-shaped frame 571. In this occasion, the ring-shaped frame 571 is supported on the flange 571a of the ring-shaped gear 571 in FIG. 27.

Note that reference numeral 571b denotes a through hole provided on the ring-shaped frame 571 for frame change, and is used for detecting the frame-changing lens holder 570.

Next, a lens suction mechanism for mounting the jig to the eyeglass lens will be explained. Since the lens suction mechanism has substantially the same configuration as the foregoing jig supporting mechanism 30, a configuration that is not mentioned in the jig supporting mechanism will be explained mainly.

The lens suction mechanism is shown by reference numeral 600, and is mounted on the side plate 123 of the inner frame 120 as shown in FIGS. 2, 4 and 22.

Figure 32:
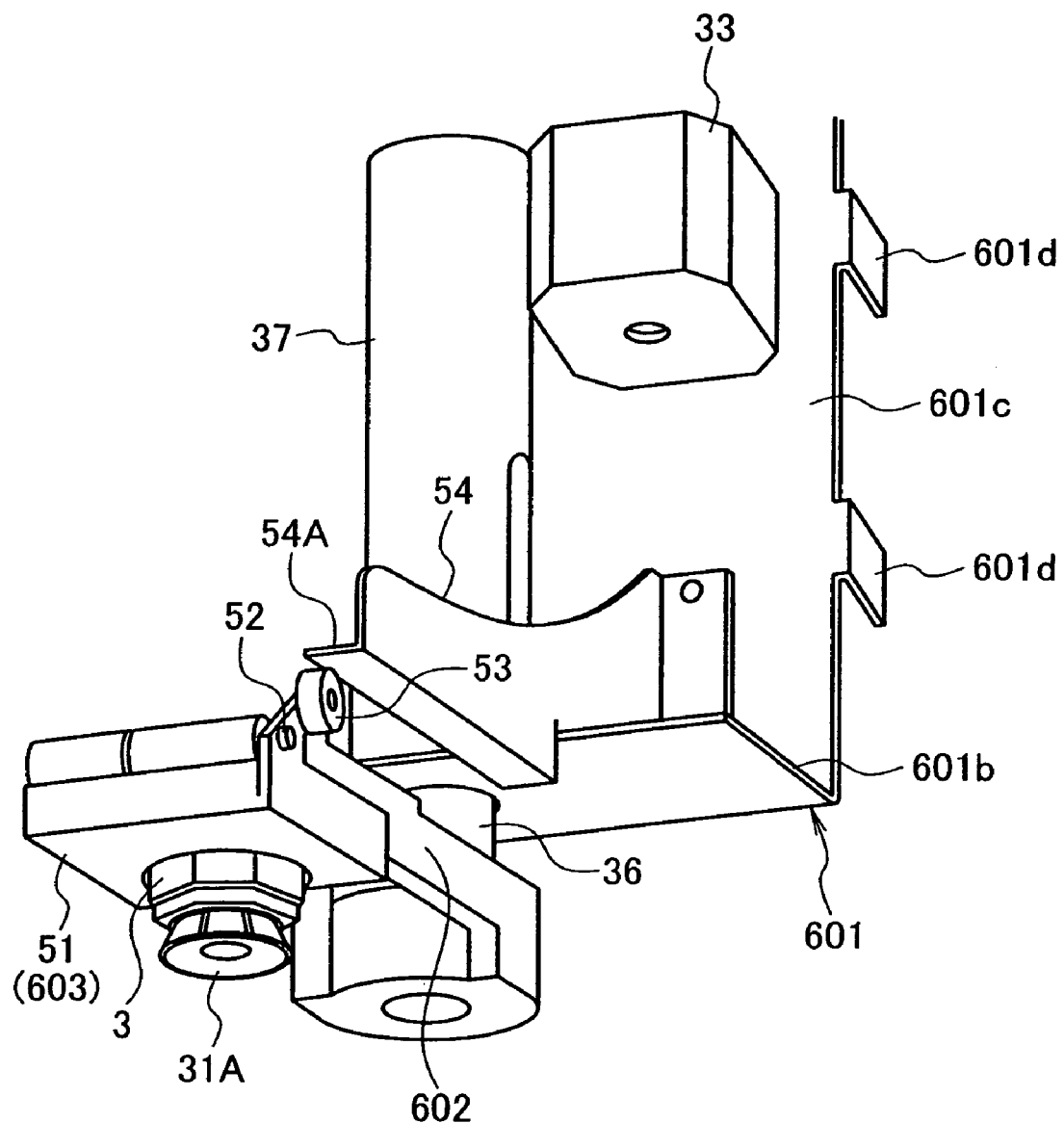
FIG. 32 is the same explanatory view as FIG. 6, which shows an action of a lens suction mechanism.

The lens suction mechanism 600 has a bracket 601 shown in FIGS. 2, 4, 6 and 32. The bracket 601 is formed in an U-shape formed by an upper supporting plate portion 601a, a lower supporting plate portion 601b, and vertical plate portion 601c that connects the upper and lower supporting plate portions 601a, 601b, as shown in FIGS. 4 and 32. Furthermore, attaching pieces 601d, 601d are provided on the upper and lower portions on a side of the vertical plate portion 601c integrally and vertically. The bracket 601 is fixed on the side plate 123 by attaching the attaching pieces 601d, 601d on the side plate 123 which is provided in the inner frame 2 shown in FIG. 20, with screws (not shown).

Figure 33:
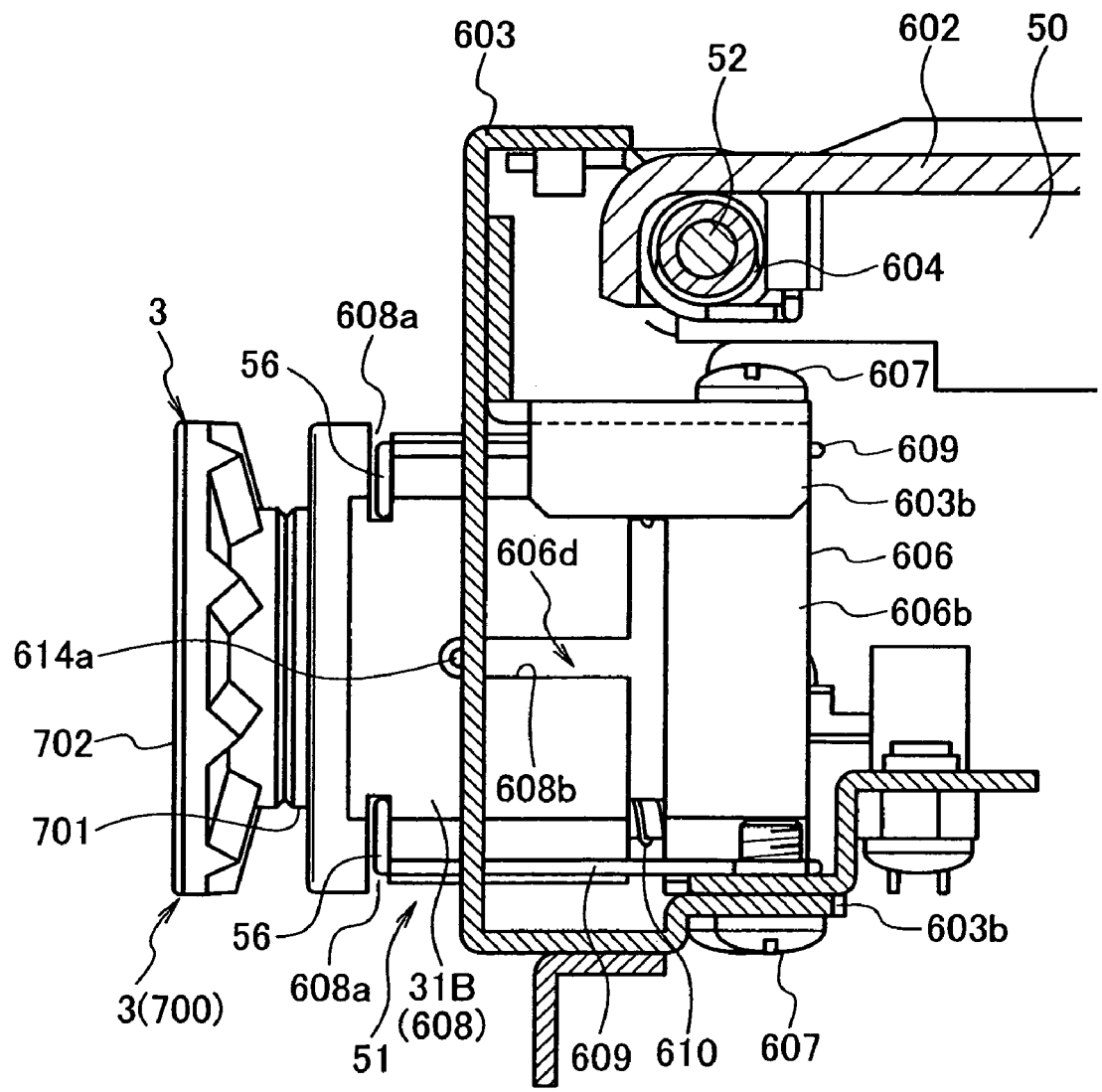
FIG. 33 is a side view of a part of the arm member shown in FIG. 4 in a partially sectional state.
Figure 34:
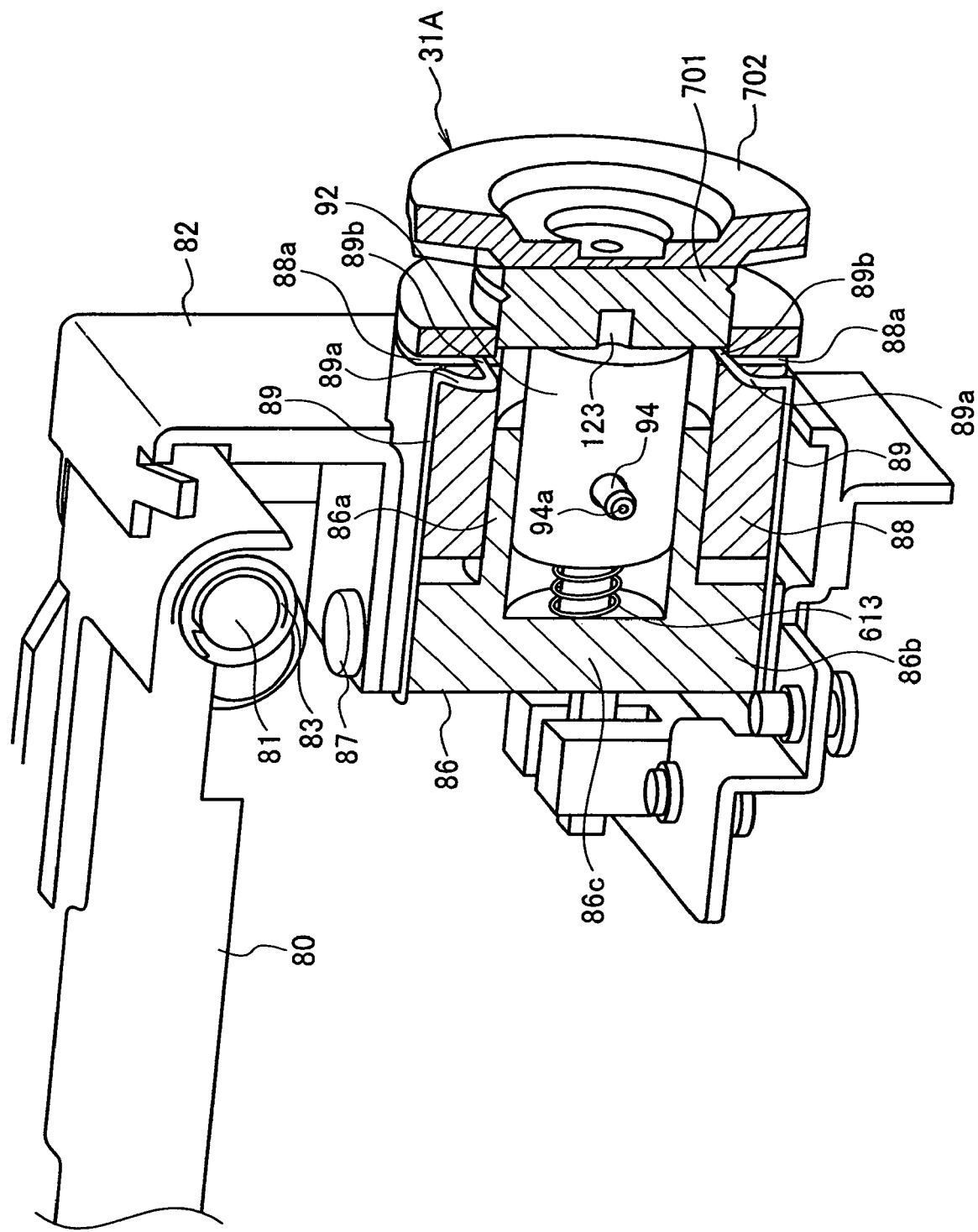
FIG. 34 is a partial explanatory view that shows the arm member and the arm-driving mechanism shown in FIG. 4 in a partially sectional state.

As shown in FIGS. 33 and 34, a movable arm 602 extended horizontally is fixed on a lower end portion of the drive rod 35 (see FIG. 5). The movable arm 602 is configured to face forefront when the guide roller 40 is in the upper vertical slit portion 41a of the cam slit 41, and configured to face the lateral direction (the X-direction) and a left direction in FIG. 5 when the guide roller 40 is in the lower vertical slit portion 41c of the cam slit 41.

A movable bracket 603 is held freely turnably by a top portion of the movable arm 602 via the support shaft 52 extending vertically and horizontally to an extending direction of the movable arm 602 as shown in FIGS. 4, 32 and 33. A twisted coil spring 604 wound to the support shaft 52 is disposed between the movable bracket 603 and the movable arm 602 as shown in FIG. 33. The twisted coil spring 604 energizes the movable bracket 603 in a direction where the top portion of the movable arm 602 is folded to a side of a lower surface thereof as shown in FIG. 32.

As shown in FIG. 32, the roller 53 is held freely rotatably on side surfaces of a base end portion of a movable bracket 604.

When the movable arm 602 is elevated in a state where the movable arm 602 faces forefront, the roller 53 is configured to be disposed adjacently on the stopper 54A provided on a lower end of the fixed arm 54 such that the movable bracket 604 is turned in a vertical state while resisting the spring force of the twisted coil spring 604 as shown in FIG. 4.

Furthermore, a jig holding device 605 is mounted on the movable bracket 603 (see FIG. 35A).

Figure 36A:
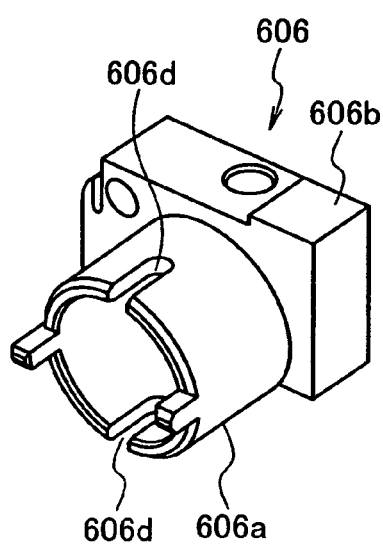
FIG. 36A is a perspective view of a holder main body shown in FIG. 35A.
Figure 36B:
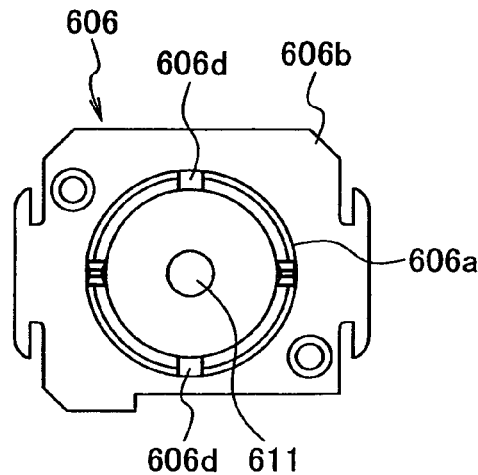
FIG. 36B is a plan view of the holder main body shown in FIG. 36A seen from a cylinder portion.
Figure 36C:
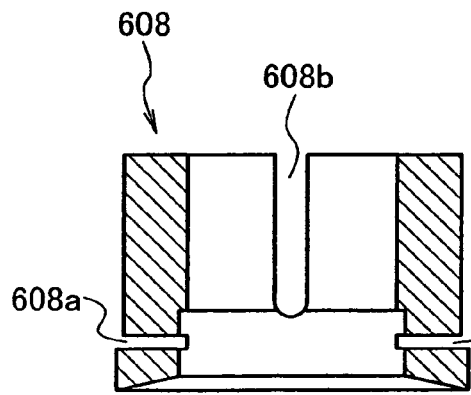
FIG. 36C is a sectional view taken along an axis line of an external cylinder shown in FIG. 35A.

The jig holding device 605 has a holder main body 606 which has a cylinder portion 606a inserted into a through hole 603a of the bracket 603, and screws 607, 607 that fix a flange 606b of the holder main body 606 to facing pieces 603b, 603b of the bracket 604 as shown in FIGS. 35A, 36A and 36B.

The cylinder portion 606a protruded from the through hole 603a is provided on the holder main body 606, and an external cylinder 608 is engaged with an outer circumference of the cylinder portion 606a to be capable of moving in a longitudinal direction of the external cylinder 608.

Figure 35B:
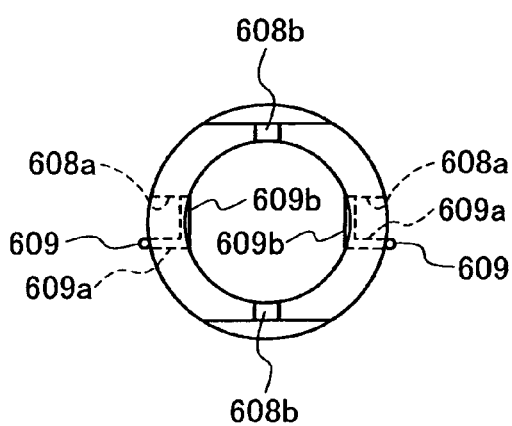
FIG. 35B is a plan view of an external cylinder shown in FIG. 35A.
Figure 35C:
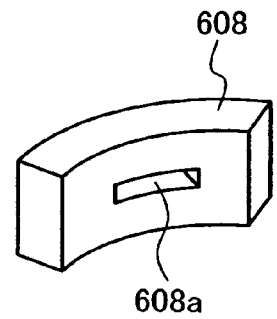
FIG. 35C is a partially perspective view of the external cylinder shown in FIG. 35B.

Slits 608a as shown in FIGS. 35A and 36A are formed in the external cylinder 608 with an interval of 180°, and bent portions 609a, 609a formed on ends of linear springs 609, 609 which have end portions held by the holder main body 606 are disposed on each slit 608a. A straight portion 609b is provided on the bent portion 609a that allows a part of circumference surface to be protruded from the slit 608a into the external cylinder 608 as shown in FIGS. 35B and 35C.

A coil spring 610 is disposed between the holder main body 606 and the external cylinder 608, and the external cylinder 608 is energized in the left direction in FIG. 35A by a spring. A spring-supporting shaft 611 which has an end portion fixed to the end wall 606c of the cylinder portion 606a, is disposed concentrically in the cylinder portion 606a of the holder main body 606.

A sliding cylindrical body 612 formed in a cylindrical shape with a bottom portion is engaged with the cylinder portion 606a freely movably in an axis line direction, and the spring-supporting shaft 611 is inserted into the sliding cylindrical body 612 with a looseness. An end portion of the coil spring 613 (see FIG. 34) is inserted into the sliding cylindrical body 612. Furthermore, the spring-supporting shaft 611 is inserted into the coil spring 613, and the other end portion of the coil spring 613 is held at the end portion of the spring-supporting shaft 611 formed in a side of the end wall 606c by fastening and engaging.

Furthermore, cutout guides 606d, 606d which open in a lower end and extend to be formed in a slit shape, are formed in the cylinder portion 606a of the holder main body 606 with intervals of 180° as shown in FIGS. 22A and 22B. Furthermore, a cutout guide 608b which open to an upper end and extend to be formed in a slit shape, is formed in the external cylinder 608 as shown in FIGS. 36A to 36D.

Figure 36D:
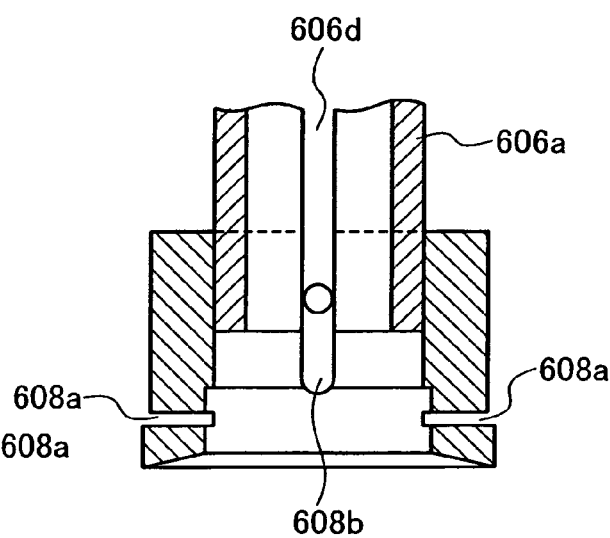
FIG. 36D is a sectional view when a cylinder portion shown in FIG. 36A is engaged with the external cylinder shown in FIG. 36C.

The cutout guides 606, 608b are arrayed with each other as shown in FIGS. 36A and 36D. In the cutout guides 606d, 608b, a guide shaft 614 is inserted on an outer circumference surface of the sliding cylindrical body 612 as shown in FIGS. 34 and 35A.

Figure 37:
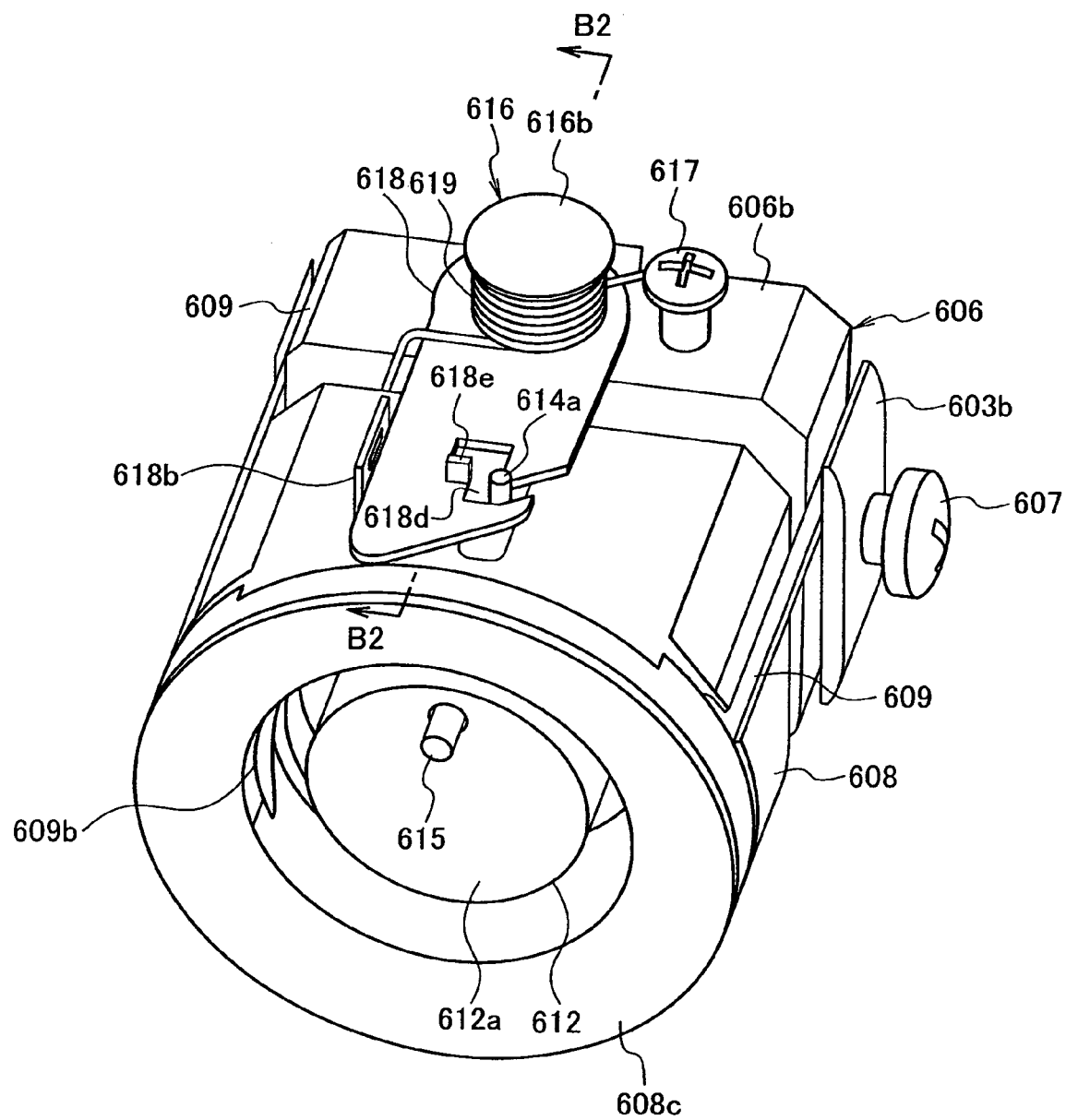
FIG. 37 is a perspective view for explaining a stopper hook shown in FIG. 35A.

As shown in FIG. 37, a positioning pin 615 is provided to be protruded on an end wall 612a of the sliding cylindrical body 612. Note that a taper concave portion 608c is formed on the outer end portion of the external cylinder 608.

Figure 43:
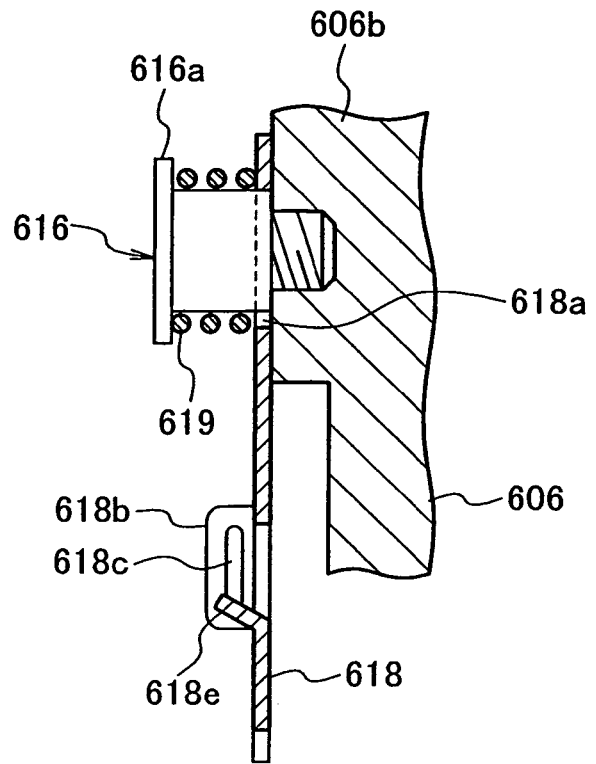
FIG. 43 is a partially sectional view taken along B2-B2 line of FIG. 37.

As shown in FIGS. 37 and 43, a hook-supporting shaft 616 is fixed on the flange 606b of the holder main body 606 by screwing, and a spring receiving screw 617 is screwed down to be disposed adjacently to the hook-supporting shaft 616. Note that reference numeral 616a denotes a flange of a hook-supporting shaft 616.

The hook-supporting shaft 616 is inserted into a shaft inserting hole 618a of a plate-shaped stopper hook 618 with a looseness as shown in FIGS. 37 to 40, and supports the stopper hook 618 on the flange 606b. A spring stopper protrusion 618b is formed on a side portion of the stopper hook 618, and a slit 618c is formed on the stopper protrusion 618.

The both end portions of a coil spring 619 engaged with an outer circumference of the hook-supporting shaft 616 are stopped by the spring receiving screw 617 and in the slit 618c. The coil spring 619 energizes the stopper hook 618 in a counter-clockwise direction seen on FIG. 37, and is disposed between the flanges 606b, 616a to press the stopper hook 618 against the flange 606b with a soft force.

Figure 38:
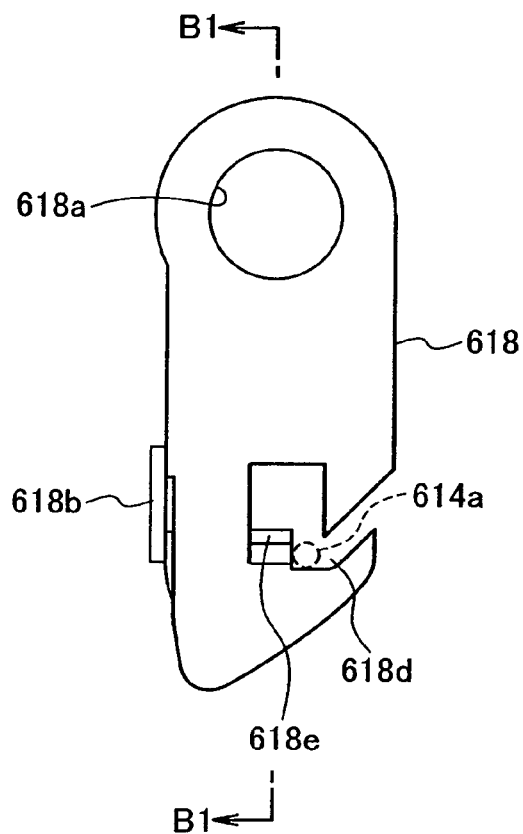
FIG. 38 is a front view of the stopper hook shown in FIG. 37.
Figure 39:
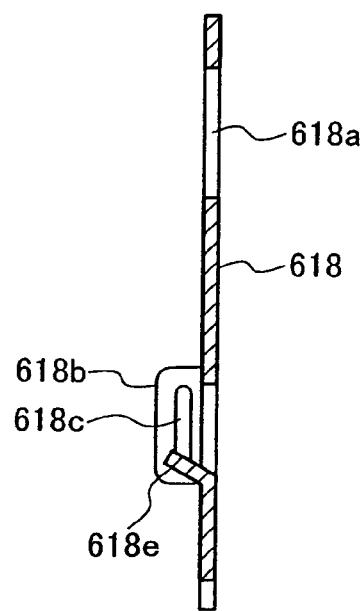
FIG. 39 is a sectional view taken along B1-B1 line of FIG. 38.
Figure 40:
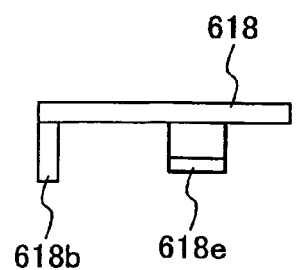
FIG. 40 is a plan view of the stopper hook shown in FIG. 38.

A stopper cutout 618d is formed in the stopper hook 618 as shown in FIGS. 37 to 39, and an inclined guide piece 618e is formed to be positioned at an edge portion opposite to the turning energized direction of the stopper cutout 618d. A small-diameter shaft portion 614a formed at a top of the guide shaft 614 which is mounted on an outer circumference surface of the sliding cylindrical body 612, is inserted into the stopper cutout 618d.

Figure 42:
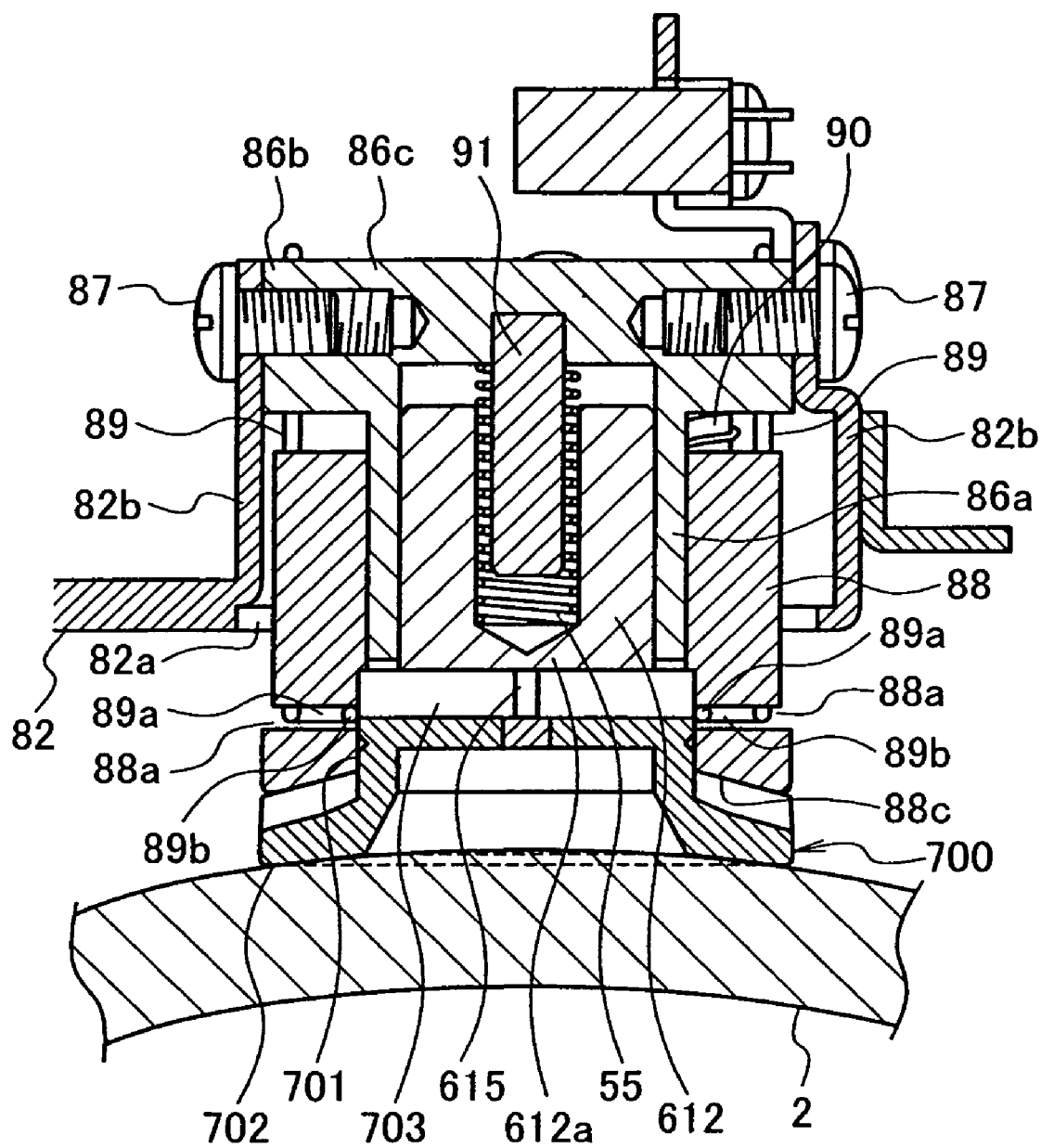
FIG. 42 is a partially sectional view showing a relationship between the lens suction mechanism, the jig and the eyeglass lens, which are shown in FIG. 41.

Referring to FIG. 42, shown is a state where a lens suction jig 700 is mounted on the eyeglass lens 2 is shown. The lens suction jig 700 has an attaching shaft portion 701 and a cup portion 702 made of elastic member such as rubber and soft synthetic resin which is integrally provided with the attaching shaft portion 701 as shown in FIG. 42. A positioning groove 703 which is opened to an end surface and a circumference surface, is formed to the attaching shaft portion 701. The attaching shaft portion 701 is configured to be engaged with the external cylinder 608.

The above-described liquid crystal display device 129 is controlled by the operation control circuit 100 shown in FIG. 9.

The operation control circuit 100 is configured to control the pulse motor (the X-drive motor) 507, the pulse motor (the Y-drive motor) 511, the attaching angle setting motor 562, the light source 90, the drive motor 80 and a light source 307.

A switch operating signal from the operating panel 128 and an image signal (measurement signal) from the CCDs 87, 74, and 313 are configured to be inputted to the operation control circuit 100.

Next, the action of the jig mounting apparatus of another embodiment which is configured as described above.

(1) Attachment of the Lens Suction Jig 700 to the Lens Suction Mechanism 600

FIG. 2 shows a state before detecting the hidden marks 21 of the eyeglass lens 2, performing refraction measurement of the eyeglass lens 2, or the like. In this state, the guide roller 40 of the lens suction mechanism 600 is positioned in an upper end portion of the upper vertical slit portion 41a of the cam slit 41 which is provided on the cam cylinder 37, and the female screw cylinder 36 is positioned at the highest elevated position as shown in FIG. 5.

At this position, the movable arm 602 mounted on the lower end portion of the female screw cylinder 36 is positioned at the highest elevated position as shown in FIGS. 2 and 4, the roller 40 of the movable bracket 603 is disposed adjacently to horizontal plate portion 54a of the fixed arm 54 as shown in FIG. 4, so that the movable bracket 603 is in a suspended state as shown in FIG. 4 resisting the spring force of the twisted coil spring 604 shown in FIG. 33.

In this state, the movable bracket 603 is in a state facing to the second opening 143 of the case shown in FIG. 1. Therefore, an operator inserts the attaching shaft portion 701 of the lens suction jig 700 from the second opening 143 into the external cylinder 608 provided on the movable bracket 603 as shown in FIGS. 34 and 35A. In this occasion, the positioning pin 615 is inserted into a positioning groove 703 provided on the attaching shaft portion 701.

In pushing the attaching shaft portion 701, the sliding cylindrical body 612 is moved to a side of the end wall 606c of the holder main body 606 by the attaching shaft portion 121 in resisting the spring force of the coil spring 55.

Afterwards, when the attaching shaft portion 701 of the lens suction jig 700 is further pushed into the external cylinder 608 so as to go over the straight portion 609b of the linear spring 609, the attaching shaft portion 701 enters a state where the straight portion 609b of the linear spring 609 is pushed into the slit 608a of the external cylinder 608 resisting the spring force of the folded portion 609a of the linear spring 609. In this state, the straight portion 609b is pressed on an outer circumference surface of the attaching shaft portion 701 by the spring force of the folded portion 609a to enter a state where the attaching shaft portion 701 is held in the external cylinder 608 as shown in FIG. 35A, so that the lens suction jig 700 is prevented from falling downward even if the external cylinder 608 faces downward.

In this state, the small-diameter shaft portion 614a of the guide shaft 614 is positioned in the stopper cutout 618d of the stopper hook 618.

(2) Holding of the Eyeglass Lens 2 by the Lens Holder 550

(Exposing the Lens Holder 550 to an Outside of the Outer Frame 121 and Mounting of Lens)

Next, when the automatic discrimination of FIG. 15 is selected by the operation of the function key F1 in the operating panel 128, and then either one of the "left" switch 136L and the "right" switch 136R of FIG. 14 is selected, the pulse motor 511 as the Y-drive motor is controlled by the operation control circuit 100 to allow the forward/backward feeding screw 510 to perform normal rotation, and the nut member 503 and the forward/backward moving member 503 are moved to side of the lid 402.

With the movement, after connecting adjacently to the lid 402, the stage cover SC covering the forward/backward moving member 503 opens the lid 402 resisting the spring force of twisted coil spring 406 by turning in a clockwise direction around the support shaft 29 in FIG. 10 to go outside the outer frame 121 from the opening 401 and the first opening 401 and thereby exposes the lens holder 550 attached to the forward/backward moving member 503.

In this case, the engaging protrusion 558a of the lens holder 550 is engaged with the stopping nail portion 407d of the arm 407, the arm 53 integrally formed with the engaging protrusion 53a is turned in a clockwise direction together with the small gear 50 while resisting the spring force of the coil spring 56 in FIG. 29A, the lens-holding shaft 559 of the arm 558 integrally formed with the engaging protrusion 558a is moved to the cutout 561 side of the cover ring 562 shown in FIG. 25.

Accordingly, the timing belt 556 shown in FIG. 29A is rotated in the clockwise direction, remaining two other small gears 555 are also turned clockwise with the movement of the timing belt 556, the arms 558 integrally formed with the remaining two small gears 555 are turned in the clockwise direction resisting the spring force of the coil spring 561, and the remaining two small gears 555 and the lens-holding shafts 559 of the arms 558 are moved to a side of the cutout 561 of the cover ring 562 shown in FIG. 25.

In a state where the three lens-holding shafts 559 are moved toward the cover ring 562 and opened, the eyeglass lens 2 is mounted on the shaft-shaped lens receiver 553 of the lens holder 550 as shown in FIGS. 29B and 31.

(Movement of the Lens Holder 550 into the Outer Frame 121 and Holding of Lens)

Thereafter, the operation control circuit 100 controls to activate the pulse motor 511 to turn reversely the forward/backward feeding screw 510 and moves the nut member 509 and the forward/backward moving member 503 into the outer frame 121.

With this movement, when the stage cover SC covering the forward/backward moving member 503 is detached from the lid 402, the lid 402 is turned in a counter-clockwise direction in FIG. 26 by the spring force of the twisted coil spring 406 about the support shaft 405, and the opening 401 and the first opening 142 are closed by the lid 402.

In this case, when the engaging protrusion 550a of the lens holder 550 is detached from the stopping nail portion 407d of the arm 407, the arms 558 integrally formed with the engaging protrusions 558a sown in FIG. 29A are turned in the counter-clockwise direction together with the small gears 555 by the spring force of the coil spring 561, and the lens-holding shafts 559 of the arms 558 integrally formed with the engaging protrusion 558a move to the center side of the cover ring 562 in FIG. 25.

With this movement, the timing belt 556 is rotated in the counter-clockwise direction as shown in FIG. 29A, the remaining two other small gears 555 are also turned in the counter-clockwise direction by the movement of the timing belt 556, the arms 558 integrally formed with the two small gears 555 are turned in the counter-clockwise direction by the spring force of the coil spring 561, and the lens-holding shafts 559 of the arms 558 integrally formed with the remaining two small gears 555 move to the center side of the cover ring 562 in FIG. 25.

Figure 41:
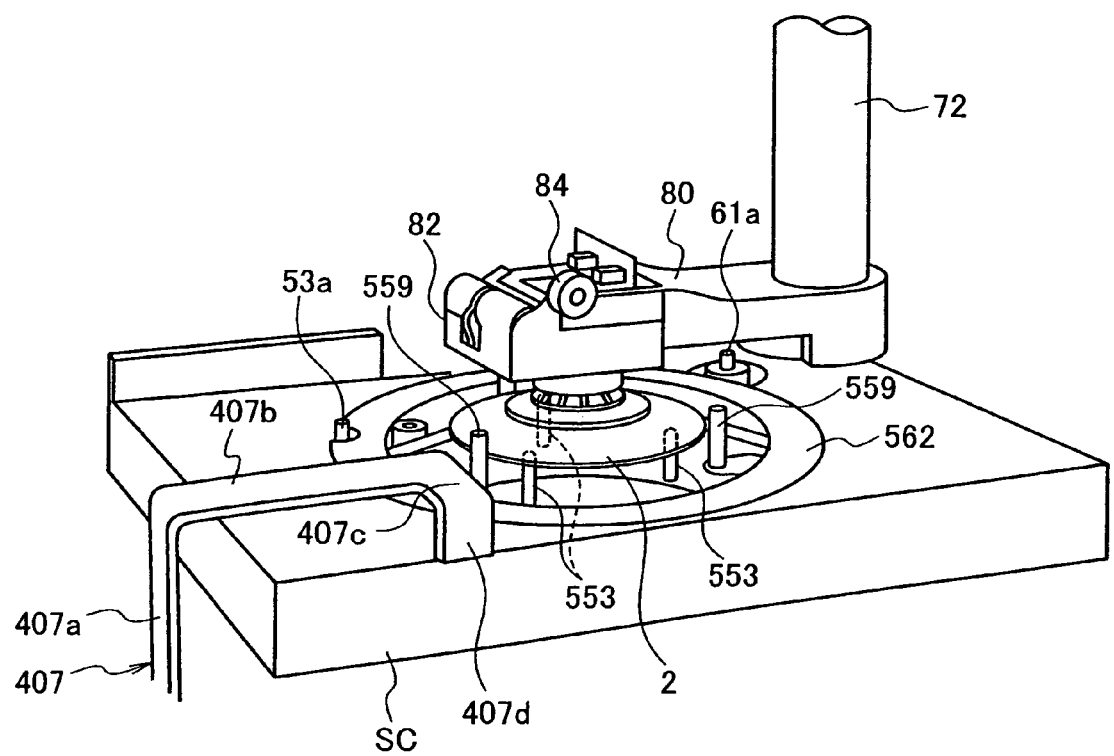
FIG. 41 is a perspective view showing a state where the jig is mounted on an eyeglass lens on a lens holder by a lens suction mechanism shown in FIG. 4.

The three lens-holding shafts 559 are moved to a center side of the cover ring 562 as described above, and are disposed adjacently on a circumference surface of the eyeglass lens 2 mounted on the shaft-shaped lens receiver 553 of the lens holder 550 to pinch the eyeglass lens 2 as shown in FIG. 41.

Next, the type judgment of the eyeglass lens 2 will be explained.

As described above, when the lens holder 550 is moved between the reflection plate 79, the detection optical system 73 and the imaging device 82 as the hidden marks detection optical system in a state where the eyeglass lens 2 is pinched by the three lens-holding shafts 559, the operation control circuit 100 stops an operation of the pulse motor 511.

After that, the operation control circuit 100 allows the light source 90 to be lighted in order to output infrared light from the light source 90, and on the other hand, controls to drive the drive motor 80 to rotate the reflection plate 79.

The infrared light from the light source 90 transmits the pinhole plate 82 and the half mirrors 84, 83 to be made incident to the collimator lens 78, and is transformed into a parallel optical flux by the collimator lens 78, and then, is projected on the eyeglass lens 2 as a lens to be inspected.

By the projection, the infrared light having transmitted the eyeglass lens 2 is reflected by the reflection plate 79 to be a reflected light. After transmitting the eyeglass lens 2 and the half mirror 83, a part of the reflected light is reflected by the half mirror 84 and then allows an image of eyeglass lens 2 or of a shaft-shaped lens receiver 553 is formed on the CCD 87 via the aperture stop plate 85 and imaging lens 86. In a case where the reference marker such as the hidden marks 21 and markings are on the eyeglass lens 2, their images are also formed on the CCD 87. An image signal from the CCD 87 is inputted to the operation control circuit 100. The operation control circuit 100 receives the image signal from the CCD 87, and determines an existence of the reference marker applied on the eyeglass lens by an image data of the eyeglass lens 2.

Figure 45:
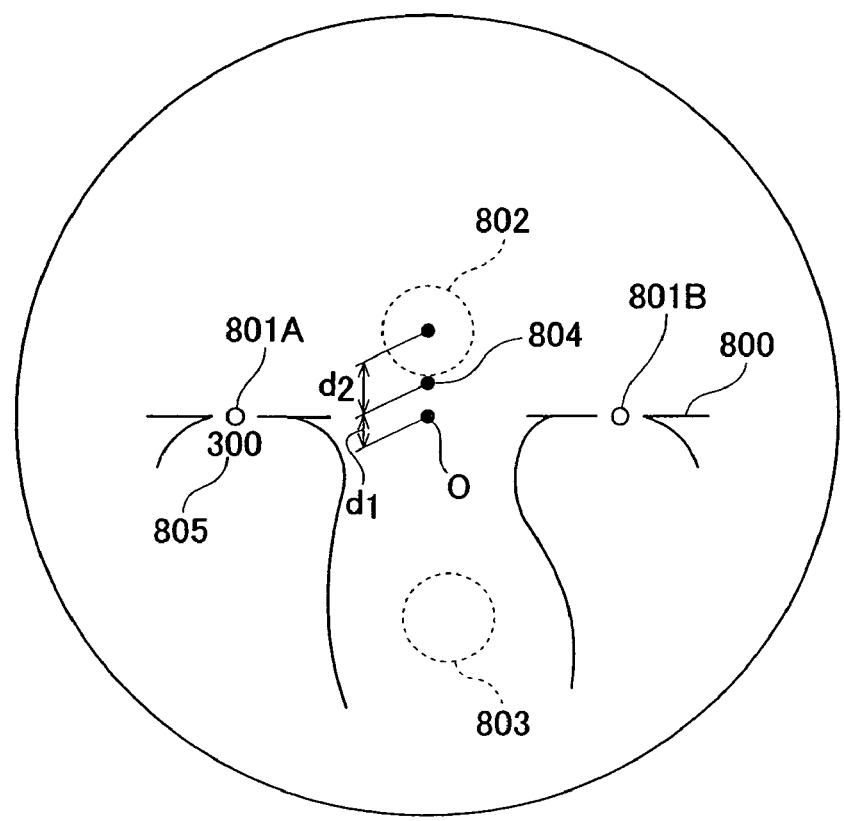
FIG. 45 is a plan view showing reference markers applied on a progressive multi-focal lens.
Figure 46A:
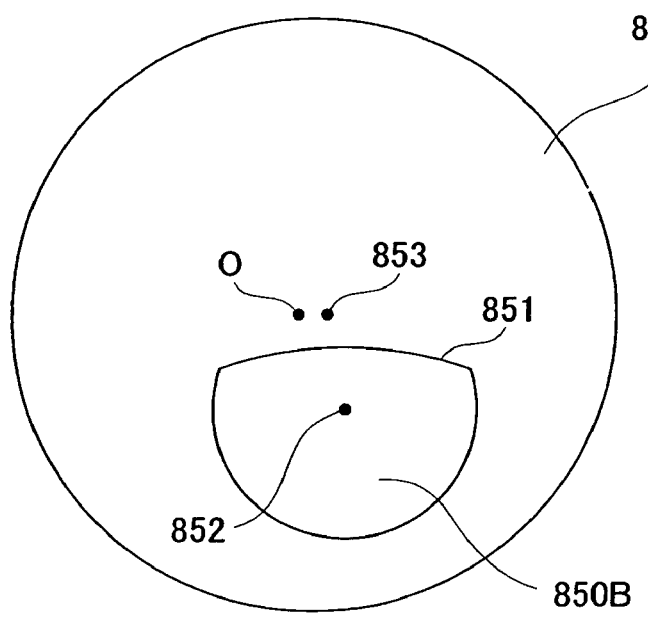
FIG. 46A is a plan view showing reference markers applied on a bifocal lens.
Figure 46B:
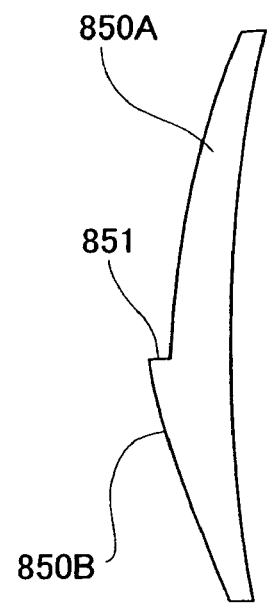
FIG. 46B is a side view of FIG. 46A.

FIG. 45 is a view showing the reference marker applied on a progressive multi-focal lens, and FIGS. 46A and 46B are views showing the reference marker applied on a bifocal lens.

In the progressive multi-focal lens, hidden marks 801A, 801B are applied on two areas positioned away from a geometric center O on the horizontal paint 800 by an equal distance (17 mm, for example) as shown in FIG. 45, and the progressive multi-focal lens is configured such that the geometric center O of lens, the optical center of a distant portion power measuring part 802 and a near portion power measuring part 803, a position of an eyepoint 804, or the like can be drawn based on the positions of the hidden marks 801A, 801B.

The hidden marks 801A, 801B are shown by the same small circles or small circles and characters, and a number 805 showing an addition power (a difference between an outside vertex diopter for a distance portion and an outside vertex diopter of near portion) of the lens is shown under the hidden marks 801A. The number is "300", for example. The hidden marks 801A, 801B and the number 805 showing the addition power are formed so as to be in a shape with fine protrusions (about 2 to 4 μm) on a convex surface of lens during shape forming.

Although the position of the eyepoint 804 varies depending on lens designs, it is fixed to a predetermined reference position which is away from the geometric center O, that is, a position which is away from above the geometric center O by a predetermined distance d1 (2 mm, for example). Therefore, when the image of the hidden marks 801A, 801B is read and an image processing is performed to calculate its positional coordinate, the geometric center O and the eyepoint 804 can be found.

The multi-focal lens has a main lens 850A and a segment 850B as shown in FIGS. 46A and 46B, and is configured such that the geometric center O, an optical center 852 of near portion power measuring portion by using an upper edge 851 of the segment 850B as a reference mark, and a position of the eyepoint 853 can be obtained. The geometric center O and the position of eyepoint 853 are calculated by imaging the segment 850B and by performing an image processing of the positional coordinate of the center of the upper edge 851.

Furthermore, two types of single lens where marking is applied and is not applied exist.

Figure 47:
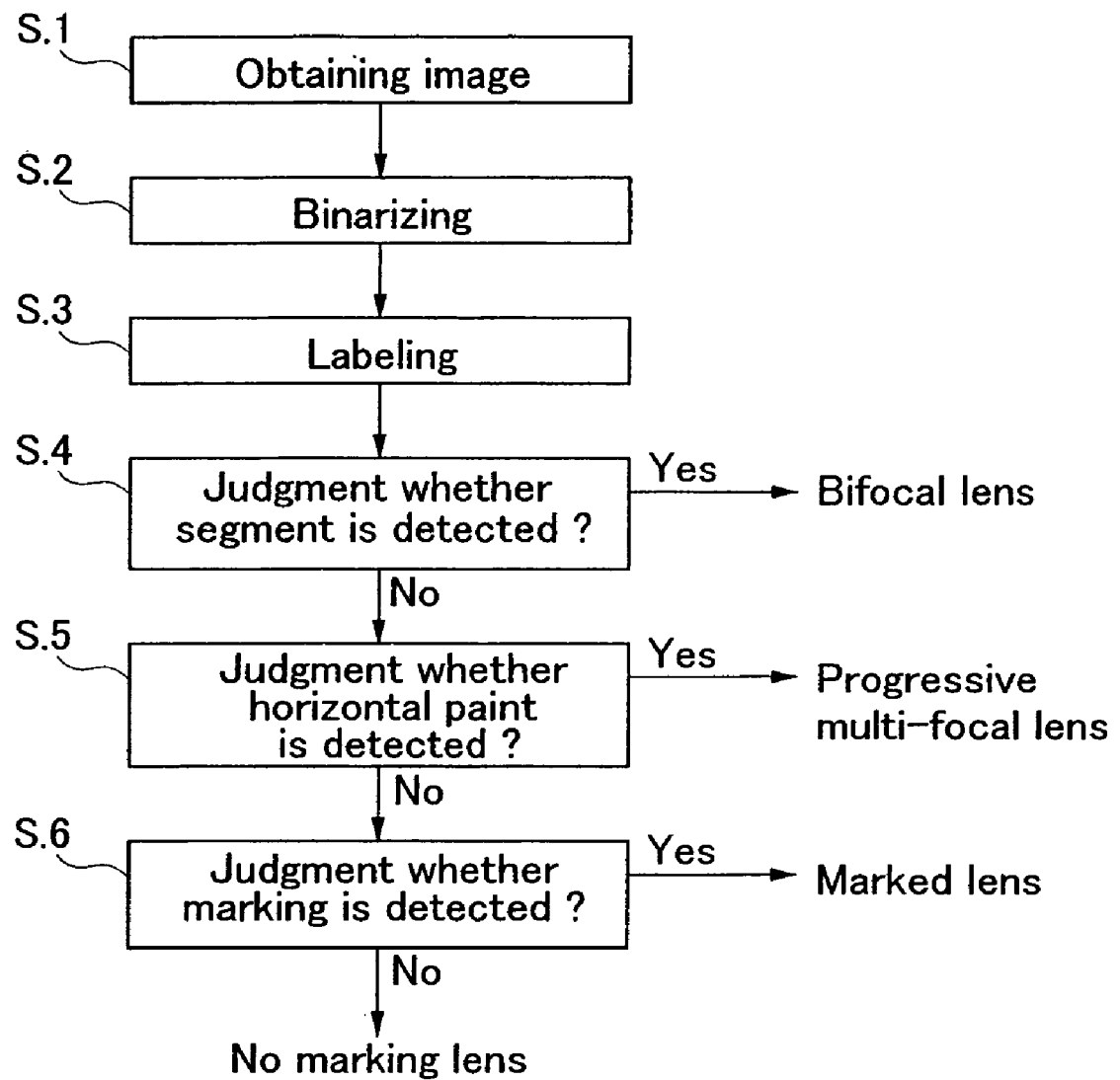
FIG. 47 is a flowchart of a lens type judgment processing by an operation control circuit.

The operation control circuit 100 obtains an entire image of the eyeglass lens 2 (step S1) based on the image signal received from the CCD 87 as shown in FIG. 47. After changing the brightness of the image, the operation control circuit 100 performs LOG (Laplacian Of Gaussian) filtering to extract an outer diameter of the eyeglass lens 2, a horizontal paint, segment outline or the like, and an image obtained by filtering is binarized based on a brightness value (step S2). Since this binary processing generates much noise in the image processing other than the lens outer diameter and the reference marker, the operation control circuit 100 performs a labeling processing for removing the noise to delete fine noise (step S3). Herein, labeling is widely known processing where the same label number is attached to connected pixels and discriminate them. The operation control circuit 100 judges the pixel whose total number is small as noise out of the images applied with the same label number, and removes it from the image.

After that, the operation control circuit 100 makes a judgment whether or not the segment is detected from the obtained image (step S4), and judges that the eyeglass lens 2 is a bifocal lens when the segment is detected. Furthermore, if the segment is not detected, the operation control circuit 100 makes a judgment whether or not the horizontal paint is detected from the obtained image (step S5). When the horizontal paint is detected, the operation control circuit 100 judges whether the eyeglass lens 2 is a progressive multi-focal lens. Furthermore, if the horizontal paint is not detected, the operation control circuit 100 makes a judgment whether or not the marking is detected from the obtained image (step S6). When the marking is detected, the operation control circuit 100 judges that the eyeglass lens 2 is a single lens applied with the marking (marked lens), and if the marking is not detected, it judges that the eyeglass lens 2 is a single lens on which the reference marker is not applied (no marking lens).

As described, the operation control circuit 100 detects the reference marker such as the hidden marks, the horizontal paint and the marking, makes a judgment of lens type based on existence of reference marker, and detects a suction position of a suction jig based on the reference marker. On the other hand, if the reference marker is not detected, the operation control circuit 100 detects refraction characteristics (optical characteristics) of the eyeglass lens by using the CL measurement device 300 (described later), and detects the suction position of the jig.

Next, a confirmation example 1 of the existence of eyeglass lens will be described.

Figure 49:
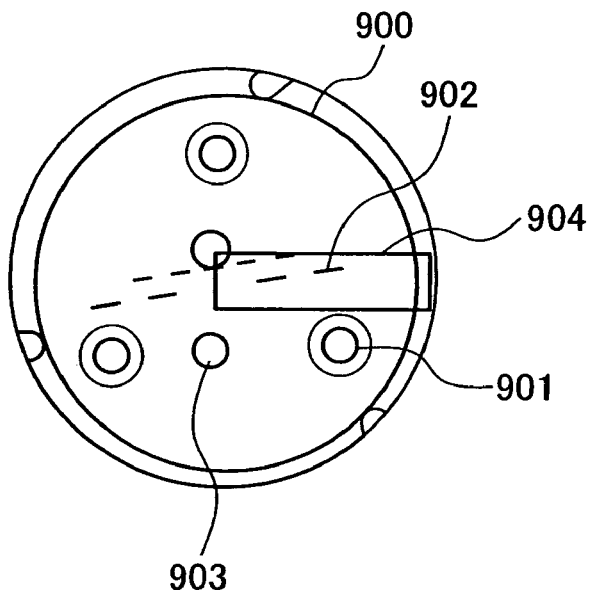
FIG. 49 is an explanatory view for processing of the lens existence shown in FIG. 45.

In FIG. 49, reference numeral 900 denotes the shape of the eyeglass lens 2, reference numeral 901 denotes a shape of a shaft-shaped lens receiver 553, and reference numerals 902 and 903 denote the paint mark image 20 and the hidden mark image 21.

Next, referring to FIG. 48, the existence of the eyeglass lens 2 will be described.

(Step S1)

Figure 48:
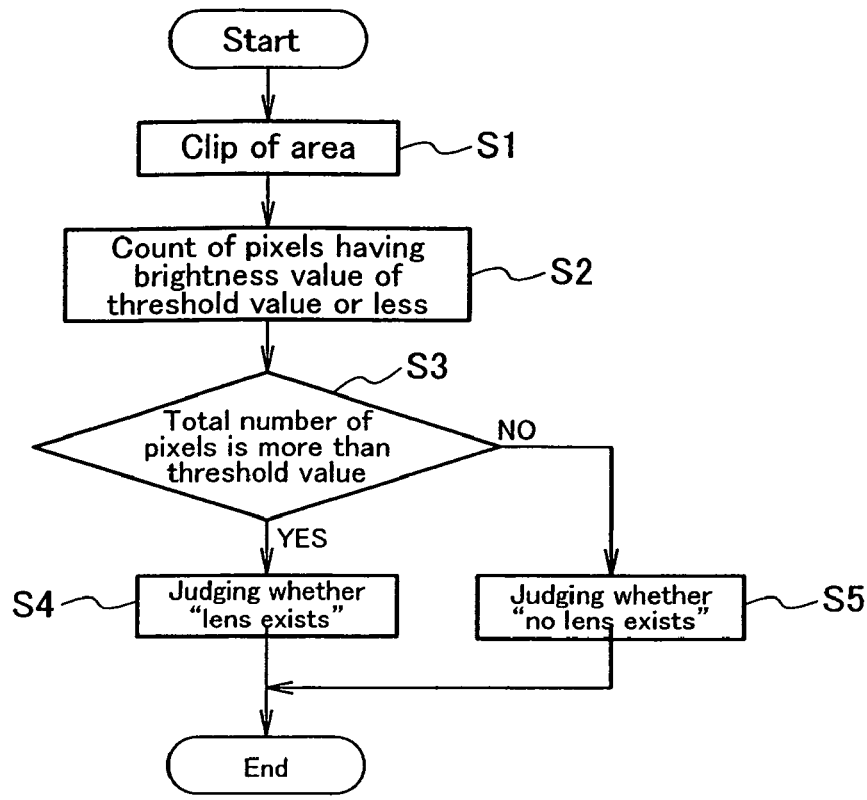
FIG. 48 is a flowchart of processing of lens existence by the operation control circuit.

When receiving the image signal from the CCD 87, the operation control circuit 100 starts the judgment of the existence of lens as shown in FIG. 48, and performs clipping of a range for judging the existence of lens on step S1, and moves to step S2.

Specifically, the operation control circuit 100 sets a clip area (a processing area) 904 of a predetermined range, which is shown in a rectangular frame in FIG. 49, and moves to step S2. The clip area 904 extends from a center to an outside of a periphery of the eyeglass lens 2 with a narrow width and linearly. In other words, the clip area 904 extends from an approximate center of the ring-shaped gear 551 and the cover ring 562 in a radius direction and to a portion right before reaching the cover ring 562.

(Step S2)

In step S2, the operation control circuit 100 counts pixels which have a brightness value of a threshold value or less in the clip area 904 and moves to step S3.

(Step S3)

In step S3, the operation control circuit 100 judges whether or not the total number of pixels having the threshold value or less, which was counted on step S2, is the threshold value or more, and when it judges that the total number of pixels is the threshold value or more, it moves to step S4, and goes to step S5 when it judges that the total number of pixels is smaller than the threshold value.

(Step S4 and S5)

Then, the operation control circuit 100 ends processing by judging whether a lens exists in step S4 ends processing by judging "no lens exists" on step S5, and moves to another processing.

Next, s confirmation example 2 of the existence of eyeglass lens 2 will be described.

Figure 50:
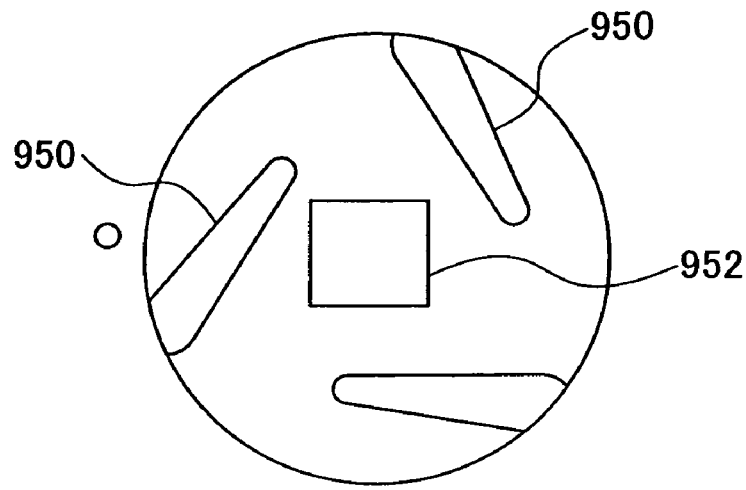
FIG. 50 is an explanatory view for explaining another example of processing of the lens existence.
Figure 51:
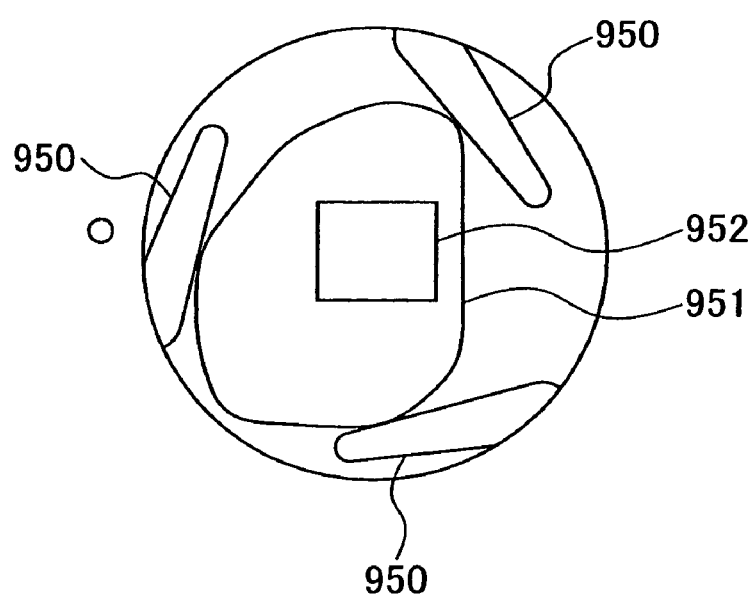
FIG. 51 is an explanatory view for explaining another example of processing of the lens existence.
Figure 52:
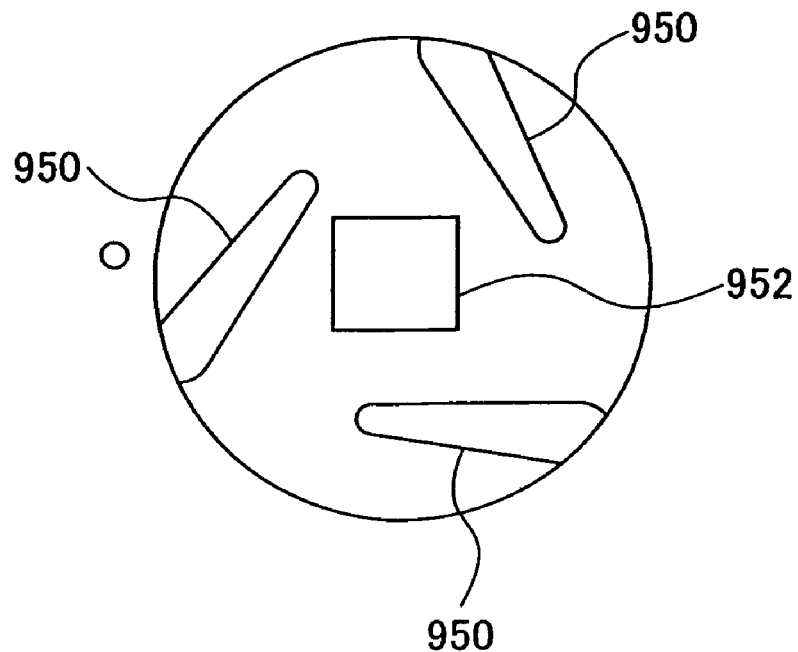
FIG. 52 is an explanatory view for explaining another example of processing of the lens existence.

As shown in FIG. 31, in the case where the frame-changing lens holder 570 is mounted on the ring-shaped gear 551, the image as shown in FIGS. 50 to 53 is displayed on the liquid crystal display device 129. In FIGS. 50 to 53, reference numeral 950 denotes an arm image of the lens-holding arms 66 and 952 denotes a clip area. In FIG. 51, reference numeral 951 denotes the lens shape of the frame-changing lens holder shown in FIGS. 30 and 31.

Next, referring to FIG. 54, processing of the example 2 for confirming the existence of eyeglass lens will be described as follows.

(Step S11)

Figure 54:
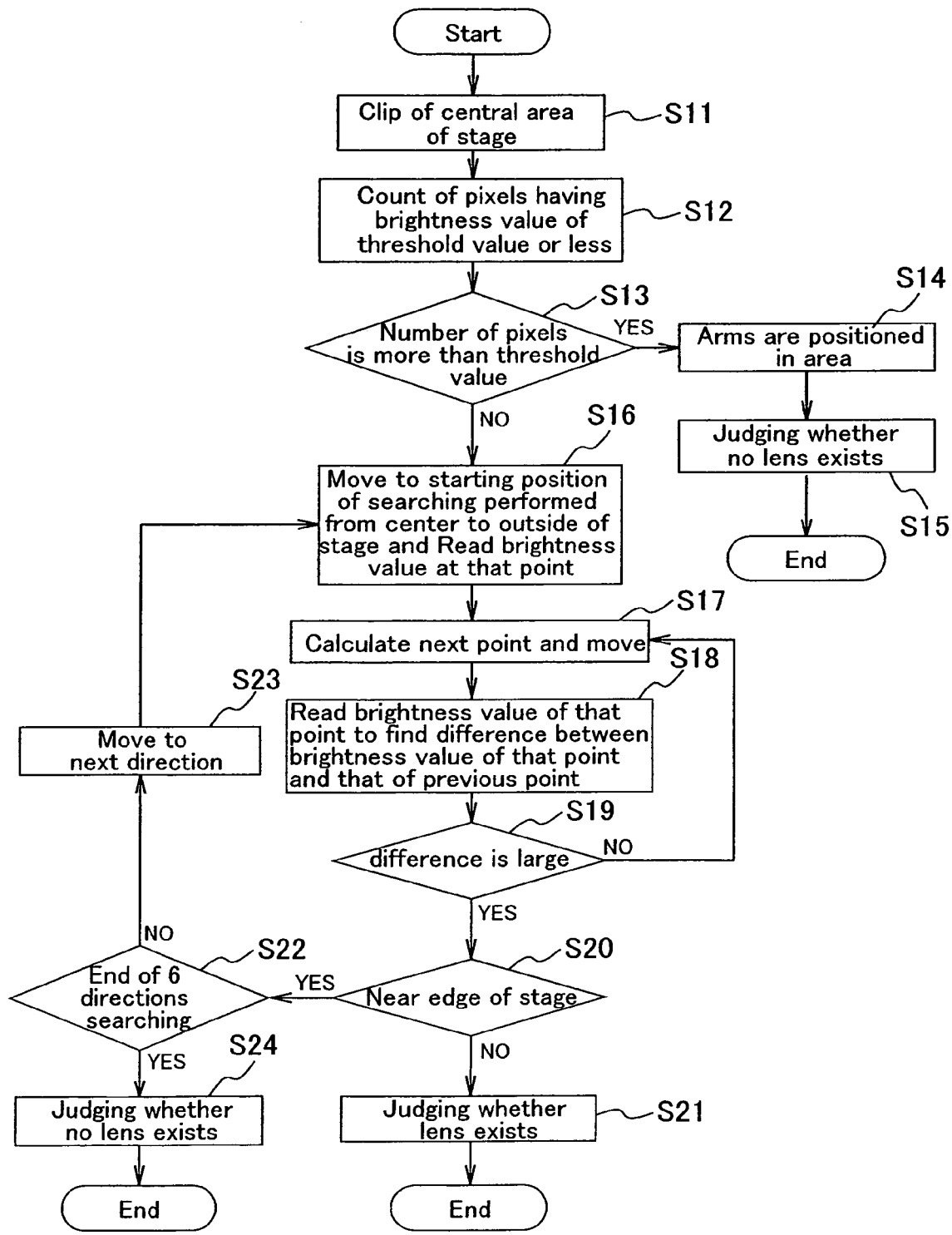
FIG. 54 is a flowchart showing another example of processing of the lens existence by the operation control circuit.

When the operation control circuit 100 receives the image signal from the CCD 115, it starts the judgment processing of the existence of lens shown in FIG. 54, performs clipping of an area for the judgment of the existence of lens in step S1, and moves to step S12.

Specifically, the operation control circuit 100 sets the clip area (processing area) 952 shown in the rectangular frame in FIG. 50, and moves to step S12. The clip area 952 is set in a square shape on an approximately central portion of the ring-shaped frame 571 (see FIG. 30).

(Step S12)

In step S12, the operation control circuit 100 counts pixels which has a brightness value in the clip area 952 is the threshold value or less, and moves to step S13.

(Step S13)

In step S13, the operation control circuit 100 judges whether or not the total number of pixels having the threshold value or less, which was counted on step S2, is the threshold value or more, moves to step S14 when it judges that the total number of pixels is the threshold value or more, and moves to step S15 when it judges that the total number of pixels is smaller than the threshold value.

(Step S14)

Figure 53:
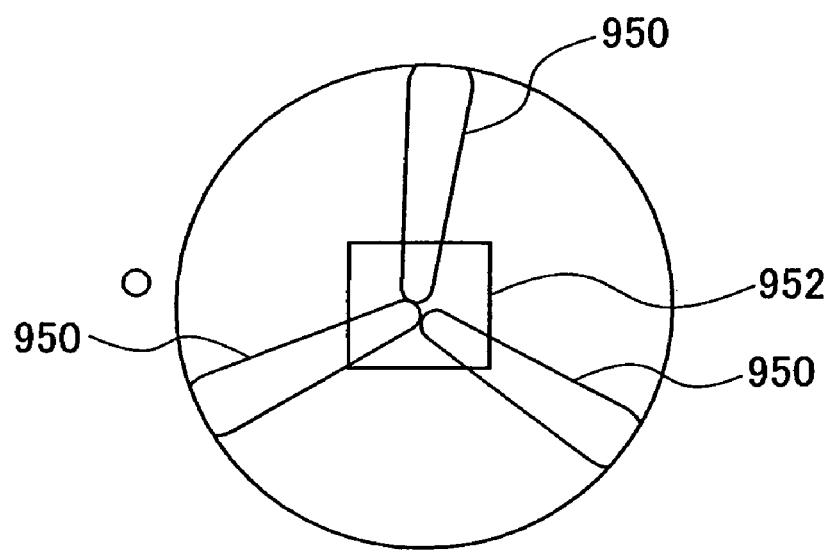
FIG. 53 is an explanatory view for explaining another example of processing of the lens existence.

In a case where the total number of pixels is the threshold value or more, the frame-changing lens holder is not in the three lens-holding arms 573 of FIGS. 30 and 31, so that the three lens-holding arms 573 of FIG. 30 and FIG. 31 are positioned at a center of the ring-shaped frame 570. In this state, the arm image 950 as the image of the three lens-holding arms 573 is positioned in the clip area 152 as shown in FIG. 53.

Therefore, the operation control circuit 100 in the step S14 moves to step S15 in a state where the arm image 950 exists in the clip area 952.

(Step S15)

In step S15, the operation control circuit 100 ends processing by judging that the frame-changing lens holder is not between the lens-holding arms 573, and moves to another processing.

(Step S16)

Furthermore, in a case where the total number of pixels is smaller than the threshold value, the frame-changing lens holder is between the three lens-holding arms 573 shown in FIGS. 30 and 31, the three lens-holding arms 573 shown in FIGS. 30 and 31 do not exist at the central portion of the ring-shaped frame 570. In this state, the arm image 950 being the image of the three lens-holding arms 573 is positioned outside the clip area 952 as shown in FIG. 51.

Figure 55:
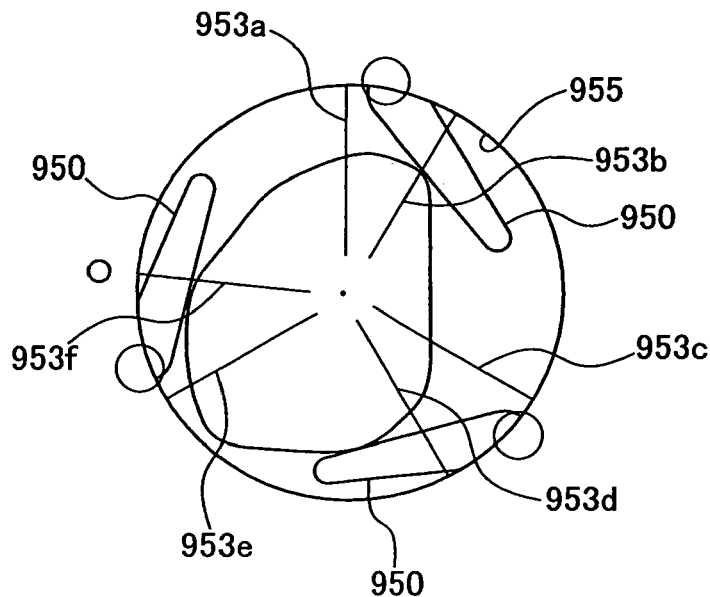
FIG. 55 is an explanatory view for explaining another example of processing of the lens existence.

Therefore, in step S16, the operation control circuit 100 sets a plurality (6 directions in this embodiment) of search lines 953a to 953f from the stage center, that is, from the center of the ring-shaped frame 570 in a radius directions as shown in FIG. 55, and reads the brightness on the center side of one of the plurality of search lines 953a to 953f, for example, the ring-shaped frame 570 in the search line 953a, for example, and moves to step S17.

(Step S17)

In step S17, the operation control circuit 100 calculates a point of reading the next brightness in the search line 953a, moves to a calculated position, and moves to step S18.

(Step S18)

In step S18, the operation control circuit 100 reads the brightness value of the moved point to find a difference between the brightness value of the moved point and that of the previous point, and moves to step S19.

(Step S19)

In step S19, the operation control circuit 100 judges whether or not the difference of brightness value found in the step S18 is large, loops by returning to the step S17 if it is not large, and moves to step S20 when it is large.

(Step S20)

Figure 56:
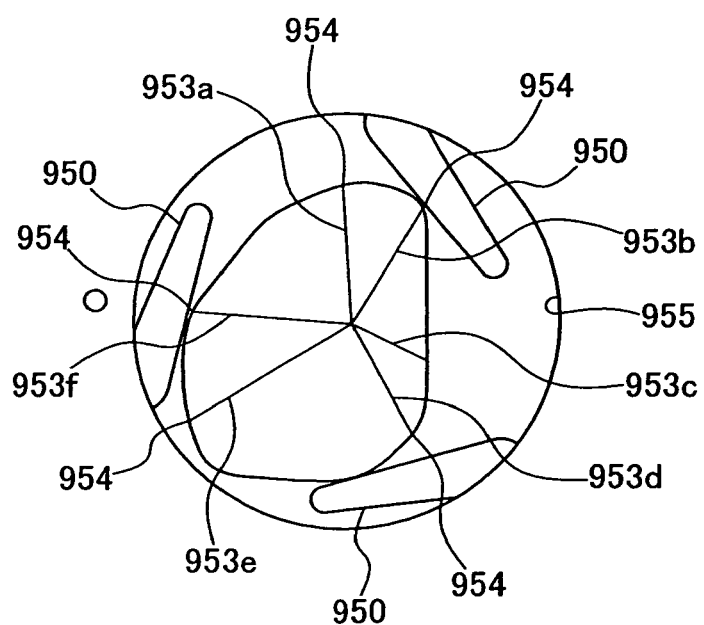
FIG. 56 is an explanatory view for explaining another example of processing of the lens existence.
Figure 57:
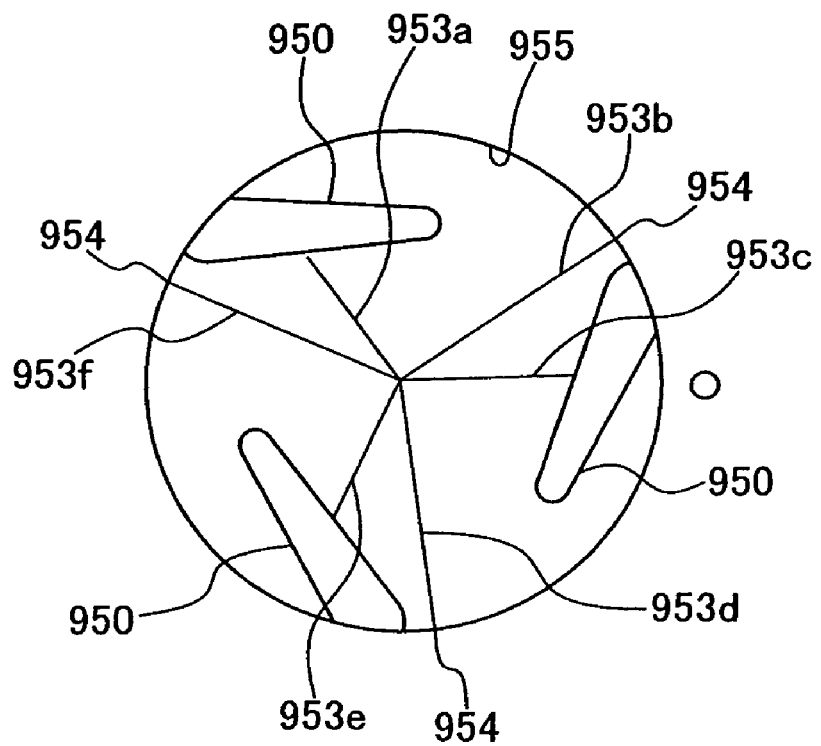
FIG. 57 is an explanatory view for explaining another example of processing of the lens existence.

In step S20, the operation control circuit 100 judges whether or not a point having a large difference of the brightness value is in an address near an inner circumference (near an edge of stage) of the ring-shaped frame 570, moves to step S21 in a case where a point 954 having the large difference of the brightness value is in an address near the inner circumference (near the edge 955 of stage) of the ring-shaped frame 570 as shown in FIG. 57, and moves to step S22 in a case where the point 954 having the large difference of the brightness value is not in an address near the inner circumference (near the edge 954 of stage) of the ring-shaped frame 570 as shown in FIG. 56.

(Step S21)

In step S21, the operation control circuit 100 ends processing by judging that the frame-changing lens holder is between the three lens-holding arms 573, and moves to another processing.

(Step S22)

In step S22, the operation control circuit 100 judges whether or not searching of a difference of the brightness value finished for all of the plurality (6 directions in this embodiment) of search lines 953a to 953f, moves to the step S23 if searching is not finished, and moves to the step S24 when it is finished.

(Step S23)

In step S23, the operation control circuit 100 makes a setting so as to find a difference of the brightness value in the next search line 953b of the plurality (6 directions in this example) of search lines 953a, returns to the step S16, and finds the brightness value of the next search line 953b and a difference of the brightness value. In the same manner, a brightness value and a difference of the brightness value are found for the search lines 953b to 953f as well.

(Step S24)

In step S24, the operation control circuit 100 ends processing by judging that the frame-changing lens holder is not between the three lens-holding arms 573, and moves to another processing.

Next, measurements by the CL measurement device 300 will be explained.

When the operation control circuit 100 confirms that the eyeglass lens 2 does not have the hidden marks, the segment, marking marks or the like after confirming the existence of eyeglass lens 2, the operation control circuit 100 controls to activate the pulse motor 511 to turn the forward/backward feeding screw 510 reversely to move the nut member 509 and the forward/backward moving member 503 toward the CL measurement device 300, disposes the eyeglass lens 2 between the measurement optical flux projection optical system 304 and the light-receiving optical system 305 of the CL measurement device 300, and stops the pulse motor 511.

After that, the operation control circuit 100 turns the light source 307 ON to output a measurement optical flux. The measurement optical flux from the light source 307 is led to the collimator lens 310 via the pinhole plate 308 and the reflection mirror 309, and is projected onto the eyeglass lens 2 in a parallel optical flux from the collimator lens 310.

The measurement optical flux having transmitted the eyeglass lens 2 transmits the pattern plate 311, and a pattern on the pattern plate 311 is formed on the CCD 313 via the image-forming lens 112. From the CCD 313, the measurement signal (the image signal) is inputted to the operation control circuit 100. Then the operation control circuit 100 measures spherical diopter power S, cylindrical diopter power C, axis angle A of cylindrical axis, optical center OC and the like that are refraction characteristics of the eyeglass lens 2 based on the measurement signal from the CCD 313.

When the operation control circuit 100 finishes the measurement of the refraction characteristics of eyeglass lens 2, the operation control circuit 100 controls to activate the pulse motor 511 to allow the forward/backward feeding screw 510 to make normal rotation, moves the nut member 509 and the forward/backward moving member 503 toward the lid 402, moves the lens holder 550 and the eyeglass lens 2 to an area between the reflection plate 80, the detection optical system 73 and the imaging device 82 as the hidden marks detection optical system, and stops the operation of the pulse motor 511.

Attaching of the lens suction jig 700 to the eyeglass lens 2 is as follows.

As described above, the operation control circuit 100, after detecting the existence of eyeglass lens 2, the type of eyeglass lens 2, or the hidden marks and the like, controls to activate the attaching angle setting motor 562 to turn the lens holder 550 by turning the ring-shaped gear 551 of the lens holder 550 so as to allow the hidden marks or the like to match marks (not shown) shown on the liquid crystal display device 129, and turns the eyeglass lens 2 held by the lens holder 550 about the optical axis.

On the other hand, when the operation control circuit 100, after measuring the refraction characteristics of the eyeglass lens 2 by the CL measurement device 300, moves the eyeglass lens 2 to an area between a rotating reflection plate 106, an entire detection optical system 100, and an illumination optical system 101 of a hidden marks detection optical system 200, the lens holder 550 turns by controlling to activate the attaching angle setting motor 562 to turn the ring-shaped gear 551 of the lens holder 550 when a cylindrical shaft or the like exists, and the eyeglass lens 2 held by the lens holder 550 is turned about the optical axis.

After that, the operation control circuit 100 controls to activate the drive motor 33, transmits the rotation of the drive motor 33 to the male screw shaft 35 via the pulley 38, the timing belt 34 and the pulley 39 to rotate the male screw shaft 35, and moves the female screw cylinder 36 downward.

Accordingly, the movable arm 602 integrally formed with the female screw cylinder 36 is allowed to go down, the roller 53 at the top portion of the movable arm 602 draws apart from the horizontal plate portion 54a of the fixed arm 54, and the movable bracket 51(602) is turned toward the lower surface of the movable arm 602 by the spring force of the twisted coil spring 604 shown in FIG. 33.

Finally, as shown in FIG. 32, the lens suction jig 700 faces downward along the lower surface of the movable arm 602 in close relation.

On the other hand, with this action, the roller 40 mounted on the female screw cylinder 36 moves from the upper vertical slit portion 41a to the lower vertical slit portion 41c via the helical slit portion 41b, the movable arm 602 is integrally turned with the female screw cylinder 36 toward the lens holder 550 by 90°, and the lens suction jig 700 is moved upward above the eyeglass lens 2.

After that, the female screw cylinder 36 and the movable arm 602 are further allowed to go down, the suction cup 702 of the lens suction jig 700, which is mounted on the top portion of the movable arm 602, is disposed adjacently on the eyeglass lens 2 on the shaft-shaped lens receiver 553 as shown in FIGS. 41 and 42.

Furthermore, the operation control circuit 100 controls to activate the drive motor 33, allows the female screw cylinder 36 and the movable arm 602 to go down by a small amount, further pushes the attaching shaft portion 701 of the lens suction jig 700 into the external cylinder 608, allows the sliding cylindrical body 612 to move toward the end wall 606c of the holder main body 606 by a small amount resisting the spring force of the coil spring 55, and the lens suction jig 700 is sucked to the eyeglass lens 2.

Figure 44A:
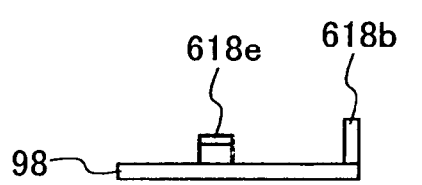
FIG. 44A is an explanatory view for explaining an action of the stopper hook in FIGS. 37 and 43.
Figure 44B:
FIG. 44B is an explanatory view for explaining the action of the stopper hook in FIGS. 37 and 43.
Figure 44C:
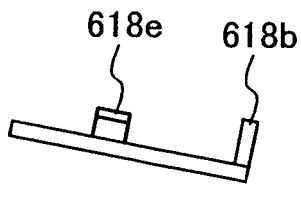
FIG. 44C is an explanatory view for explaining the action of the stopper hook in FIGS. 37 and 43.
Figure 44D:
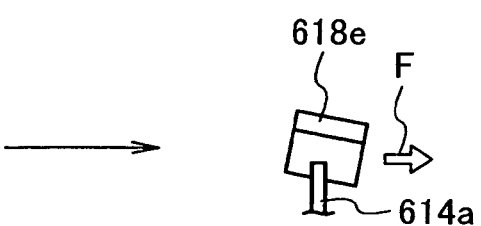
FIG. 44D is an explanatory view for explaining the action of the stopper hook in FIGS. 37 and 43.

Accordingly, the stopper hook 618 turns in the counterclockwise direction in FIG. 37 by the spring force of the coil spring 619, and the inclined guide piece 618e moves above the small-diameter shaft portion 614a of the guide shaft 614 as shown in FIG. 44D. Thus, the stopper hook 618 inclines as shown in FIG. 44B, and the inclined guide piece 618e inclines in a width direction as well.

After that, the operation control circuit 100 turns the drive motor 33 reversely to elevate the movable arm 602 integrally formed with the female screw cylinder 36.

Accordingly, the sliding cylindrical body 612 moves toward the lens attaching shaft portion 701 by the spring force of the coil spring 613, the small-diameter shaft portion 614a of the guide shaft 614 mounted on the sliding cylindrical body 612 is moved integrally with the sliding cylindrical body 612 toward a top of the stopper hook 618 along the inclined guide piece 618e.

In this case, the small-diameter shaft portion 614a applies turning force F directed in a direction opposite to a turning energizing direction of the stopper hook 618 which is caused by the coil spring 619, to the inclined guide piece 618e as shown in FIG. 44D. Thus, the stopper hook 618 is turned in the clockwise direction in FIG. 37 resisting the spring force of the coil spring 619 by a small amount, and the small-diameter shaft portion 614a of the guide shaft 614 is moved into the engaging cutout 618d of the stopper hook 618.

On the other hand, when the sliding cylindrical body 612 moves toward the lens-attaching shaft 701 by the spring force of the coil spring 613, the attaching shaft portion 701 is pressed by the spring force of the coil spring 613 via the sliding cylindrical body 612 to be moved toward the tapered concave portion 608c of the external cylinder 608, and the attaching shaft portion 701 draws apart from the straight portion 609b of the linear spring 609. In this state, the attaching shaft portion 701 is allowed to come out easily from the external cylinder 608.

When the operation control circuit 100 further elevates the female screw cylinder 36 and the movable arm 602, the roller 53 mounted on the female screw cylinder 36 is elevated in the lower vertical slit portion 41c, the lens suction jig 700 comes out from the external cylinder 608 at the top of the movable arm 602, and is left in a suction state to the eyeglass lens 2.

After that, the roller 53 mounted on the female screw cylinder 36 is moved from the lower vertical slit portion 41c to the upper vertical slit portion 41a via the helical slit portion 41b, the movable arm 602 is turned toward the side plate 123 by 90°, and the movable arm 602 is withdrawn from above the eyeglass lens 2.

As the movable arm 602 is elevated and the roller 53 is elevated in the upper vertical slit portion 41a, the roller 53 of the movable bracket 603 is disposed adjacently on the horizontal plate portion 54A of the fixed arm 54 as shown in FIG. 4, and the movable bracket 602 faces downward (suspended) as shown in FIG. 4 resisting the spring force of the twisted coil spring 604 shown in FIG. 33. Thus, the movable bracket 602 faces the opening 142 as shown in FIG. 1 to make a state where a new lens suction jig can be attached.

As described above, by using the jig mounting apparatus according to the foregoing embodiments, the operation control circuit 100 judges the existence of reference marker to be applied on the eyeglass lens 2, selects the detection optical system 73, the imaging device 82 and the CL measurement device 300 to automatically specify an mounting position of jig, so that the operator does not need to use a plurality of apparatuses depending on the existence of reference marker, and an operation load can be lightened.

Furthermore, in a method of judging the existence of the eyeglass lens, the image of the eyeglass lens 2 is imaged by the optical element (CCD) 87, at least a processing area (the clip area 902, 952) of a predetermined range, which does not overlap the image (the lens receiver shape 901 or the arm image 900) of the holding portion (the shaft-shaped lens receiver 553 or the lens-holding arm 573) that holds the eyeglass lens 2 disposed on the pedestal (the lens holder 550), is determined from the captured image of the eyeglass lens 2, the number of pixels having a previously determined threshold value or less is counted, and the operation control circuit is configured to recognize that the eyeglass lens 2 is disposed on the lens holder 550 when the counted total number of pixels is the threshold value or less.

According to the configuration, at least a processing area (the clip area 902, 952) of a predetermined range, which does not overlap the image (the lens receiver shape 901 or the arm image 900) of the holding portion (the shaft-shaped lens receiver 553 or the lens-holding arm 573) on the pedestal (the lens holder 550), is determined from the image (the lens shape 900, 951) of the eyeglass lens 2 imaged by the optical element (CCD) 87 to calculate the number of pixels and process the figure image of the eyeglass lens 2, and thus the existence of lens can be judged simply and quickly. Moreover, a method for clearly detecting the hidden marks, the print marks, marking marks and the like is established, and time, labor or the like required for operation processing can be saved.

The above-described existence judgment apparatus of eyeglass lens has: the lens holder 550 including the holding portion (the shaft-shaped lens receiver 553) that holds the rear surface of the eyeglass lens 2; mounting device (the lens suction mechanism 600) for mounting the jig 3 on the surface of the eyeglass lens 2 mounted on the lens holder 550; the optical element (CCD) 87 that images the image of the eyeglass lens 2; and the operation control circuit 100 that determines at least a processing area (the clip area 902, 952) of a predetermined range, which does not overlap the image (the lens receiver shape 901 or the arm image 900) of the holding portion (the shaft-shaped lens receiver 553 or the lens-holding arm 573) on the lens holder 550, from the image (the lens shape 900, 951) of the eyeglass lens 2 imaged by the optical element, counts the number of pixels having the previously determined threshold value or less, and recognizes that the eyeglass lens is disposed on the pedestal when the counted total number of pixels is the threshold value or more.

According to the configuration, at least a processing area (the clip area 902, 952) of a predetermined range, which does not overlap the image (the lens receiver shape 901 or the arm image 900) of the holding portion (shaft-shaped lens receiver 553 or lens-holding arm 573) on the lens holder 550, is determined from the image (the lens shape 900, 951) of the eyeglass lens 2 imaged by the optical element (CCD) 87 to calculate the number of pixels and process the figure image of the eyeglass lens 2, and thus the existence of lens can be judged simply and quickly. Moreover, a method for clearly detecting the hidden marks, the print marks, marking marks and the like is established, and time, labor or the like required for operation processing can be saved. In the above-mentioned method of existence judgment of the eyeglass lens and the apparatus thereof, the processing area (the clip area 901, 952) is in a direction linearly extending from a center toward a periphery of the imaging area by the optical element (CCD) 87.

As described above, the jig mounting apparatus according to the present invention has: the lens holder 550 on which the eyeglass lens 2 is mounted; the pinching members (the lens-holding shafts 559) that is disposed on the lens holder 550 and pinches an edge face of the eyeglass lens 2; moving device (the pulse motor 511, the feeding screw 510) for moving the pedestal (the lens holder 550) into the apparatus main body, that is, into the case 4; and the operation control circuit 100 that moves the lens holder 550 into the apparatus main body by the moving device and pinches the eyeglass lens 2 by the pinching members (the lens-holding shafts 559). Moreover, the operation control circuit 100 is configured to control the pinching members to pinch the eyeglass lens 2 in conjunction with the movement of the lens holder 550 by the moving device.

According to this configuration, the eyeglass lens can be pinched without fail and the efficiency of a suction operation can be improved.

The lens automatic suction apparatus according to the above-described embodiments has: the pedestal (the lens holder 550) on which the eyeglass lens 2 is mounted; the pinching members (the lens-holding shafts 559) that is disposed on the pedestal (the lens holder 550) and pinches the edge face of the eyeglass lens 2 from at least three directions; the moving device (the pulse motor 511, the feeding screw 510) that moves the pedestal (the lens holder 550) into the apparatus main body (the outer case 3); and the operation control circuit 100 that moves the pedestal (the lens holder 550) into the case 4 by the moving device and pinches the eyeglass lens 2 by the pinching members (the lens-holding shafts 559). Moreover, the lens-holding shafts 559 are released when the eyeglass lens 2 is disposed on the lens holder 550, and the operation control circuit 100 controls such that the lens-holding shafts 559 pinches the eyeglass lens 2 from at least three directions when the lens holder 550 moves into the case 4.

According to the configuration, the eyeglass lens can be pinched without fail and the efficiency of a suction operation can be improved.

Furthermore, the above-described jig mounting apparatus includes the holding device (the suction jig holding device 605) holding the base portion (attaching shaft portion 701) of the suction jig (lens suction jig 700), and also includes the mounting device (the lens suction mechanism 600) for mounting the jig (the lens suction jig 700) on the surface of the eyeglass lens 2. Moreover, the attaching device of the suction jig has a mechanism that releases the holding of the lens suction jig 700 performed by the holding device (the suction jig holding device 605) by using the pressuring force for pressuring the suction jig (the lens suction jig 700) when mounting the suction jig (the lens suction jig 700) on the surface of the eyeglass lens 2 by the mounting device (the lens suction mechanism 600).

According to this configuration, the apparatus has the mechanism for releasing the holding of the suction jig performed by the holding device by using the pressuring force for pressuring the suction jig when mounting the suction jig on the surface of the eyeglass lens by the mounting device, so that the suction jig can be prevented from hardly coming off from the jig receiving portion accidentally in a case of eyeglass lenses on which water proof, antifouling or antifogging treatment is applied.

Provided on the attaching device of the suction jig is the cylindrical body (the holder main body 606, the external cylinder 608) that engages the attaching shaft portion (the base portion) 701 of the lens suction jig 700, provided on the cylindrical body (the holder main body 606, the external cylinder 608) is the slit-shaped opening (the slit 608*a*) that opens to the inner circumference surface, and the elastic member (the folded portion 609*a* of the linear spring 609), which is protruded on the inner circumference surface of the cylindrical body (the holder main body 606, the external cylinder 608), is held by the opening (the slit 608*a*) as the attaching shaft portion (the base portion) 701. Furthermore, in the cylindrical body (the holder main body 606, the external cylinder 608), the sliding member (the sliding cylindrical body 612) that is energized by the energizing device (the coil spring 613) is disposed on an end side of the opening of the cylindrical body (the holder main body 606, the external cylinder 608).

Provided is the stopping mechanism (the mechanism by the guide shaft 614 and the stopper hook 618), which allows the sliding member (the sliding cylindrical body 612) to slide resisting the energizing force of the energizing device (the coil spring 613) by the attaching shaft portion 701 when inserting the attaching shaft portion 701 from the opening end of the external cylinder (the holder main body 606, the external cylinder 608), and which prevents (locks) the sliding member (the sliding cylindrical body 612) from moving toward the attaching shaft portion 701 by the energizing device (the coil spring 613) when the elastic member elastically contacts the circumference surface of the attaching shaft portion 701 by the sliding.

The stopping mechanism is configured to cancel the prevention when it is further pushed by the attaching shaft portion 701. By this canceling, the energizing device is configured to apply the energizing force to the attaching shaft portion 701 via the sliding member, and to push out attaching shaft portion 701 from the cylindrical body resisting the friction holding force of the attaching shaft portion 701 by the elastic member.

In this embodiment, locking/lock-canceling mechanism of a push-push type, which uses the stopper hook 609 and the guide shaft 61, is used for stopping and canceling the stop of the sliding member, but is not necessarily limited to this embodiment. For example, a locking/lock-canceling mechanism of push-push type, which uses a heart cam and is used in a switch or the like, may be disposed between the sliding member and the cylindrical body.

As mentioned above, various embodiments of the present invention are described, but the present invention is not limited to these embodiments and various changes and modifications can be made for these embodiments.

For references, modification and application examples of the present invention are cited as follows.

1-1. An automatic jig mounting apparatus for an eyeglass lens used for mounting a suction jig on a surface of the eyeglass lens, characterized by including: imaging optical device to image a lens image of the eyeglass lens by an optical element; characteristic measurement optical device to detect an optical characteristics of the eyeglass lens; operation control device to judge existence of a reference marker that is applied on the eyeglass lens from the lens image imaged by the imaging optical device, to specify a mounting position of the suction jig on the eyeglass lens based on the reference marker when the reference marker is detected, to detect the optical characteristics of the eyeglass lens by using the characteristic measurement optical device when the reference marker is not detected, and to specify the mounting position of the suction jig on the eyeglass lens based on the detected optical characteristics; and jig mounting device to mount the suction jig on the mounting position on the eyeglass lens, which is specified by the operation control device.

1-2. The automatic jig mounting apparatus for the eyeglass lens including lens-mounting device for mounting the eyeglass lens, characterized in that the lens-mounting device transports the eyeglass lens to the detection target position of the imaging optical device according to an instruction from the operation control device when the imaging optical device images the lens image, and transports the eyeglass lens to the detection target position of the characteristic measurement optical device when the characteristic measurement optical device detects the optical characteristics of the eyeglass lens.

1-3. An automatic mounting method of a suction jig for an eyeglass lens, characterized in that a lens image of the eyeglass lens is imaged by an optical element by using imaging optical device, existence of a reference marker applied on the eyeglass lens is judged from the imaged lens image by operation control device, a mounting position of the suction jig on the eyeglass lens is specified by the operation control device based on the reference marker when the reference marker is detected, an optical characteristics of the eyeglass lens is detected by the operation control device by using characteristic measurement optical device when the reference marker is not detected, the operation control device specifies the mounting position of the suction jig on the eyeglass lens based on the detected optical characteristics, and jig mounting device mounts the suction jig on the eyeglass lens based on the specified mounting position.

2-1. A method of judging existence of an eyeglass lens, characterized in that an image of the eyeglass lens is imaged by an optical element, at least a processing area of a predetermined range, which does not overlap the image of a holding portion that holds the eyeglass lens disposed on a pedestal, is determined from the imaged image of the eyeglass lens, the number of pixels having a previously determined threshold value or less is counted, and the operation processing device recognizes that the eyeglass lens is disposed on the pedestal when the counted total number of pixels is the threshold value or less.

2-2. An apparatus of judging existence of an eyeglass lens, characterized by including: a pedestal having a holding portion that holds a rear surface of the eyeglass lens; mounting device for mounting a suction jig on a surface of the eyeglass lens mounted on the pedestal; an optical element that images an image of the eyeglass lens; and an operation control circuit that determines at least a processing area of a predetermined range, which does not overlap the image of the holding portion on the pedestal, from the image of the eyeglass lens imaged by the optical element, counts the number of pixels having a previously determined threshold value or less, and recognizes that the eyeglass lens is disposed on the pedestal when the counted total number of pixels is the threshold value or more.

2-3. The method of judging the existence of the eyeglass lens described in 2-1, characterized in that the processing area is in a direction extending linearly from a center toward a periphery of an imaging area by the optical element.

2-4. The apparatus of judging the existence of the eyeglass lens described in 2-2, characterized in that the processing area is in a direction extending linearly from a center toward a periphery of an imaging area by the optical element.

3-1. A lens automatic suction apparatus, having: a pedestal on which an eyeglass lens is mounted; pinching members that are disposed on the pedestal and pinch an edge face of the eyeglass lens; moving device to move the pedestal into an apparatus main body; and operation control device to move the pedestal into the apparatus main body by the moving device and to pinch the eyeglass lens by the pinching members, characterized in that the operation control device controls the pinching members so as to pinch the eyeglass lens in conjunction with a movement of the pedestal by the moving device.

3-2. A lens automatic suction apparatus, having: a pedestal on which an eyeglass lens is mounted; pinching members that are disposed on the pedestal and pinch an edge face of the eyeglass lens from at least three directions; moving device to move the pedestal into an apparatus main body; and operation control device to move the pedestal into the apparatus main body by the moving device and pinching the eyeglass lens by the pinching members, characterized in that the pinching members are released when the eyeglass lens is disposed on the pedestal and the operation control device controls the pinching members so as to pinch the eyeglass lens from at least three directions when the pedestal moves into the apparatus main body.

4-1 An attaching apparatus of a suction jig, having: holding device for holding a base portion of the suction jig; and mounting device for mounting the suction jig on a surface of an eyeglass lens, characterized by including a mechanism that releases a holding of the suction jig performed by the holding device by the pressuring force that pressures the suction jig when mounting the suction jig on the surface of the eyeglass lens by the mounting device.

INDUSTRIAL APPLICABILITY

The above-described embodiments are configured to detect the hidden marks provided on the eyeglass lens in order to mount the jig on the eyeglass lens, but the present invention may be applied for judgment of type of a lens, for example, a lens of a camera, a microscope, a telescope or the like, judgment of existence of a reference marker, or the like.

The invention claimed is:

1. A jig mounting apparatus for mounting a jig on an eyeglass lens, comprising:
   a detection optical system including
      an aperture stop,
      a light source configured to irradiate an optical light flux via the aperture stop toward a surface of the eyeglass lens, a reference marker being formed on the surface,
      a focusing optical system configured to focus the optical flux irradiated from the light source, and
      an imagine device provided on a position optically approximately conjugate with said aperture stop and configured to focus the optical flux focused by the focusing optical system on a space portion alone an optical axis direction from the surface of said eyeglass lens and to detect the reference marker of the eyeglass lens based on the light flux focused on the space portion;
   a determining device configured to determine a mounting point based on the reference marker detected by the detection optical system; and
   a mounting device configured to mount the jig on a surface of eyeglass lens by positioning a mounting center of the jig at the mounting point.

2. The jig mounting apparatus according to claim 1, further comprising:
   a reflection plate that reflects the optical flux focused by the focusing optical system.

3. The jig mounting apparatus according to claim 2, wherein said reflection plate includes a retroreflective member that reflects and returns the optical flux having passed said eyeglass lens.

4. The jig mounting apparatus according to claim 2, wherein said reflection plate is rotatable.

5. The jig mounting apparatus according to claim 2, wherein said reflection plate is inclinable to the optical axis of said focusing lens.

6. The jig mounting apparatus according to claim 1, wherein said light source includes a red LED.

7. The jig mounting apparatus according to claim 1, wherein said focusing optical system includes a collimator lens.

8. The jig mounting apparatus according to claim 1, wherein said imaging device includes a first imaging device having an imaging lens and a CCD, an a second imaging device having an imaging lens and a CCD; and wherein the second imaging device is configured to focus on the space portion between said eyeglass lens and said focusing optical system along the optical axis of said focusing optical system.

9. The jig mounting apparatus according to claim 1, wherein said imaging device includes a half mirror disposed between said aperture stop and said focusing optical system.

10. The jig mounting apparatus according to claim 2,
   wherein said imaging device includes a first imaging device having an imaging lens and a CCD, and a second imaging device having an imaging lens and a CCD; and
   wherein the second imaging device is configured to focus on the space portion between said eyeglass lens and said reflection plate along an optical axis of said focusing optical system.

11. The jig mounting apparatus according to claim 1, wherein the space portion is between said eyeglass lens and said focusing optical system along an optical axis of said focusing optical system.

12. The jig mounting apparatus according to claim 2, wherein the space portion is between said eyeglass lens and said reflection plate along an optical axis of said focusing optical system.

13. The jig mounting apparatus according to claim 1, wherein the focusing optical system is disposed between the light source and the aperture stop.

* * * * *